(12) United States Patent
Hayashi et al.

(10) Patent No.: US 7,312,810 B2
(45) Date of Patent: *Dec. 25, 2007

(54) WIDE-ANGLE IMAGE GENERATING DEVICE

(75) Inventors: Kenichi Hayashi, Ikoma (JP); Yasushi Sogabe, Nishinomiya (JP); Shigeki Murata, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 843 days.

This patent is subject to a terminal disclaimer.

(21) Appl. No.: 10/477,685

(22) PCT Filed: May 20, 2002

(86) PCT No.: PCT/JP02/04870

§ 371 (c)(1),
(2), (4) Date: Nov. 14, 2003

(87) PCT Pub. No.: WO02/097730

PCT Pub. Date: Dec. 5, 2002

(65) Prior Publication Data

US 2004/0104996 A1 Jun. 3, 2004

(30) Foreign Application Priority Data

May 25, 2001 (JP) ............................. 2001-156202
Mar. 1, 2002 (JP) ............................. 2002-55117

(51) Int. Cl.
*H04N 7/00* (2006.01)
*G02B 13/16* (2006.01)

(52) U.S. Cl. ........................................ 348/37; 348/335
(58) Field of Classification Search ............ 348/36–37, 348/51, 159, 207.99, 335, 373; 359/726
See application file for complete search history.

(56) References Cited

U.S. PATENT DOCUMENTS 6,215,519 B1 * 4/2001 Nayar et al. ................. 348/159
6,847,497 B2 * 1/2005 Sogabe et al. ............... 359/726
7,176,960 B1 * 2/2007 Nayar et al. ............ 348/207.99

FOREIGN PATENT DOCUMENTS

| JP | 2939087 | 6/1999 |
|---|---|---|
| JP | 2001-109881 | 4/2001 |
| WO | WO 99/30197 | 6/1999 |

* cited by examiner

*Primary Examiner*—Gims Philippe
(74) *Attorney, Agent, or Firm*—Steptoe & Johnson LLP

(57) ABSTRACT

In a wide-angle image-generating device for obtaining a developed image by picking up a wide-angle image of about ±90 degrees using a reflecting mirror having a rotary-symmetrical convex shape, and performing computational processing, the contents of the developed image thus obtained are tilted by the amount commensurate with the inclination of the central rotational axis of the reflecting plane, which produces the drawback of giving a sense of discomfort to the viewer when the central rotational axis of the reflecting plane is tilted from a vertical direction within a plane perpendicular to a 0-degree direction. In the present invention, an angle sensor (12) is provided in the imaging device for picking up a wide-angle image of about ±90 degrees using a reflecting mirror (1), and the tilt within the plane perpendicular to the 0-degree direction is measured. The resulting value is used to perform development processing and to rotate the developed image by means of the computational processing device (11) so as to make the horizontals of the developed image and the TV monitor (13) conform to each other.

57 Claims, 34 Drawing Sheets

FIG. 11
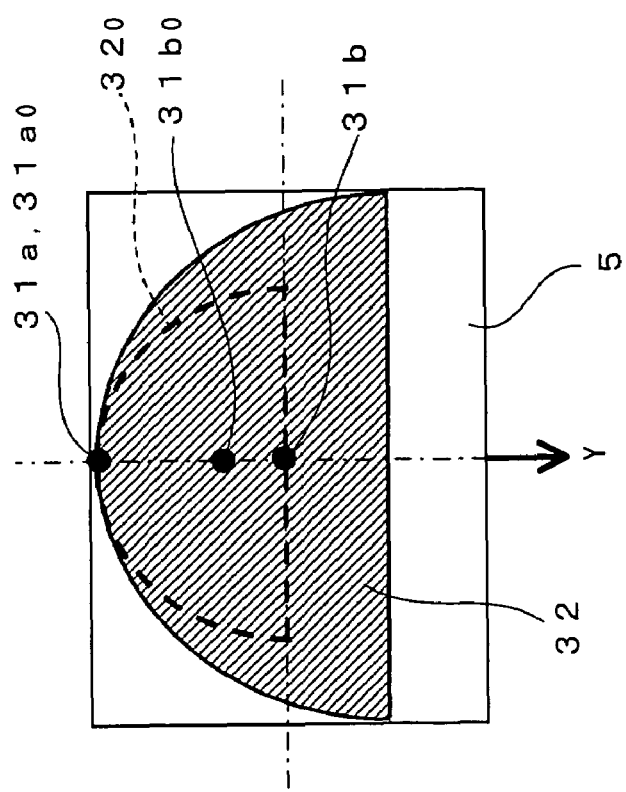
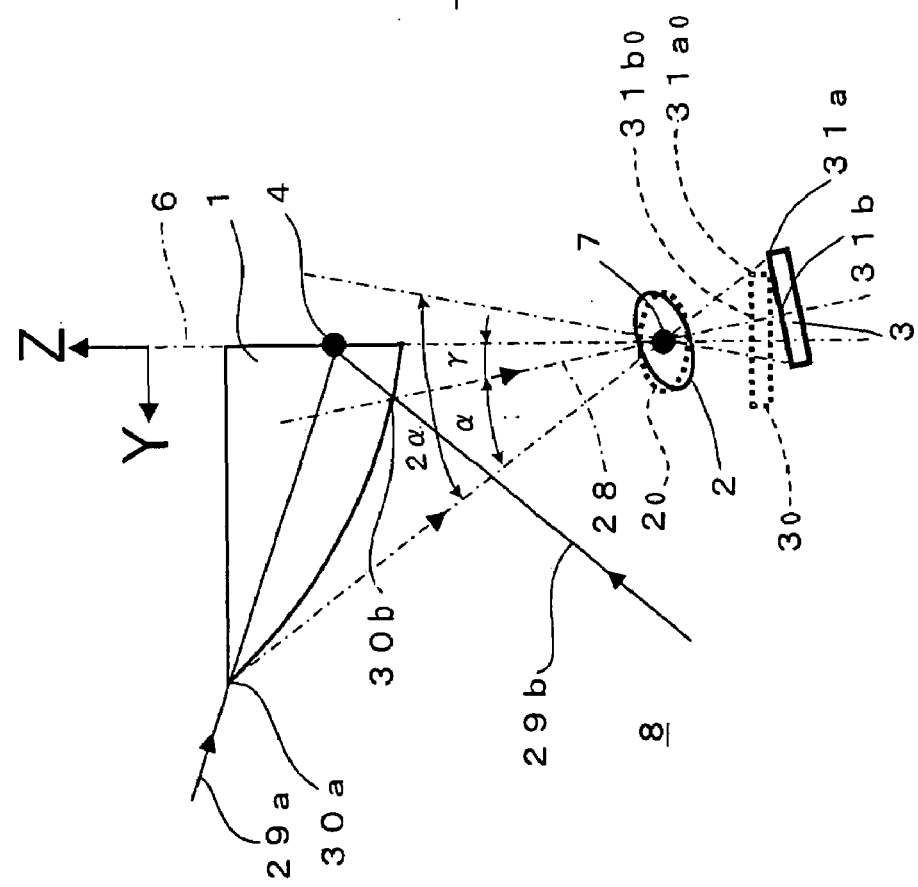

FIG. 13
(a) 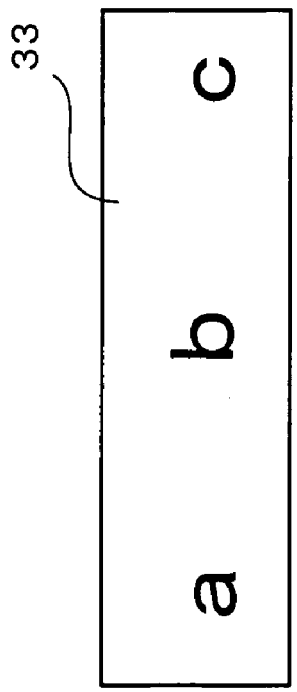
(b) 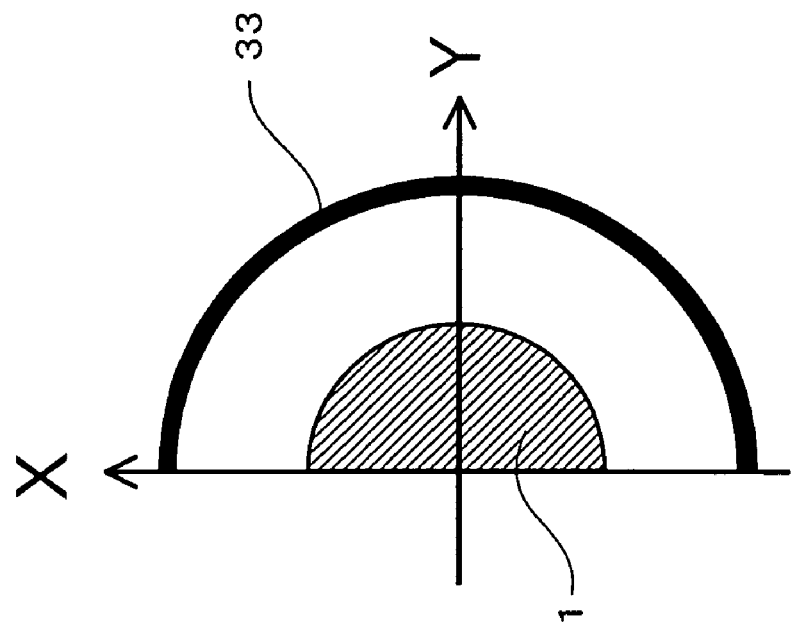

FIG. 20
(a)
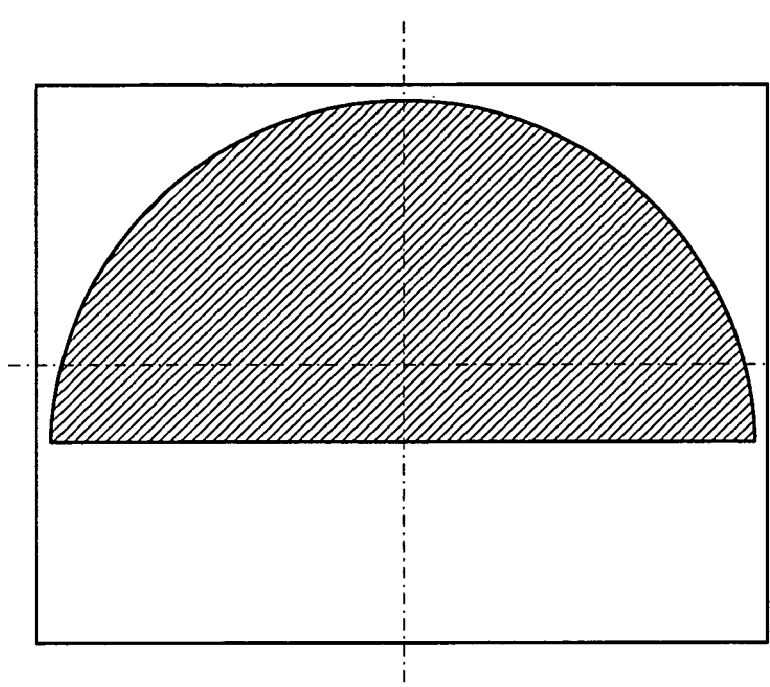
(b)
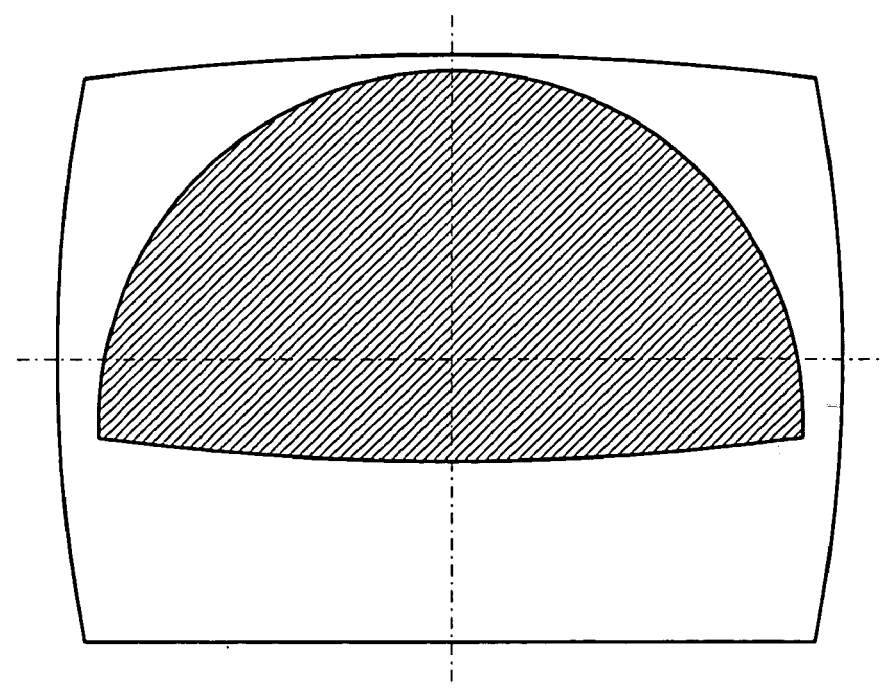

FIG. 21
(a)
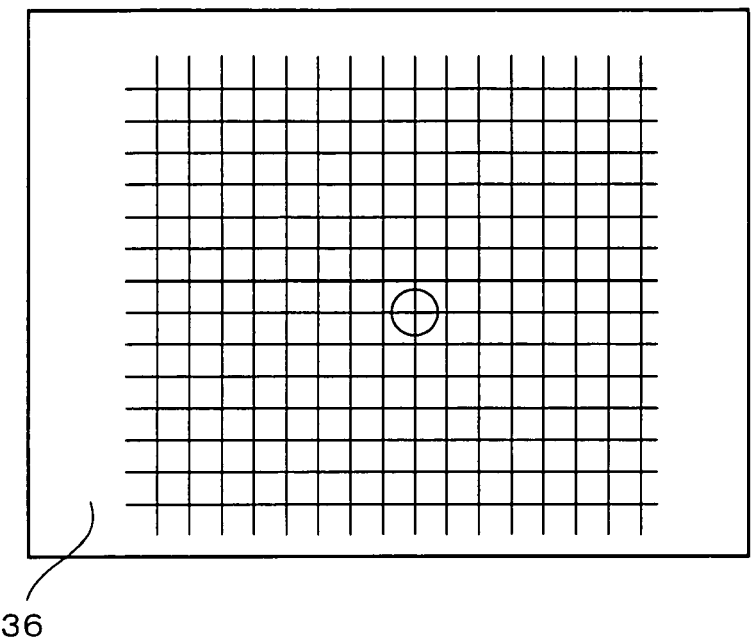
36
(b)
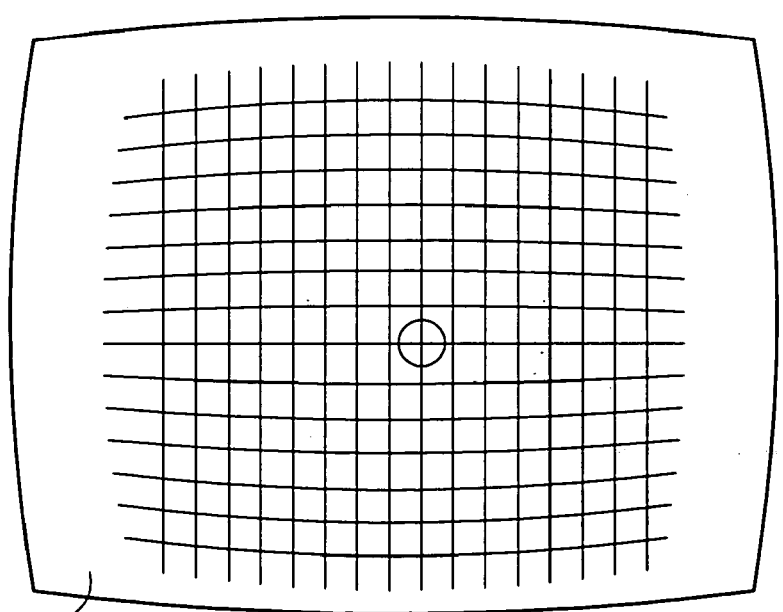
37

FIG. 30
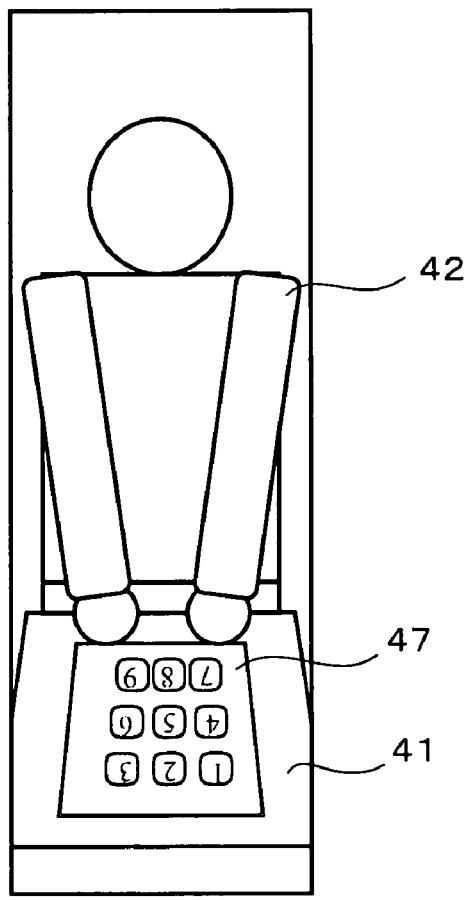
(a)
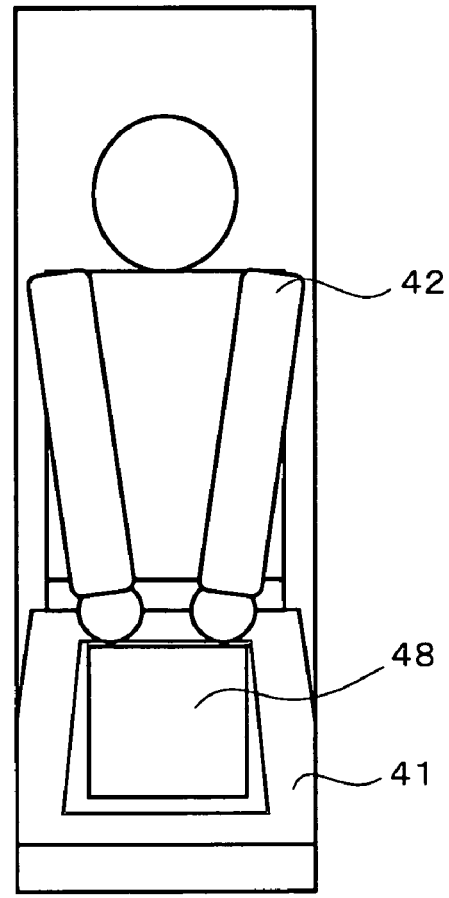
(b)

WIDE-ANGLE IMAGE GENERATING DEVICE

TECHNICAL FIELD

The present invention relates to a wide-angle image-generating device for picking up reflected light from a reflecting plane and generating a wide-angle image.

BACKGROUND ART

A so-called omnidirectional camera is cited in Japanese Patent No. 2939087 as a conventional example of a wide-angle imaging device that uses a reflecting plane. This is a device capable of forming an image on an image plane in 360 degrees of direction at once around a rotational axis, by means of a reflecting plane having a shape that is rotary-symmetric around the optical axis of the camera. This device also produces a so-called panoramic image by performing image conversion processing on the omnidirectional image thus picked up.

The omnidirectional camera is effective when the monitoring area includes a 360-degree periphery. However, when a monitoring area of about 180 degrees is sufficient, the omnidirectional camera picks up an image with about 180 degrees of unnecessary area, which is an inefficient use of the imaging element.

A wide-angle imaging device is therefore conceived that would pick up an image within the reflected image made by the reflecting plane that includes only about ±90 degrees of a referemce direction, which is any direction perpendicular to the central rotation axis of the reflecting plane.

A developed image, which is a type of image composed of a connected string of images picked up with a camera of the usual angle of view, can also be obtained by performing computational processing on an image obtained with this type of wide-angle imaging device (hereinafter referred to as "wide-angle image"), in the same manner as with the omnidirectional camera disclosed in Japanese Patent No. 2939087.

Development processing is described hereinafter.

FIG. 33 schematically depicts a wide-angle imaging device 8 to describe development processing. The coordinate axes are defined as follows: the direction away from the paper surface toward the viewer is the X-axis, the left-right direction of the paper surface is the Y-axis, and the up-down direction of the paper surface is the Z-axis. The Z-axis also conforms to the vertical direction.

The wide-angle imaging device 8 is composed of a hyperbolic reflecting mirror 1 having a rotary-symmetric shape, an image-forming lens 2, and an imaging element 3. An imaging device is normally composed of the image-forming lens 2 and the imaging element 3.

The hyperbolic reflecting mirror 1 has a reflecting plane that covers an area of ±90 degrees about the central rotational axis of the hyperbolic plane. The 0-degree direction thereof is the direction of the reference optical axis, which is in the same direction as the Y-axis. 4 is the internal focal point of the hyperbolic reflecting mirror 1. 6 is the central rotational axis of the hyperbolic reflecting mirror 1, and conforms to the Z-axis.

A light beam that is emitted from an arbitrary point P(X, Y, Z) in space and is incident on the internal focal point 4 is reflected off the reflecting plane of the hyperbolic reflecting mirror 1, and condensed to an external focal point (not pictured) on the central rotational axis 6. The position of the external focal point and the position of the principal point 7 of the image-forming lens 2 are disposed so as to substantially conform to each other, and the light beam forms an image on the imaging plane 5 of the imaging element 3 via the image-forming lens 2.

Also, 21 is a hypothetical cylindrical plane, which is a hypothetical projection plane used for mapping from a wide-angle image to a developed image. The central rotational axis of the hypothetical cylindrical plane 21 conforms to the central rotational axis 6 of the hyperbolic reflecting mirror 1.

A point (specifically, a point on the wide-angle image) p(x, y) corresponding to the arbitrary point P(X, Y, Z) in space is defined on the imaging plane 5. The hyperbolic shape of the hyperbolic reflecting mirror 1 is defined by the following formula (Eq. 1).

$$(X^2+Y^2)/a^2 - Z^2/b^2 = -1 \tag{Eq. 1}$$

Wherein a and b are constants for determining the shape of the hyperboloid. Also, $$c=(a^2+b^2)^{0.5} \tag{Eq. 2}$$

Eqs. 3 through 5 are also established:

$$Z=(X^2+Y^2)^{0.5} \cdot \tan\beta + c \tag{Eq. 3}$$

$$\tan\beta = \{(b^2+c^2)\cdot\sin\alpha - 2bc\}/\{(b^2-c^2)\cdot\cos\alpha\} \tag{Eq. 4}$$

$$\tan\alpha = F/(x^2+y^2)^{0.5} \tag{Eq. 5}$$

Here, F is the focal distance of the imaging device that comprises the image-forming lens 2 and the imaging element 3. Angles $\alpha$ and $\beta$ are as referenced in FIG. 33.

If X, Y, and Z, and b, c, and F are defined by Eq. 3 through Eq. 5, then $(x^2+y^2)^{0.5}$; specifically, the distance from the point of intersection with the central rotational axis 6 on the imaging plane 5 to point p is defined.

Also, because a light beam directed towards the internal focal point 4 reflects off the hyperbolic reflecting mirror 1 towards the external focal point in hyperbolic fashion, the respective directions of the points P and p in the XY plane and xy plane conform to each other. Consequently, $$Y/X=y/x \tag{Eq. 6}$$

If X and Y are obtained from Eq. 6, the direction of point p is also defined, and a unique point (specifically, a point on the wide-angle image) p(x, y) corresponding to P(X, Y, Z) can therefore be defined on the imaging plane 5. Specifically, a developed image can also be generated in a wide-angle imaging device, such as one designed for picking up an image with a substantially ±90-degree field of view, by defining the projection plane (hypothetical cylindrical plane 21) of the developed image, determining the corresponding point of each of the pixels of the developed image on the wide-angle image by taking into account the mapping of the wide-angle image to the projection plane, and determining the luminance values of all the pixels in the developed image accordingly, as in the case of the omnidirectional camera.

However, if the central rotational axis of the reflecting plane in this case is tilted from the vertical direction in a plane perpendicular to the reference direction, then ignoring this tilt, performing computational processing for the image obtained from this wide-angle imaging device, and converting a substantially ±90-degree wide-angle image to a developed image will make the outer rim of the developed image no different from when there is no tilt in the central rotational axis of the reflecting plane. The contents of the developed image will acquire a tilt commensurate with the inclination of the central rotational axis of the reflecting plane, and will produce the drawback of giving a sense of discomfort to the viewer.

Also, the field of view of the wide-angle imaging device in the direction of the central rotational axis generally satisfies the condition $|\beta|<|\gamma|$, where $\beta$ is the elevation angle and $\gamma$ is the depression angle (see FIG. 33). Because of this, the position within the developed image for which the elevation angle is zero (hereinafter referred to as "line-of-sight center") shifts towards either side of the developed image. A drawback arising this time is that portions within the developed image that are distant from the line-of-sight center look more slanted than other portions, and hence look distorted in comparison to the other portions.

The omnidirectional camera will also be described using FIG. 34.

FIG. 34(a) depicts the basic structure of the omnidirectional camera. The omnidirectional camera 100 comprises a hyperbolic reflecting mirror 101 as a reflecting plane having a rotary-symmetric shape, an image-forming lens 102, and a CCD or other imaging element 103.

104 is the internal focal point of the hyperbolic reflecting mirror 101. 105 is the imaging plane of the imaging element 103. 106 is the central rotational axis of the hyperbolic reflecting mirror 101, and conforms to the Z-axis in this case. Also, an arbitrary direction perpendicular to the central rotational axis of this hyperbolic reflecting mirror 101 is designated as the Y-axis direction. 107 is the principal point of the image-forming lens 102. The origin O of the coordinate system is at the point that divides a straight line connecting the internal focal point 104 with the principal point 107 into two equal parts.

Also, 108a and 108b are light beams incident on the hyperbolic reflecting mirror 101, and 109a and 109b are the incident points of light beams 108a and 108b on the hyperbolic reflecting mirror 101. 110a and 110b are the points at which the light beams 108a and 108b reflected at the incidence points 109a and 109b form an image in the imaging plane 105.

The light beams 108a and 108b, which are emitted from points in the YZ plane, propagated towards the internal focal point 104, and cast on the incident points 109a and 109b on the hyperbolic reflecting mirror 101, are reflected by the reflecting plane of the hyperbolic reflecting mirror 101, and are condensed to an external focal point (not pictured) on the central rotational axis 106. The position of this external focal point and the position of the principal point 107 of the image-forming lens 102 are disposed so as to substantially conform to each other, and the light beams 108a and 108b form an image at the image formation points 110a and 110b on the imaging plane 105 of the imaging element 103 via the image-forming lens 102.

FIG. 34(b) depicts the manner in which an image is formed on the imaging plane 105. As depicted in the diagram, the Y-axis is directed upwards on the paper surface. Also, the Z-axis is directed perpendicular to the paper surface. Luminous fluxes (not pictured), which include the light beams 108a and 108b, and which are incident on the hyperbolic reflecting mirror 101 towards the internal focal point 104 from 360 degrees about the central rotational axis 106 of the omnidirectional camera 100, pass through the hyperbolic reflecting mirror 101 (not pictured) and form a circular image 111 on the imaging plane 105 via the image-forming lens 102, in the same manner as the light beams 108a and 108b. Both ends of the Y direction also become the image formation points 110a and 110b of the light beams 108a and 108b in the circular image 111.

Development processing for converting a circular omnidirectional image obtained as described above into a panoramic image will be described hereafter.

FIG. 35 schematically depicts the omnidirectional camera 100 in order to describe development processing. The hyperbolic reflecting mirror 101, image-forming lens 102, imaging element 103, internal focal point 104, imaging plane 105, central rotational axis 106, and principal point 107 are the same as described in FIG. 34.

112 is a hypothetical cylindrical plane, which is a hypothetical projection plane used for mapping from a circular omnidirectional image to a developed image. The central rotational axis of the hypothetical cylindrical plane 112 conforms to the central rotational axis 106 of the hyperbolic reflecting mirror 101. The coordinate axes are defined as follows: the direction away from the paper surface toward the viewer is the X-axis, the left-right direction of the paper surface is the Y-axis, and the up-down direction of the paper surface is the Z-axis. The Z-axis is also defined as conforming to the central rotational axis 106.

As previously described, a light beam that is emitted from an arbitrary point $P(X_P, Y_P, Z_P)$ in space and is incident on the internal focal point 104 is reflected off the reflecting plane of the hyperbolic reflecting mirror 101, and is condensed to an external focal point (not pictured) on the central rotational axis 106. The position of the external focal point and the position of the principal point 107 of the image-forming lens 102 are disposed so as to substantially conform to each other, and a light beam forms an image on the imaging plane 105 of the imaging element 103 via the image-forming lens 102.

A point on the imaging plane 105 that corresponds to the arbitrary point $P(X_P, Y_P, Z_P)$ in space, that is, $p(x_p, y_p)$, is defined as a point on a circular omnidirectional image. The hyperbolic shape of the hyperbolic reflecting mirror 101 is defined by Eq. 7.

$$(X^2+Y^2)/a^2-Z^2/b^2=-1 \tag{Eq. 7}$$

Here, a and b are constants for determining the shape of the hyperboloid. Also, $$c=(a^2+b^2)^{0.5} \tag{Eq. 8}$$

Eq. 9 through Eq. 11 are also established:

$$Z=(X^2+Y^2)^{0.5} \cdot \tan \alpha + c \tag{Eq. 9}$$

$$\tan \alpha = \{(b^2+c^2)\cdot \sin \beta - 2bc\}/\{(b^2-c^2)\cdot \cos \beta\} \tag{Eq. 10}$$

$$\tan \beta = F/(x^2+y^2)^{0.5} \tag{Eq. 11}$$

Here, F is the focal distance of the imaging device that comprises the image-forming lens 102 and the imaging element 103. Angle $\alpha$ is the angle formed between the XY plane and the straight line that connects the internal focal point 104 with the arbitrary point P. Angle $\beta$ is the angle formed between the XY plane and the straight line that connects the principal point 107 (which substantially conforms to the external focal point of the hyperbolic reflecting mirror 101) with the point p on the imaging plane 105. If $X_P$, $Y_P$, and $Z_P$, and b, c, and F are defined by Eq. 9 through Eq. 11, then $(x_p^2+y_p^2)^{0.5}$; specifically, the distance from the point of intersection with the central rotational axis 106 on the imaging plane 105 to point p is defined.

Also, because a light beam directed towards the internal focal point 104 reflects off the hyperbolic reflecting mirror 101 towards the external focal point in hyperbolic fashion, the respective directions of the points P and p in the XY plane and xy plane conform to each other. Consequently, $$Y/X = y/x \quad \text{(Eq. 12)}$$

If $X_P$ and $Y_P$ are defined by Eq. 12, the direction of point p is also defined.

As described above, a unique point (specifically, a point on the circular omnidirectional image) $p(x_p, y_p)$ corresponding to $P(X_P, Y_P, Z_P)$ can be defined on the imaging plane 5. Consequently, a developed image can be generated by defining the projection plane (hypothetical cylindrical plane 112) of the developed image, determining the corresponding point of each of the pixels of the developed image on the circular omnidirectional image by taking into account the mapping of the circular omnidirectional image to the projection plane, and determining the luminance values of all the pixels in the developed image accordingly.

The omnidirectional camera is effective when the monitoring area includes a 360-degree periphery. However, when a monitoring area of about 180 degrees is sufficient, the omnidirectional camera picks up an image with about 180 degrees of unnecessary area, which is an inefficient use of the imaging element.

DISCLOSURE OF THE INVENTION

An object of the present invention is to provide a wide-angle image-generating device in which the output of the wide-angle image-generating device consists of an image in which the horizontal direction of the image conforms to the horizontal direction of a TV monitor, and which gives no sense of discomfort to the viewer, even when the central rotational axis of the wide-angle imaging device is tilted from the vertical direction in a plane perpendicular to the direction of the reference optical axis thereof.

Another object of the present invention is to provide a wide-angle image-generating device that is capable of overcoming the drawback whereby if a wide-angle imaging device is conceived that would pick up an image within the reflected image made by the reflecting plane that includes only about ±90 degrees of a reference direction, which is any direction perpendicular to the central rotation axis of the reflecting plane, the resulting developed image is incorrect because of image deformation arising from the tilt of the optical axis of the imaging device and optical strain when the same processing is applied to the wide-angle image as in the case of the omnidirectional camera in an attempt to obtain a developed image.

The wide-angle image-generating device according to claim 1 of the present invention comprises a wide-angle imaging device and a computational processing device, and is characterized in that the wide-angle imaging device comprises a reflecting mirror having a convex reflecting plane whose angle θ has the minimum range of (θ1≦θ≦θ2, −90°≦θ1≦90°, −90°≦θ2<90°, θ1<θ2), wherein a reference optical axis is defined in an arbitrary direction perpendicular to the central rotational axis of a rotary-symmetrical body, and the direction of the reference optical axis is taken to be 0 degrees; also comprises an imaging device that has a principal point on the central rotational axis of the reflecting mirror, forms a reflected image of the reflecting mirror, and picks up objects in a range of at least angle θ around the central rotational axis of the reflecting mirror; and is mounted in a plane perpendicular to the reference optical axis, with the central rotational axis of the reflecting mirror tilted in any tilt direction within the plane of the central rotational axis; and the computational processing device comprises a developed-image generating unit for performing computational processing on the image obtained from the wide-angle imaging device and generating a developed image, and an output-image generating unit for tilting the developed image according to the in-plane tilt direction of the central rotational axis, converting the data format of the developed image into a usable output format and generating an output image.

The wide-angle image-generating device according to claim 2 of the present invention comprises a wide-angle imaging device and a computational processing device, and is characterized in that the wide-angle imaging device comprises a reflecting mirror having a convex reflecting plane whose angle θ has the minimum range of (θ1≦θ≦θ2, −90°≦θ1≦90°, −90°≦θ2≧90°, θ1<θ2), wherein a reference optical axis is defined in an arbitrary direction perpendicular to the central rotational axis of a rotary-symmetrical body, and the direction of the reference optical axis is taken to be 0 degrees; also comprises an imaging device that has a principal point on the central rotational axis of the reflecting mirror, forms a reflected image of the reflecting mirror, and picks up objects in a range of at least angle θ around the central rotational axis of the reflecting mirror; and is mounted in a plane perpendicular to the reference optical axis, with the central rotational axis of the reflecting mirror tilted in any tilt direction within the plane of the central rotational axis; and the computational processing device comprises a developed-image generating unit for performing computational processing on the image obtained from the wide-angle imaging device and generating a developed image that is tilted according to the in-plane tilt direction of the central rotational axis, and an output-image generating unit for converting the data format of the developed image into a usable output format and generating an output image.

The wide-angle image-generating device according to claim 3 of the present invention is characterized in that the reflecting mirror in claims 1 or 2 is in a hyperbolic shape that has an internal focal point on the central rotational axis thereof, and the position of the external focal point of the hyperbolic shape and the position of the principal point of the imaging device are disposed so as to conform or substantially conform to each other.

The wide-angle image-generating device according to claim 4 of the present invention is characterized in that the in-plane tilt direction of the central rotational axis in any of claims 1 through 3 conforms or substantially conforms to the horizontal direction.

The wide-angle image-generating device according to claim 5 of the present invention is characterized in that the wide-angle imaging device or the computational processing device in any of claims 1 through 4 has a unit for detecting the in-plane tilt direction of the central rotational axis whereby the in-plane tilt direction of the central rotational axis is detected, and the developed image is tilted and an output image generated in the computational processing device according to the output results from the unit for detecting the in-plane tilt direction of the central rotational axis.

The wide-angle image-generating device according to claim 6 of the present invention is characterized in that the unit for detecting the in-plane tilt direction of the central rotational axis provided to the computational processing device in claim 5 is constituted so as to perform image processing and detect the in-plane tilt direction of the central rotational axis.

The wide-angle image-generating device according to claim 7 of the present invention is characterized in that the wide-angle imaging device or the computational processing device in any of claims 1 through 4 has a unit for inputting the in-plane tilt direction of the central rotational axis whereby the in-plane tilt direction of the central rotational axis is inputted, and the developed image is tilted and an output image generated in the computational processing device according to the input results from the unit for inputting the in-plane tilt direction of the central rotational axis.

The wide-angle image-generating device according to claim 8 of the present invention comprises a wide-angle imaging device and a computational processing device, and is characterized in that the wide-angle imaging device comprises a hyperbolic reflecting mirror having a hyperbolic reflecting plane whose angle θ has the minimum range of (θ1≦θ≦θ2, −90°≦θ1≦90°, −90°≦θ2≦90°, θ1<θ2), wherein a reference optical axis is defined in an arbitrary direction perpendicular to the central rotational axis of a hyperbolic plane, and the direction of the reference optical axis is taken to be 0 degrees; also comprises an imaging device in which the position of the external focal point of the hyperbolic reflecting mirror and the position of the principal point thereof substantially conform to each other, which forms a reflected image from the image reflected off the hyperbolic reflecting mirror, and which picks up objects in a range of at least angle θ around the central rotational axis of the hyperbolic reflecting mirror; and is mounted in a plane that includes the reference optical axis and the central rotational axis of the hyperbolic reflecting mirror, with the central rotational axis of the hyperbolic reflecting mirror tilted in any tilt direction in front of the central rotational axis; and the computational processing device comprises a developed-image generating unit for performing computational processing on the image obtained from the wide-angle imaging device, with the projection plane being in the form of a hypothetical cylinder in which any axis passing through the internal focal point of the hyperbolic mirror serves as the central rotational axis of the hypothetical cylinder, and generating a developed image, and also comprises an output-image generating unit for converting the data format of the developed image into a usable output format and generating an output image.

The wide-angle image-generating device according to claim 9 of the present invention is characterized in that a reference axis set within the plane that includes the reference optical axis and the central rotational axis of the hyperbolic reflecting mirror is parallel with or conforms to the central rotational axis of the hypothetical cylinder, regardless of the tilt direction in front of the central rotational axis in claim 8.

The wide-angle image-generating device according to claim 10 of the present invention is characterized in that the tilt direction in front of the central axis in claim 9 is directed such that the angle-of-view center of the wide-angle imaging device in the plane that includes the reference optical axis and the central rotational axis of the hyperbolic reflecting mirror is perpendicular to the reference axis.

The wide-angle image-generating device according to claim 11 of the present invention is characterized in that the wide-angle imaging device or the computational processing device in claims 9 or 10 has a unit for detecting the front tilt direction of the central rotational axis whereby the tilt direction in front of the central rotational axis is detected, and the developed image is tilted and an output image generated in the computational processing device according to the output results from the unit for detecting the front tilt direction of the central rotational axis.

The wide-angle image-generating device according to claim 12 of the present invention is characterized in that the wide-angle imaging device or the computational processing device in claims 9 or 10 has a unit for inputting the front tilt direction of the central rotational axis whereby the tilt direction in front of the central rotational axis is inputted, and the developed image is tilted and an output image generated in the computational processing device according to the input results from the unit for inputting the front tilt direction of the central rotational axis.

The wide-angle image-generating device according to claims 20 through 23 of the present invention is characterized in that the development table generating unit or the computational processing device for generating a development table is constituted so as to generate a development table that contains information about a pixel correspondence relation obtained by synthesizing the correspondence relation between a wide-angle image that contains strain due to the optical aberration in the imagining device and a wide-angle image whose strains has been corrected, and the correspondence relation between the wide-angle image whose strain has been corrected and the developed image.

The wide-angle image-generating device according to claims 24 through 27 of the present invention is characterized in that the development table generating unit or the computational processing device for generating a development table is constituted so as to generate a development table in which the pixel correspondence relation between the wide-angle image and the developed image is changed by setting the center of projection of the hypothetical projection plane at a point outside the rotation axis of the reflecting mirror, the hypothetical projection plane being involved in defining the pixel correspondence relation between the wide-angle image and the developed image.

The wide-angle image-generating device according to claims 28 through 31 of the present invention is characterized in that the development table generating unit or the computational processing device for generating a development table is constituted so as to generate a development table which would arbitrarily change the pixel correspondence relation between the wide-angle image and the developed image within an arbitrary masked area provided on the developed image, and mask the developed image within the masked area.

The wide-angle image-generating device according to claims 32 through 35 of the present invention is characterized in that an image quality correction processing unit for enhancing high-frequency components, with the degree of enhancement varying according to the position on the developed image, is added to a subsequent stage of the developed image generating unit as post-processing of the developed image generating unit.

The wide-angle image-generating device according to claims 36 through 40 of the present invention is characterized in that an image-masking unit is provided for performing image masking to produce an image in which a specific area of the image developed by the developed image generating unit differs from that of the original.

The wide-angle image-generating device according to claim 41 of the present invention is characterized in that, in claim 17, the development table generating unit or the computational processing device for generating a development table is constituted so as to generate a development table according to the equations below.

$$\tan \alpha = \{(b^2+c^2)\cdot\sin\beta - 2bc\}/\{(b^2-c^2)\cdot\cos\beta\}$$

$$c = (a^2+b^2)^{0.5}$$

$$(x^2+y^2)^{0.5} = F\cdot\cos\beta/\cos\gamma(\theta)/\sin(\beta+\gamma(\theta))$$

$$\cos\phi = \cos\theta/(1+\tan^2\gamma(90°)\cdot\sin^2\theta)^{0.5}$$

$$\tan\gamma\_(\theta) = \tan\gamma\_(90°)\cdot\sin\theta$$

where, a and b are constants that determine the shape of the hyperboloid; the shape of the hyperboloid is a hyperboloid expressed by the equation $(X^2+Y^2)/a^2 - Z^2/b^2 = -1$ in an XYZ space for which Z>0; α is the angle formed between the XY plane and the straight line that connects the internal focal point of the reflecting mirror with an arbitrary point in space; β is the angle formed between the XY plane and the straight line that connects the principal point of the imaging device with a point at which incident light from the arbitrary point strikes the imaging plane of the imaging device; F is the focal distance of the imaging device; e is the incidence direction of the incident light when the direction of the reference optical axis in the XY plane is 90 degrees; γ is the tilt of the imaging plane dependent on the incidence direction θ; and φ is the incidence direction of the incident light on the imaging plane.

BRIEF DESCRIPTION OF THE DRAWINGS

FIG. 11 is a diagram depicting the wide-angle imaging device in the same embodiment;

FIG. 13 is a diagram depicting objects a, b, and c for the same embodiment;

FIG. 20 is a diagram depicting the effect of optical strain in the imaging device;

FIG. 21 is a diagram depicting a test pattern image;

FIG. 30 is a schematic diagram of a case in which an ATM operating panel is masked;

BEST MODE FOR CARRYING OUT THE INVENTION

A wide-angle image-generating device in which the output of the wide-angle image-generating device consists of an image in which the horizontal direction of the image conforms to the horizontal direction of a TV monitor, and which gives no sense of discomfort to the viewer, even when the central rotational axis of the wide-angle imaging device is tilted from the vertical direction in a plane perpendicular to the direction of the reference optical axis thereof, will be described based on Embodiments 1 through 4 as depicted in FIGS. 1 through 9.

Embodiment 1

FIGS. 1 through 5 depict Embodiment 1 of the present invention.

Figure 1:
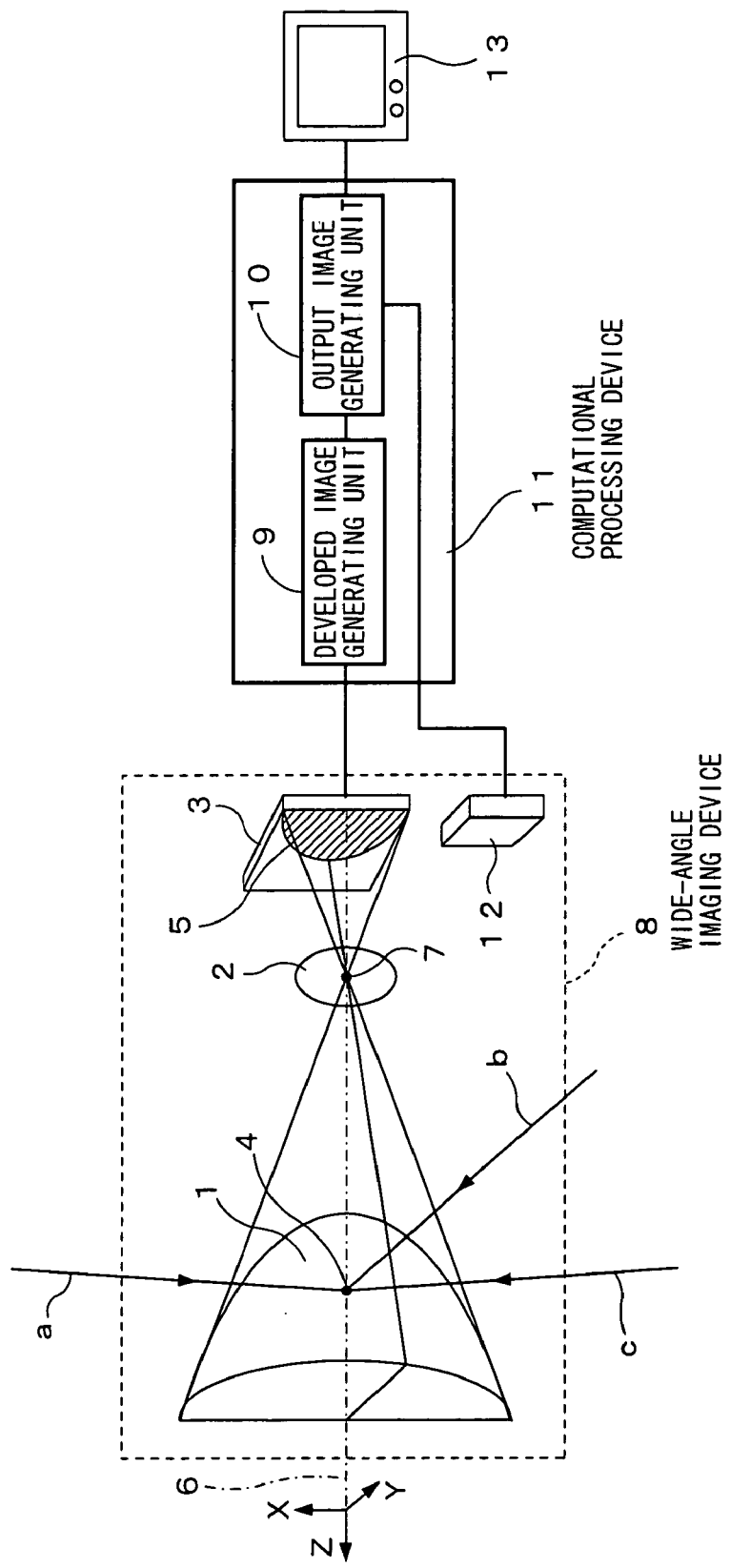
FIG. 1 is a structural diagram of the wide-angle image-generating device (Embodiment 1) of the present invention.
Figure 2:
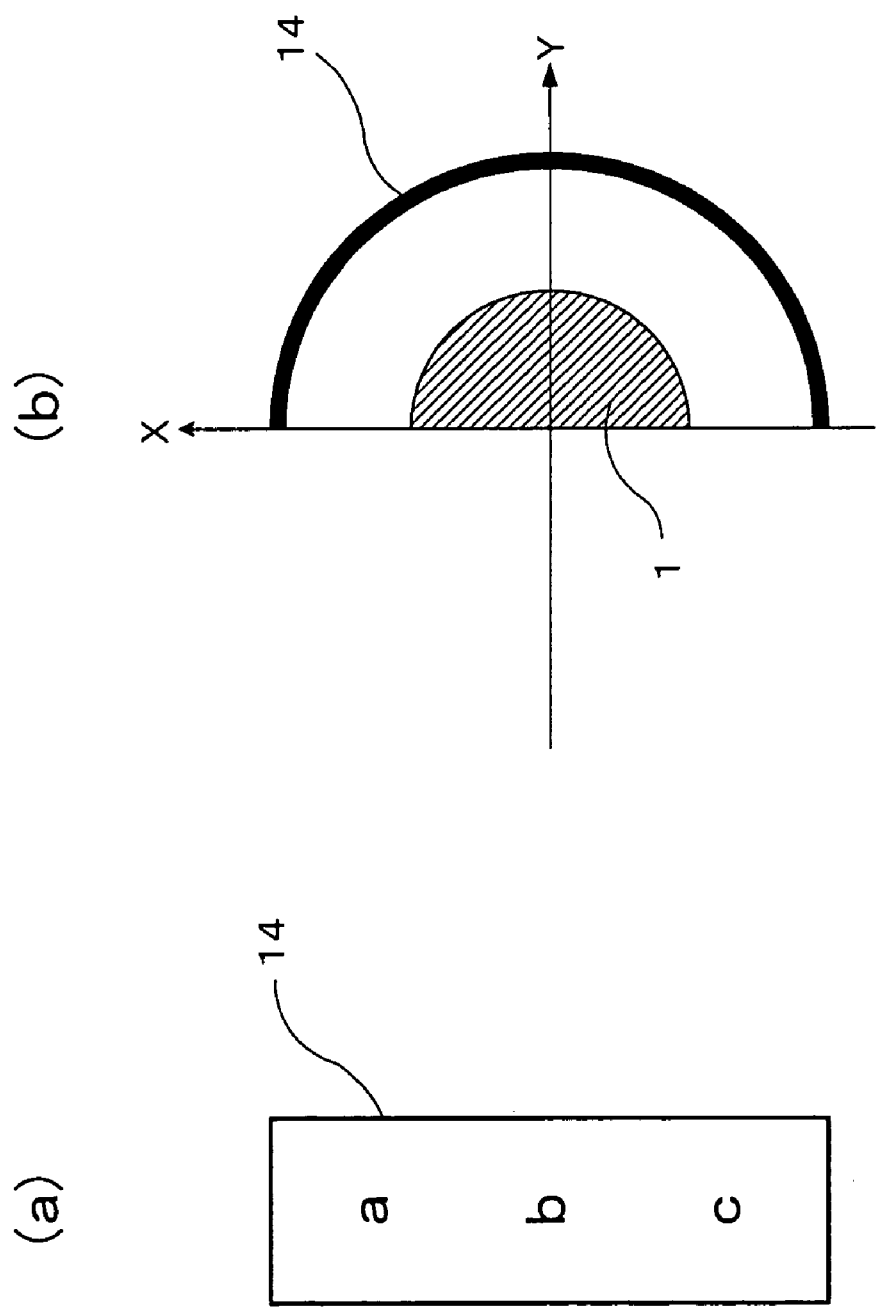
FIG. 2 is a diagram depicting objects a, b, and c for the same embodiment.

FIG. 1 depicts the wide-angle image-generating device of Embodiment 1, with the coordinate axes defined as follows: the direction away from the paper surface toward the viewer is the X-axis, the left-right direction of the paper surface is the Y-axis, and the up-down direction of the paper surface is the Z-axis. The X-axis also conforms to the vertical direction.

The wide-angle imaging device 8 is composed of a hyperbolic reflecting mirror 1, an image-forming lens 2, and an imaging element 3. An imaging device is composed of the image-forming lens 2 and the imaging element 3. The hyperbolic reflecting mirror 1 has a reflecting plane that covers an area of ±90 degrees about the central-rotational axis of the hyperbolic plane. The 0-degree direction thereof, specifically, the direction of the reference optical axis thereof, is in the Y-axis direction. The reference optical axis also passes through the internal focal point 4 of the hyperbolic reflecting mirror 1. The central rotational axis 6 of the hyperbolic reflecting mirror 1 is made to conform to the Z-axis (horizontal direction) by being tilted 90 degrees from the vertical direction, with the Y-axis as the axis of rotation.

Light beams a, b, and c propagated towards the internal focal point 4 are reflected by the reflecting plane of the hyperbolic reflecting mirror 1, and are condensed to an external focal point (not pictured) on the central rotational axis 6. The position of this external focal point and the position of the principal point 7 of the image-forming lens 2 are disposed so as to conform or substantially conform to each other, and the light beams a, b, and c form an image on the imaging plane 5 of the imaging element 3 via the image-forming lens 2.

Also, the image-forming lens 2 is described in FIG. 1 as constituting a single lens element, but may also constitute multiple lens elements. The hyperbolic reflecting mirror 1 described herein is also limited to a hyperbolic shape, but may be hemispherical, conical, or in another rotary-symmetrical shape. However, because there is no external focal point in that case, the principal point 7 of the image-forming lens 2 is placed in an arbitrary position on the central rotational axis 6.

A gyroscopic Y-axis angle sensor 12 as the unit designed for detecting the in-plane tilt direction of the central rotational axis and provided to the wide-angle imaging device 8 outputs the degree to which the central rotational axis 6 in the plane perpendicular to the reference direction of the optical axis (in the XZ plane) is tilted with respect to the reference axis (the vertical axis in this case).

The computational processing device 11 is composed of the developed image generating unit 9 and the output image generating unit 10. In the developed image generating unit 9, processing is performed for converting a wide-angle image to a developed image for the wide-angle image having a 180-degree angle of view that is obtained by means of the imaging element 3 of the wide-angle imaging device 8, in accordance with an algorithm determined by the shape of the hyperbolic reflecting mirror 1 and the optical characteristics of the image-forming lens 2 and imaging element 3.

In the output image generating unit 10, tilt correction processing (described hereinafter) is performed, and conversion to NTSC format is performed for the developed image obtained by means of the developed image generating unit 9, based on the output of the Y-axis angle sensor 12. 13 is a TV monitor for displaying the output image from the computational processing device 11.

The structure in FIG. 1 will be described in further detail based on the operation thereof.

Figure 4:
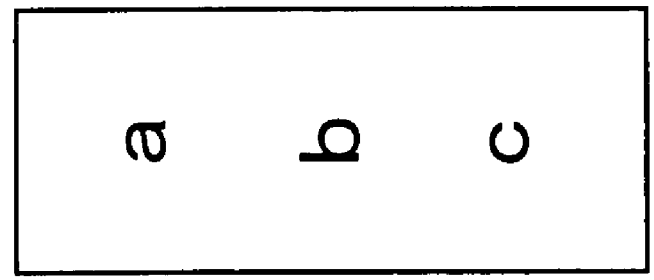
FIG. 4 is a schematic diagram of the results of development processing on the image picked up by the wide-angle image-generating device of the same embodiment.

Light beams a, b, and c in FIG. 1 represent arbitrary light beams from an object. The objects of the light beams are therefore designated as objects a, b, and c. The objects a, b, and c are indicated by the letters "a," "b," and "c" pictured on a screen 14 such as the one depicted in FIG. 2(a), and a case is conceived in which the screen 14 is disposed around the Z-axis such that the distance from the Z-axis to the screen surface is fixed, as shown in FIG. 4, and the plane in which the objects a, b, and c are pictured is visible from the hyperbolic reflecting mirror 1.

As previously described, the light beams cast on the reflecting plane of the hyperbolic reflecting mirror 1 towards the internal focal point 4 are all reflected towards the external focal point (not pictured), and form an image on the imaging plane 5 of the imaging element 3 via the image-forming lens 2, for which the respective positions of the external focal point and the principal point are disposed so as to conform or substantially conform to each other.

Figure 3:
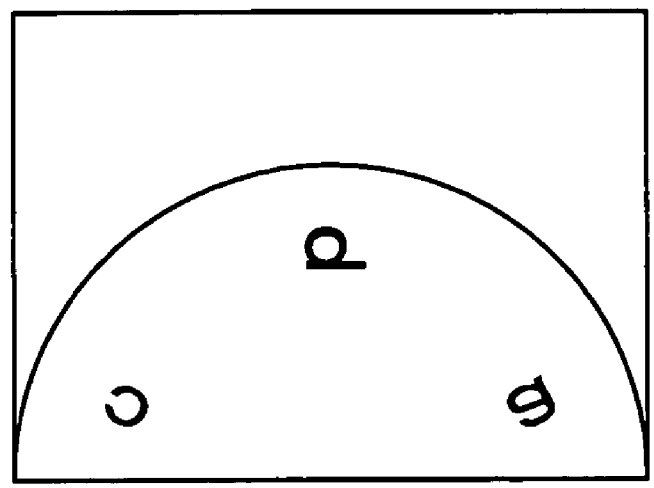
FIG. 3 is a schematic diagram of images linked together on the imaging plane in the wide-angle image-generating device of the same embodiment.

Consequently, an image is formed on the imaging plane 5 in a range of ±90 degrees from the direction of the reference optical axis (Y-axis direction). The image obtained at this time by the imaging element 3 is depicted in FIG. 3. It is apparent that the objects a, b, and c are all included therein.

In the computational processing device 11, processing is performed by the developed image generating unit 9 to convert a wide-angle image such as that shown in FIG. 3 output from the wide-angle imaging device 8 into a developed image.

As previously described, development processing generates a developed image by defining the projection plane (hypothetical cylindrical plane 21) of the developed image, determining the corresponding point of each of the pixels of the developed image on the wide-angle image by taking into account the mapping of the wide-angle image to the projection plane, and determining the luminance values of all the pixels in the developed image accordingly. When development processing is performed for a wide-angle image such as that shown in FIG. 3, for example, a developed image is obtained such as that shown in FIG. 4.

Conversion processing to an output image is performed in the output image generating unit 10 for the developed image created by the processing described above in the developed image generating unit 9.

Two types of processing are performed in the output image generating unit 10.

Tilt correction processing of the developed image will first be described.

When the central rotational axis 6 is tilted 90 degrees with respect to the vertical direction within a plane perpendicular to the direction of the reference optical axis, the developed image becomes an image in which the vertical direction in the image plane thereof is tilted 90 degrees with respect to the inherently appropriate direction thereof, as shown in FIG. 4.

This tilt is therefore corrected by implementing image rotation processing for the landscape-type developed image. More specifically, the Y-axis angle sensor 12 built into the wide-angle imaging device 8 is used to measure the tilt angle of the central rotational axis 6 of the wide-angle imaging device 8 with respect to the vertical direction, assuming that the clockwise direction, as viewed from the + direction of the Y-axis, is the positive direction.

The developed image is rotated by means of image processing computation through the tilt angle thus obtained, assuming that clockwise rotation is the positive rotation.

Processing into an output image will next be described.

Figure 5:
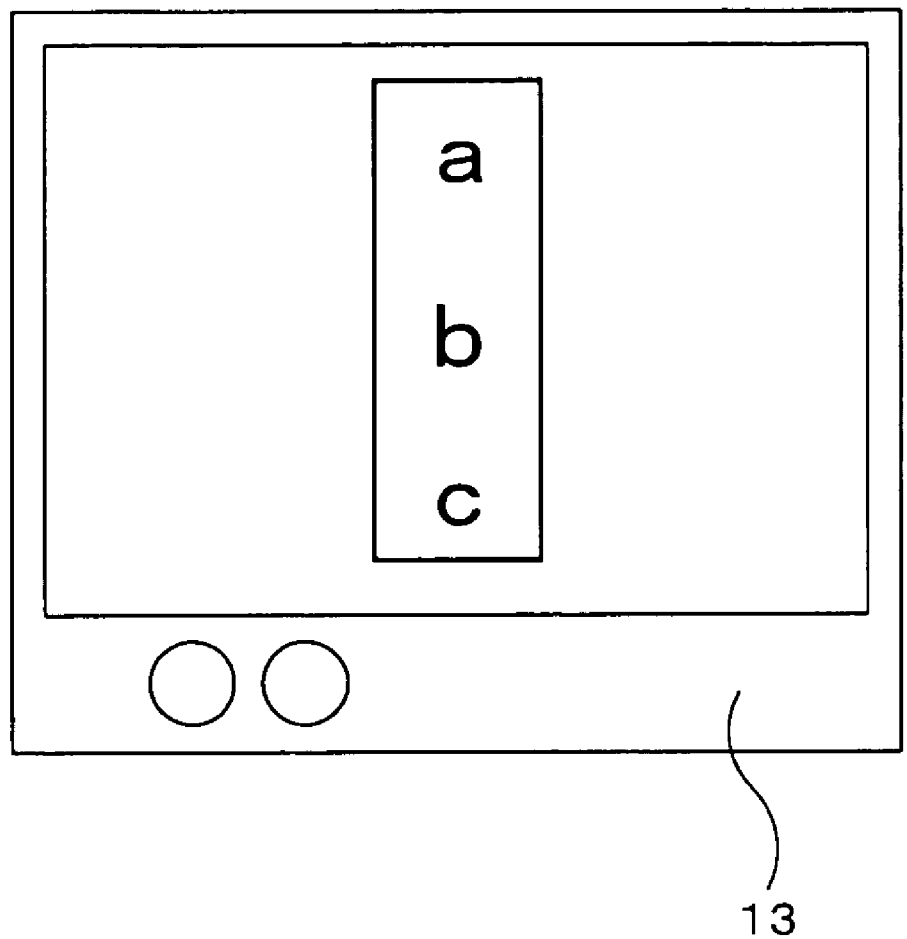
FIG. 5 is a schematic diagram of the output image that is output on the TV monitor in the same embodiment.
Figure 6:
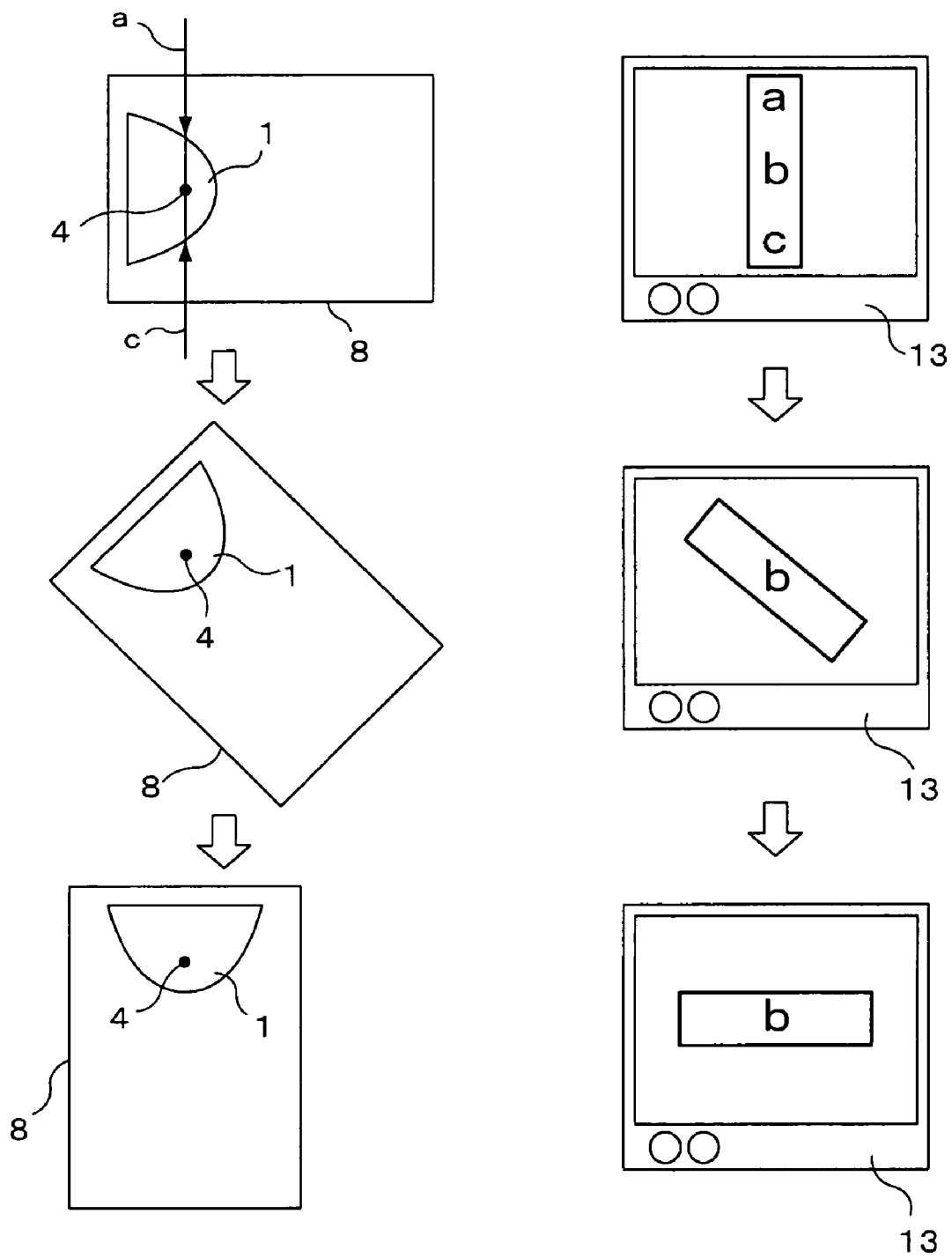
FIG. 6 is a schematic diagram showing rotations of the wide-angle imaging device and the resultant output images.

Development processing and tilt correction processing of the wide-angle image are performed with the image in a digitized state. Therefore, processing is performed for converting the digitized image into a suitable format for display, such as the NTSC format, for example. More specifically, a margin area is added first in the digital data stage to adapt the image size to an NTSC size. This margin area may be an area with a luminance of zero, and also may contain some kind of information (for example, a background image, a caption displaying the time when the image was taken, or the like). The now NTSC-sized digital data is then converted to NTSC by constructing a circuit using an existing NTSC encoder chip or the like. Even with a developed image such as the one depicted in FIG. 4, the output image is displayed on the TV monitor 13 in a state in which the horizontal direction in the image conforms or substantially conforms to the actual horizontal direction, as depicted in FIG. 5.

Also, the output format is not limited to NTSC, and may be a PAL or other format.

A configuration is also adopted here in which the central rotational axis 6 is tilted 90 degrees, but the tilt angle is not limited to 90 degrees. In this regard, however, a tilt angle of 90 degrees is advantageous, in that application can be made to an ATM (automated teller machine), vending machine, or other monitoring application, for example, because a field of view with 180 degrees in the vertical direction that is difficult to achieve with an ordinary wide-angle optical system is obtained, and thus the face, hands, and feet of a person standing near the present device can be included in a single image.

The present invention is also not limited to the case in which the central rotational axis 6 is tilted at an arbitrary angle, and the wide-angle imaging device 8 is fixed. For example, as depicted schematically in FIG. 6, the wide-angle imaging device 8 may be rotated at a constant speed about the reference optical axis as the axis of rotation thereof, and the output image thereof may be output to the TV monitor 13. At this time, the output image also turns within the TV monitor at a constant speed, but the horizontal direction of the contents of the image conforms to the horizontal direction of the TV monitor, which enables use in specialized displays used for public events and the like.

Also, in Embodiment 1, the tilt correction processing entails performing a control whereby the horizontal direction within the developed image conforms to the horizontal direction of the output image, but this configuration is not limiting. It is possible, for example, to adopt a control whereby the deviation of the horizontal direction within the developed image from the horizontal direction of the output image is made constant, or a control whereby the deviation of the horizontal direction within the developed image from the horizontal direction of the output image is changed according to a specific rule.

Also, in Embodiment 1, a configuration is adopted whereby the hyperbolic reflecting mirror 1 has a ±90-degree reflecting plane, but this configuration is not limiting. The range thereof may be at least ±90 degrees or less.

Also, in Embodiment 1, the Y-axis angle sensor 12 is attached to the wide-angle imaging device 8 and obtains tilt information. As an alternate method, tilt information may also be obtained using image processing in the computational processing device 11.

More specifically, photographic conditions may be defined such that a picture is taken and an object that serves as a reference for angular measurement is introduced into the developed image thus obtained. The tilt angle of this object within the developed image is then found by means of image processing, and the tilt angle during processing into the output image is defined such that this angle is constant. This method has the advantage of eliminating the need for an angle sensor.

Also, in Embodiment 1, processing is performed in the developed image generating unit 9 for generating a developed image from a wide-angle image, and tilt correction processing and processing into an NTSC or other output image is performed in the output image generating unit 10, but a configuration may be adopted whereby tilt correction of the developed image is performed in the developed image generating unit 9 at the same time as the developed image is generated, with processing into an output image being the only action performed in the output image generating unit 10.

More specifically, the corresponding point of each of the pixels of the developed image on the wide-angle image is determined by a method such as was described as a conventional technique, and the luminance value of each pixel of the developed image is determined accordingly. A tilt-corrected developed image is thus generated by systematically storing the luminance value of each of the pixels thus obtained in a location on the memory (not pictured) within the developed image generating unit 9 according to the tilt of the developed image. The amount of tilt in the developed image at this time is picked up by the Y-axis angle sensor 12. The tilt-corrected developed image is received in the output image generating unit 10, and processing into an output image is performed.

Adopting a configuration such as this has the advantage of producing an increase in processing speed, because generation and tilt correction of the developed image can be performed simultaneously.

Thus, in accordance with Embodiment 1, the output of the wide-angle image-generating device can consist of an image in which the horizontal direction of the image conforms to the horizontal direction of the TV monitor 13, and which gives no sense of discomfort to the viewer, even when the central rotational axis 6 of the wide-angle imaging device 8 is tilted from the vertical direction in a plane perpendicular to the direction of the reference optical axis thereof.

Embodiment 2

Figure 7:
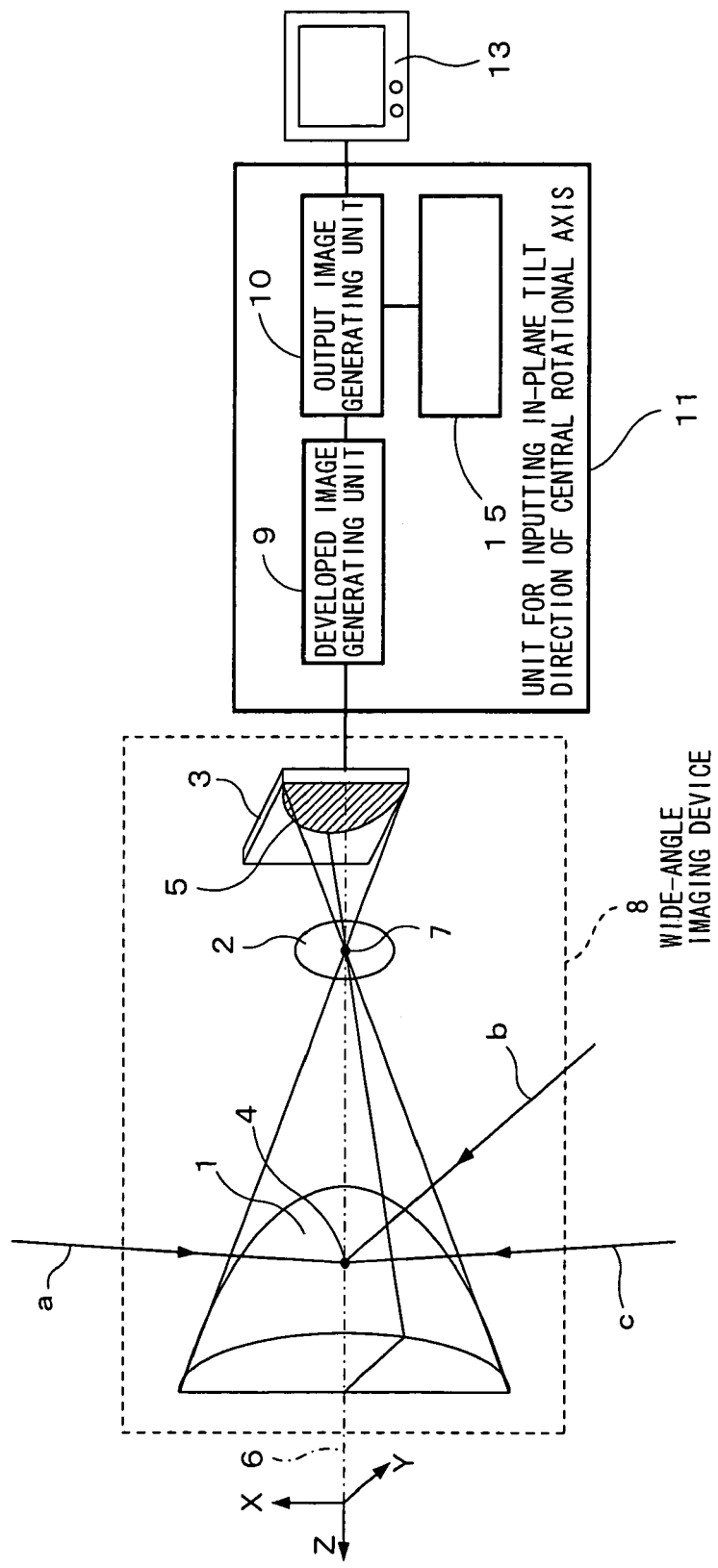
FIG. 7 is a schematic diagram of the wide-angle image-generating device (Embodiment 2) of the present invention.

FIG. 7 depicts the wide-angle image-generating device (Embodiment 2) of the present invention.

This embodiment differs from the Embodiment 1 depicted in FIG. 1 in that the Y-axis angle sensor 12, which acts as a unit for detecting the in-plane tilt direction of the central rotational axis, is omitted, and that a unit 15 for inputting the in-plane tilt direction of the central rotational axis, to which the in-plane tilt direction of the central rotational axis is inputted and set by manual operation, is provided to the computational processing device 11.

The operation of the wide-angle image-generating device configured in this manner will be described based on the parts thereof that differ from Embodiment 1.

The unit 15 for inputting the in-plane tilt direction of the central rotational axis comprises a variable resistor or other input setting device. The value of the tilt angle with respect to the vertical direction in a plane perpendicular to the direction of the reference optical axis of the central rotational axis 6 of the wide-angle imaging device 8, stored as numerical data in the output image generating unit 10, is set via this input setting device. Other operations are the same as in Embodiment 1.

Thus, in accordance with Embodiment 2, the device as a whole can be constructed at lower cost, because the device can be constructed without the Y-axis angle sensor 12. Also, the unit 15 for inputting the in-plane tilt direction of the central rotational axis was defined as a variable resistor or other input setting device, but this unit is not limited to this embodiment. For example, the numerical data stored in the output image generating unit 10 may be rewritten from outside the output image generating unit 10 using a personal computer, and the unit 15 for inputting the in-plane tilt direction of the central rotational axis may comprise a connection unit between the output image generating unit 10 and the personal computer.

In the embodiment described above, the unit 15 for inputting the in-plane tilt direction of the central rotational axis was provided to the computational processing device 11, but a variable resistor or other input setting device for inputting the in-plane tilt direction of the central rotational axis into the output image generating unit 10, or the connection unit between the output image generating unit 10 and a personal computer, may be provided specifically to the wide-angle imaging device 8.

Also, in Embodiment 2, the hyperbolic reflecting mirror 1 has a reflecting plane of ±90 degrees, but this configuration is not limiting. The range thereof may be ±90 degrees or less.

Embodiment 3

Figure 8:
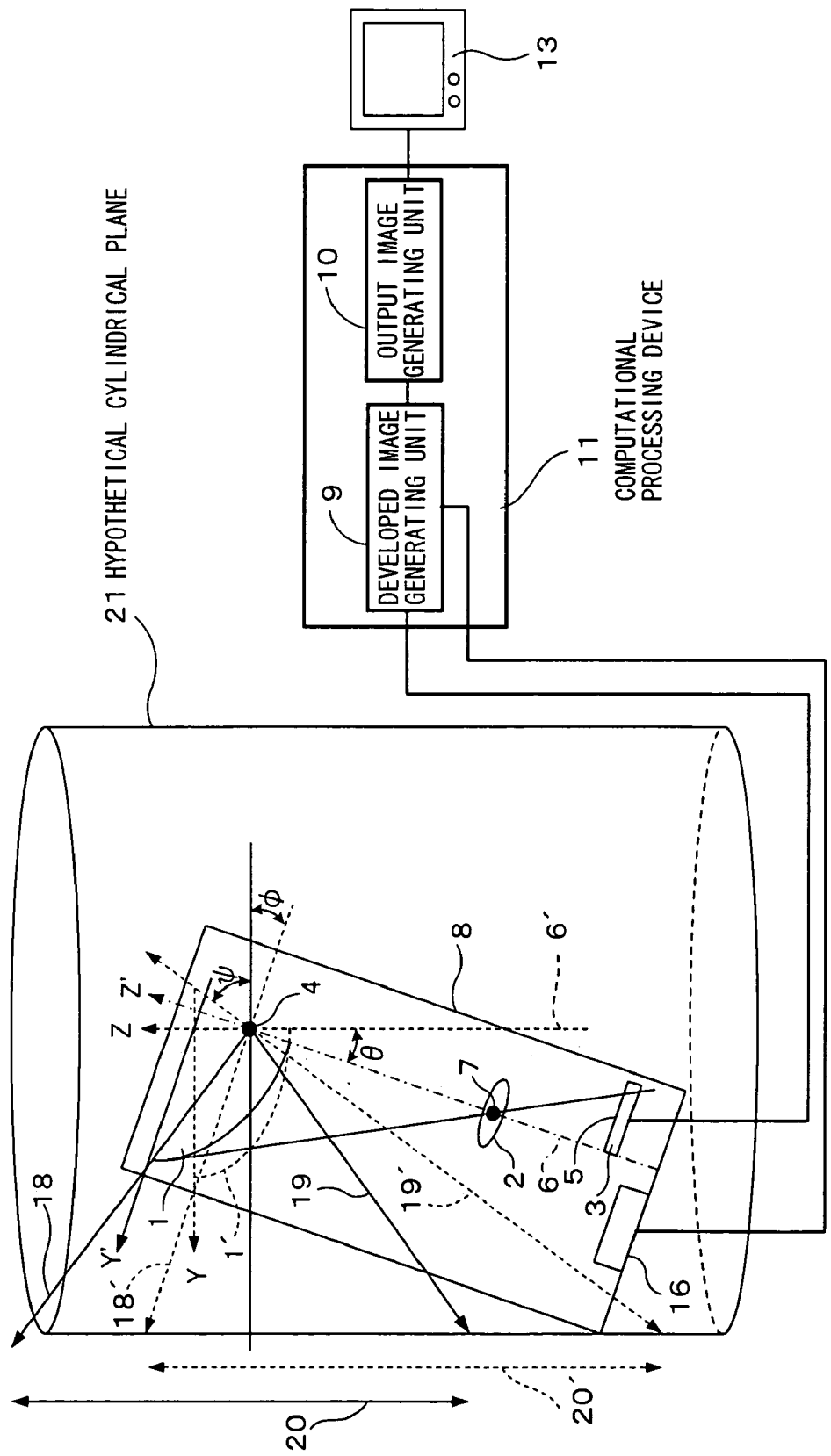
FIG. 8 is a structural diagram of the wide-angle image-generating device (Embodiment 3) of the present invention as viewed from the X-axis direction (vertical direction)

FIG. 8 depicts the wide-angle image-generating device of Embodiment 3.

In FIG. 8, 1' represents the position of a reference-state hyperbolic reflecting mirror. 6' represents the position of a reference-state central rotational axis. The reference-state central rotational axis 6' is defined as conforming or substantially conforming to a horizontal direction, and is in a state prior to being tilted. The hyperbolic reflecting mirror 1, image-forming lens 2, imaging element 3, internal focal point 4 of the hyperbolic reflecting mirror 1, imaging plane 5 of the imaging element 3, central rotational axis 6 of the hyperbolic reflecting mirror 1, and principal point 7 of the image-forming lens 2 are the same as in Embodiment 1.

As for differing aspects thereof, the central rotational axis 6 is disposed so as to be tilted at a tilt angle e about the internal focal point 4 with respect to the reference-state central rotational axis 6' within the plane that includes the reference optical axis d the central rotational axis 6, and the measurement direction of the X-axis angle sensor 16 is the tilt angle θ.

18' and 19' represent the field-of-view limits of the wide-angle imaging device 8 in a reference state; 20' represents the field-of-view range of the wide-angle imaging device 8 in a reference state; 18 and 19 represent the field-of-view limits of the wide-angle imaging device 8 when the central rotational axis 6 is tilted at a tilt angle θ from the reference state (when inclined); and 20 represents field-of-view range of the wide-angle imaging device 8 when the central rotational axis 6 is tilted at a tilt angle θ from the reference state (when inclined). 21 represents a hypothetical cylindrical plane, which is a hypothetical projection plane used for mapping from a wide-angle image to a developed image.

The wide-angle image with a 180-degree angle obtained from the wide-angle imaging device 8 is then processed in the developed image generating unit 9 to convert the wide-angle image to a developed image in accordance with a hereinafter described algorithm, using the output of the X-axis angle sensor 16. The developed image obtained from the developed image generating unit 9 is converted into NTSC format in the output image generating unit 10.

13 is the same as in Embodiment 1, and is a TV monitor for displaying the output image from the computational processing device 11.

Also, the reference-state central rotational axis 6' and central rotational axis 6 conform to a horizontal direction in this configuration, but this configuration is not limiting.

The operation thereof will next be described using FIG. 8, based on the parts thereof that differ from Embodiment 1.

The operation whereby a wide-angle image with a 180-degree field of view is obtained from the wide-angle imaging device 8 is the same as in Embodiment 1. The difference is that the field of view is changed by a tilt angle θ from the reference-state field-of-view range 20' depicted in FIG. 8 to the inclined field-of-view range 20.

In the computational processing device 11, conversion processing to a developed image in the developed image generating unit 9 is performed for the wide-angle image that is output from the wide-angle imaging device 8. In this processing, the method of defining the correspondence relation between an arbitrary point P in space and a point p on the imaging plane 5 (specifically, a point on the wide-angle image) is the same as in Embodiment 1. The difference is in the imaging plane used in defining the developed image, or specifically, the method of defining the point P in space. More specifically, a hypothetical cylindrical plane 21 such as the one depicted in FIG. 8 is defined. Usually, an arrangement is conceived in which the central axis of the hypothetical cylindrical plane 21 conforms to the central rotational axis 6, but the central axis of the hypothetical cylindrical plane 21 in Embodiment 3 is tilted by—θ about the internal focal point 4 with respect to the inclined central rotational axis 6 within the plane that includes the reference optical axis and the central rotational axis 6, where θ is the tilt angle of the inclined central rotational axis 6 with respect to the reference-state central rotational axis 6' obtained from the X-axis angle sensor 16. Specifically, the central axis of the hypothetical cylindrical plane 21 is made to conform to the reference-state central rotational axis 6'. The luminance of the point on the developed image that corresponds to the arbitrary spatial point P on the hypothetical cylindrical plane 21 thus determined is found using the luminance value of the point p on the wide-angle image that corresponds to the spatial point P, and a developed image is thus created.

Also, the wide-angle imaging device 8 takes the internal focal point 4 as the center of rotation when tilted from the reference state, but thins configuration is not limiting. In that regard, however, a configuration in which the center of rotation conforms or substantially conforms to the internal focal point 4 is advantageous, in that the tilt angle can be adjusted while the vantage point of the wide-angle imaging device 8 is nearly constant.

Processing for converting to an output image is performed in the output image generating unit 10 for the developed image created by processing in the developed image generating unit 9 as described above. The "tilt correction processing" that was included in Embodiment 1 is absent in Embodiment 3, which only includes processing into an output image. Processing into an output image includes the same processing as is performed in Embodiment 1.

Thus, in accordance with Embodiment 3, the field-of-view range of the wide-angle image-generating device in the direction of the central rotational axis 6 can be changed by tilting the wide-angle imaging device 8 within the plane that includes the reference optical axis and central rotational axis 6.

Also, the field-of-view range can be altered without changing the position of the line-of-sight center in the developed image (the position for which the elevation angle in the developed image is 0; the position at which a light beam directed towards the internal focal point 4, which is equivalent to the principal point 7 of the image-forming lens 2, intersects perpendicularly with the hypothetical cylindrical plane 21, which acts as the projection plane), by measuring the tilt angle of the wide-angle imaging device 8 with respect to the reference state, and using that value to make the central axis of the hypothetical cylindrical plane 21 (which acts as the projection plane of the developed image) consistently conform to the reference-state central rotational axis 6'. Particularly, a developed image can be obtained such that the line-of-sight center using the field-of-view range as a whole is centered in the width direction of the developed image if θ is defined as (ϕ−ψ)/2 even when the hyperbolic reflecting mirror 1 is constructed such that ϕ<ψ, where ϕ is defined as the absolute value of the angle from the reference optical axis to the reference-state field-of-view limit 18', ψ is defined as the absolute value of the angle from the reference optical axis to the reference-state field-of-view limit 19', and θ is taken to be positive in the clockwise direction in FIG. 8.

Because of this, the distance from the line-of-sight center in the developed image can be minimized, and it is possible to reduce the drawback whereby parts that are distant from the line-of-sight center in the developed image look distorted in comparison with other parts because these parts appear to be more tilted than other parts.

Also, the present invention is not limited to a wide-angle image-generating device in which the wide-angle imaging device 8 is tilted and fixed at an arbitrary angle.

More specifically, the dynamic tilt of the wide-angle imaging device 8 within the plane that contains the reference optical axis (Y-axis) and the central rotational axis 6 can be accommodated by dynamically controlling the tilt of the central axis of the hypothetical cylindrical plane 21 according to the output of the X-axis angle sensor 16 and maintaining conformity thereof to the reference-state central rotational axis 6'.

Also, in Embodiment 3, the hyperbolic reflecting mirror 1 has a reflecting plane of ±90 degrees, but this configuration is not limiting. The range thereof may be ±90 degrees or less.

Also in Embodiment 3, a case was described in which the hypothetical cylindrical plane 21 was tilted by—θ so as to cancel out the tilt angle θ with respect to the reference state of the wide-angle imaging device 8, but this configuration is not limiting.

For example, a control may be adopted whereby the tilt of the central axis of the hypothetical cylindrical plane 21 with respect to the reference-state central rotational axis 6' is defined as a constant value other than 0, or a control may also be adopted whereby the tilt is varied according to a specific rule.

Embodiment 4

Figure 9:
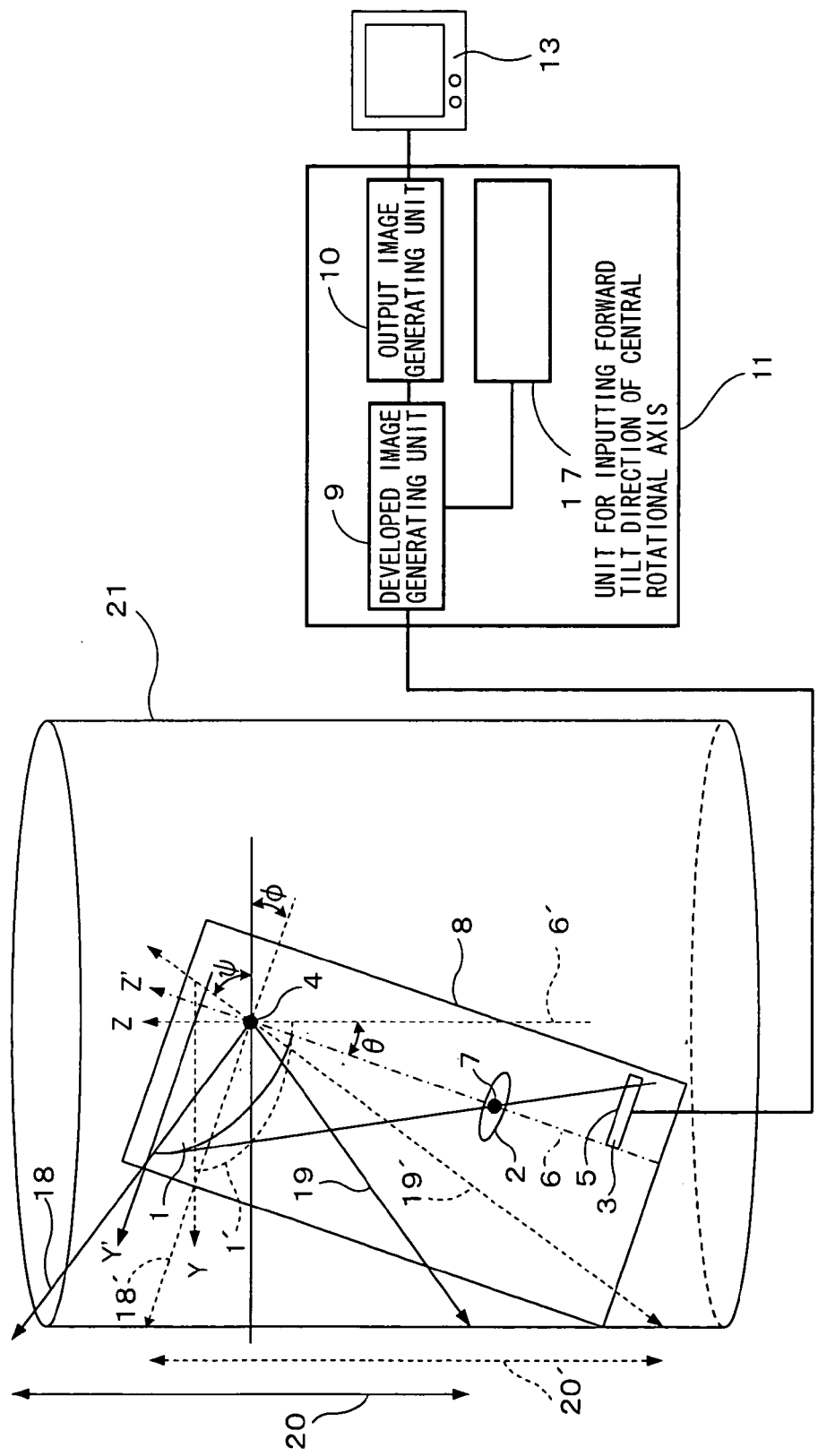
FIG. 9 is a structural diagram of the wide-angle image-generating device (Embodiment 4) of the present invention as viewed from the X-axis direction (vertical direction)

FIG. 9 depicts the wide-angle image-generating device of Embodiment 4 of the present invention.

The difference from the arrangement of Embodiment 3 is that the X-axis angle sensor 16 is omitted, and a unit 17 for inputting the forward tilt direction of the central rotational axis is provided to the computational processing device 11.

The operation of this wide-angle image-generating unit will be described based on the parts thereof that differ from Embodiment 3.

The unit 17 for inputting the forward tilt direction of the central rotational axis comprises a variable resistor or other input setting device. The value of the tilt angle of the central rotational axis 6 with respect to the reference-state central rotational axis 6' in a plane that contains the reference optical axis (Y-axis) of the wide-angle imaging device 8 and the central rotational axis 6, stored as numerical data in the developed image generating unit 9, is set/changed via this input setting device. Other operations are the same as in Embodiment 3.

Thus, in accordance with Embodiment 4, the device as a whole can be constructed at lower cost, because the X-axis angle sensor 16 can be omitted. The unit 17 for inputting the forward tilt direction of the central rotational axis is provided to the computational processing device 11 in this configuration, but a configuration is also possible wherein the unit 17 for inputting the forward tilt direction of the central rotational axis is provided to the wide-angle imaging device 8.

Also, the unit 17 for inputting the forward tilt direction of the central rotational axis here comprises a variable resistor or other input setting device, but this unit is not limited to this form. For example, rewriting of the numerical data stored in the developed image generating unit 9 may be performed from outside the developed image generating unit 9 using a personal computer, and the unit 17 for inputting the forward tilt direction of the central rotational axis may comprise a connection unit between the developed image generating unit 9 and the personal computer. This connection unit is provided to the wide-angle imaging device 8, or to the computational processing device 11.

Also, in Embodiment 4, the hyperbolic reflecting mirror 1 has a reflecting plane of ±90 degrees, but this configuration is not limiting. The range thereof may be ±90 degrees or less.

Also, in Embodiment 4, a case was described in which the hypothetical cylindrical plane 21 was tilted by—θ so as to cancel out the tilt angle θ with respect to the reference state of the wide-angle imaging device 8, but this configuration is not limiting. For example, when the tilt angle θ of the wide-angle imaging device 8 with respect to the reference state is 0, the hypothetical cylindrical plane 21 may be tilted alone. If this is done, it becomes possible to change the line-of-sight center while the wide-angle imaging device 8 remains fixed in place.

According to the present invention as heretofore described, the output of the wide-angle image-generating device may consist of an image in which the horizontal direction of the image conforms to the horizontal direction of a TV monitor, and which gives no sense of discomfort to the viewer, even when the central rotational axis of the wide-angle imaging device is tilted from the vertical direction in a plane perpendicular to the direction of the reference optical axis thereof.

Also, the field-of-view range can be altered without changing the position of the line-of-sight center in the developed image, even when the wide-angle imaging device is in a tilted state with respect to a reference state within a plane that includes the central rotational axis and reference optical axis thereof, by measuring the tilt angle thereof, and using that value to make the central axis of the hypothetical cylindrical plane (which acts as the projection plane of the developed image) consistently conform to the reference-state central rotational axis. Furthermore, a developed image can be obtained such that by using the field-of-view range as a whole, the line-of-sight center is centered in the width direction of the developed image. Because of this, it is possible to minimize the maximum distance of an arbitrary point in the developed image from the line-of-sight center, and to reduce the drawback whereby parts that are distant from the line-of-sight center in the developed image look distorted in comparison with other parts because these parts appear more tilted than other parts.

Based on Embodiments 5 through 7 depicted in FIGS. 10 through 32, a description will be given of a wide-angle image-generating device capable of overcoming the drawback whereby if a wide-angle imaging device is conceived that would pick up an image within the reflected image made by the reflecting plane that includes only about ±90 degrees of a reference direction, which is any direction perpendicular to the central rotation axis of the reflecting plane, the resulting developed image is incorrect because of image deformation arising from the tilt of the optical axis of the imaging device and optical strain when the same processing is applied to the wide-angle image as in the case of the omnidirectional camera in an attempt to obtain a developed image.

Embodiment 5

FIGS. 10 through 23, and FIG. 30 depict Embodiment 5 of the present invention.

Figure 10:
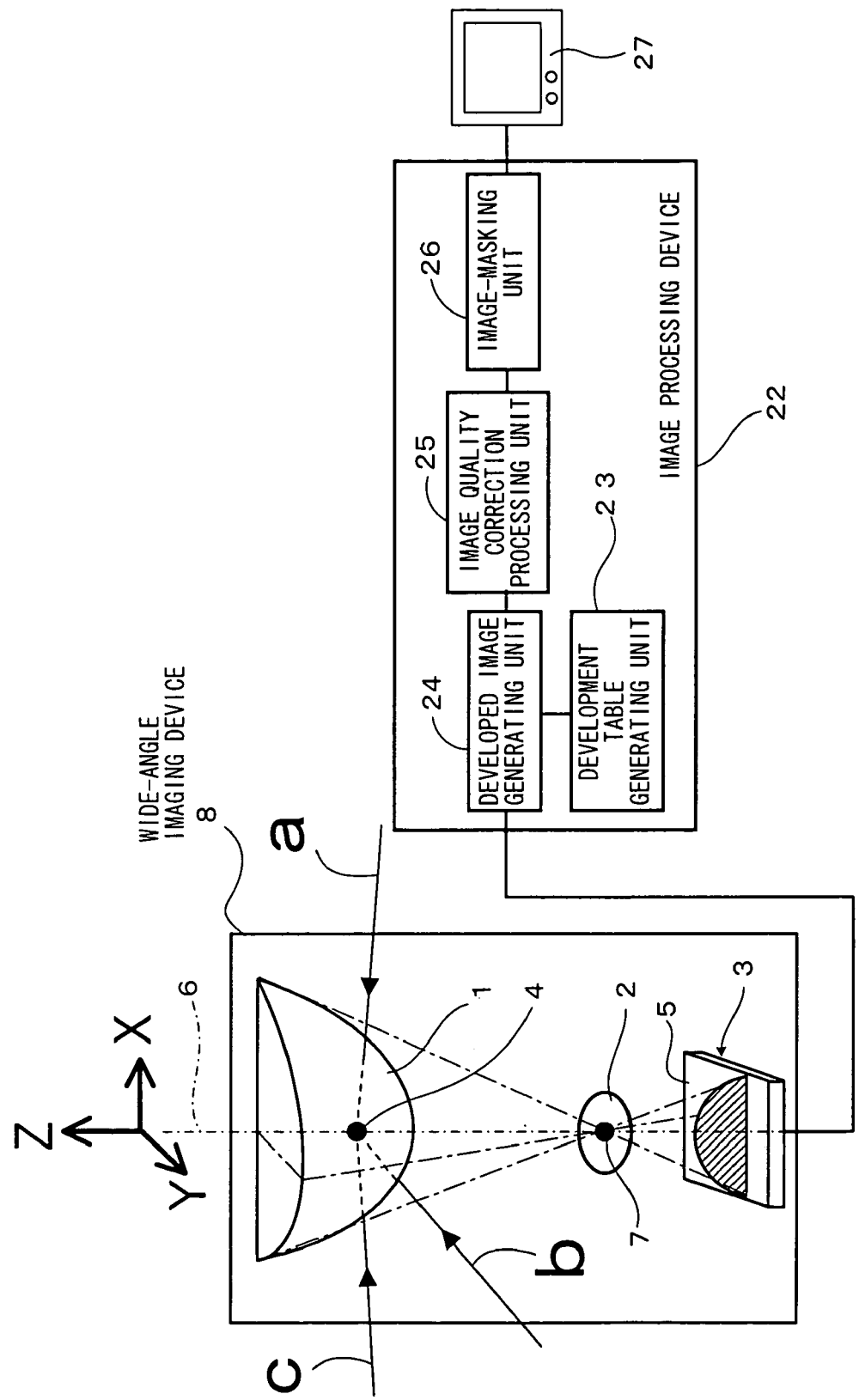
FIG. 10 is a structural diagram of the wide-angle image-generating device (Embodiment 5) of the present invention.
Figure 12:
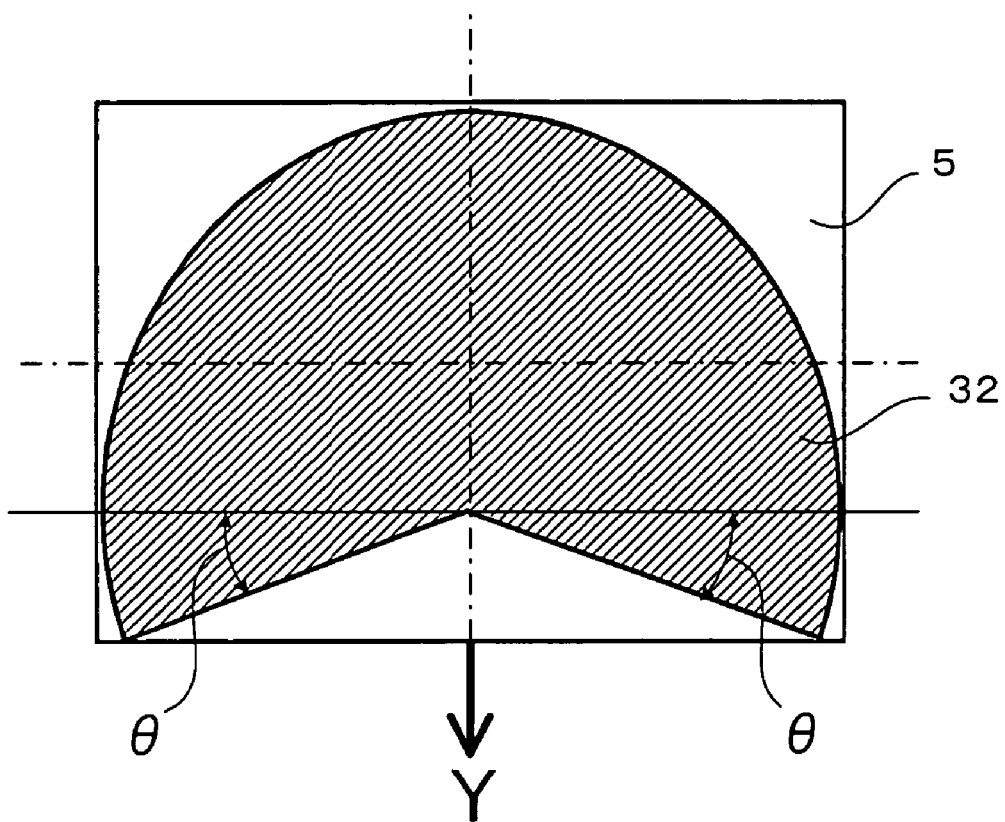
FIG. 12 is a schematic diagram of images linked together on the imaging plane in the wide-angle image-generating device of the same embodiment.

FIG. 10 depicts the wide-angle image-generating device in Embodiment 5 of the present invention.

The coordinate axes are defined as follows: the up-down direction of the paper surface is the Z-axis, the direction away from the paper surface toward the viewer is the Y-axis, and the left-right direction of the paper surface is the X-axis. The Z-axis also conforms to the vertical direction.

This wide-angle image-generating device comprises a wide-angle imaging device 8 for forming an image of the reflected image made by the reflecting mirror, and an image-processing device 22.

The wide-angle imaging device 8 will first be described.

The wide-angle imaging device 8 is composed of a hyperbolic reflecting mirror 1, an image-forming lens 2, and a CCD or other imaging element 3. The imaging device is also composed of an image-forming lens 2 and an imaging element 3.

The hyperbolic reflecting mirror 1 has a reflecting plane of ±90 degrees about the central rotational axis of the hyperbolic plane. The 0-degree direction thereof is referred to as the direction of the reference optical axis, and conforms to the direction of the Y-axis.

4 is the internal focal point of the hyperbolic reflecting mirror 1. 5 is the imaging plane of the imaging element 3. 6 is the central rotational axis of the hyperbolic reflecting mirror 1. The central rotational axis 6 here conforms to the Z-axis (vertical direction). Light beams a, b, and c propagated towards the internal focal point 4 are reflected in the reflecting plane of the hyperbolic reflecting mirror 1, and are condensed to an external focal point (not pictured) on the central rotational axis 6. The position of this external focal point and the position of the principal point 7 of the image-forming lens 2 are disposed so as to substantially conform to each other, and the light beams a, b, and c form an image on the imaging plane 5 of the imaging element 3 via the image-forming lens 2. The optical axis that is held in common by the image-forming lens 2 and the imaging element 3 in this configuration (not pictured) is disposed so as to be tilted in the direction of the reference optical axis with respect to the central rotational axis 6 of the hyperbolic reflecting mirror 1. This tilted configuration will be explained hereinafter, using FIG. 11.

Also, the image-forming lens 2 is described in FIG. 10 as constituting a single lens element, but may also constitute multiple lens elements.

The image-processing device 22 will next be described.

The image-processing device 22 is composed of a development table generating unit 23, a developed image generating unit 24, an image quality correction processing unit 25, and an image-masking unit 26.

In the development table generating unit 23, computation is carried out in accordance with an algorithm defined according to the shape of the hyperbolic reflecting mirror 1 and the optical characteristics and position of the image-forming lens 2 and imaging element 3, and processing is performed for computing a development table that is used in converting the wide-angle image obtained from the wide-angle imaging device 8 into a developed image. This algorithm will be described hereinafter.

In the developed image generating unit 24, processing is performed for converting the wide-angle image into a developed image, while referring to the development table obtained from the development table generating unit 23.

In the image quality correction processing unit 25, the image quality is corrected (described hereinafter) for the developed image generated in the developed image generating unit 24.

In the image-masking unit 26, image masking (described hereinafter) is performed for the post-image quality correction developed image generated in the image quality correction processing unit 25. 27 is a monitor for displaying the output image from the image-processing device 22.

The structure of the wide-angle imaging device 8 will next be described in detail using FIG. 11.

FIG. 11(a) is a cross-sectional view of the wide-angle imaging device 8 in a YZ space, and depicts the basic structure thereof. As for aspects thereof that differ from the omnidirectional camera 100, the hyperbolic reflecting mirror 1 has a reflecting plane that covers an area of ±90 degrees about the central rotational axis of the hyperbolic plane; and the principal point 7 of the image-forming lens 2 and the external focal point of the hyperbolic reflecting mirror 1, while made to substantially conform to each other, are disposed such that the optical axis 28 shared by the image-forming lens 2 and imaging element 3 is tilted by angle γ in the direction of the reference optical axis (Y-axis direction) with respect to the central rotational axis 6. Also, $2_0$ and $3_0$ indicated by the dashed lines represent an image forming lens and an imaging element that are disposed in the same manner as in the omnidirectional camera 100 depicted in FIG. 34(a).

The light beams 29a and 29b in the YZ plane, propagated towards the internal focal point 4, are reflected at the incident points 30a and 30b on the hyperbolic reflecting mirror 1 and are condensed to an external focal point (not pictured) on the central rotational axis 6. The position of this external focal point and the position of the principal point 7 of the image-forming lens 2 are disposed so as to substantially conform to each other, and the light beams 29a and 29b form an image at the image forming points 31a and 31b on the imaging plane 5 of the imaging element 3 via the image-forming lens 2.

Also, the image forming points of the light beams 29a and 29b become $31a_0$ and $31b_0$ in the case in which the image-forming lens $2_0$ and imaging element $3_0$ are used. The image thus obtained becomes a semicircular image such as the one represented by $32_0$, indicated by the dashed line in FIG. 11(b), in the case in which the image-forming lens $2_0$ and imaging element $3_0$ are used. This image is exactly the same as if the circular image 111 in FIG. 34(b), obtained by means of the omnidirectional camera 100, were divided in half. Thus, a 180-degree wide-angle image can be obtained even when using an image-forming lens $2_0$ and imaging element $3_0$ such as those used in the omnidirectional camera 100. However, the usability of the imaging element $3_0$ in this configuration is extremely poor.

On the other hand, when the image-forming lens 2 and imaging element 3 indicated by the solid lines in FIG. 11(a) are used, the resulting image becomes the semicircular image 32 covered by hatched lines in FIG. 11(b). Specifically, by tilting the optical axis 28, the position of the up-down direction (which corresponds to the Y-axis direction) in the imaging plane 5 of the semicircular image 32 can be shifted. As a result, by adjusting the magnification and adjusting the image forming position and tilt angle γ of the optical axis 28, the length of the semicircular image 32 on the imaging plane 5 can be maximized in the left-right direction, and imaging is possible in which the pixels of the imaging plane 5 are used with maximum efficiency, as in the semicircular image 32.

Also, in Embodiment 5, the semicircular image 32 is formed at a position on the imaging plane 5 such that the arc portion thereof is near the edge of the imaging plane 5, but this configuration is not limiting. For example, an image may be formed such that the string portion of the semicircular image 32 is at a position that is near the edge of the imaging plane 5.

Also, in Embodiment 5, the hyperbolic reflecting mirror 1 has a reflecting plane of ±90 degrees, but this configuration is not limiting. The range thereof may be ±180 degrees or less. For example, when a hyperbolic reflecting mirror 1 with a reflecting plane of ±(90+θ) degrees is used, an image of ±(90+θ) degrees can be obtained, such as the one in FIG. 12.

The operation of the wide-angle image-generating device constituted in this manner will be described in further detail.

The mechanism of image formation in the wide-angle imaging device 8 will first be described.

Light beams a, b, and c in FIG. 10 represent arbitrary light beams from objects. The objects of the light beams are therefore designated as objects a, b, and c. The objects a, b, and c are indicated by the letters "a," "b," and "c" pictured on a screen 33 such as the one depicted in FIG. 13(*a*), and a case is conceived in which the screen 33 is disposed around the Z-axis such that the distance from the Z-axis to the screen surface is fixed, and the plane in which the objects a, b, and c are pictured is visible from the hyperbolic reflecting mirror 1, as shown in FIG. 13(*b*).

Figure 14:
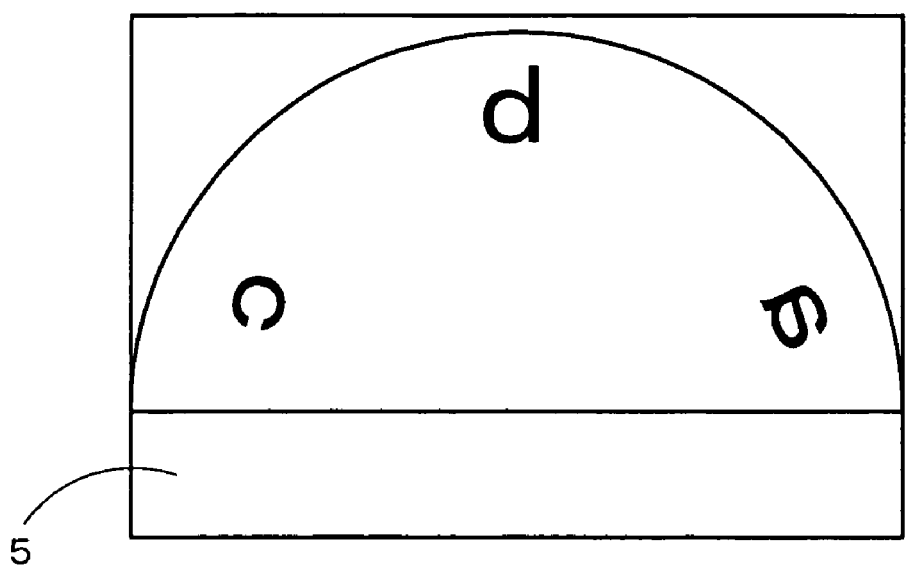
FIG. 14 is a diagram depicting the wide-angle image obtained by means of the same embodiment.

As previously described, the light beams cast on the reflecting plane of the hyperbolic reflecting mirror 1 towards the internal focal point 4 are all reflected towards the external focal point (not pictured), and form an image on the imaging plane 5 of the imaging element 3 via the image-forming lens 2, for which the respective positions of the external focal point and the principal point are disposed so as to conform or substantially conform to each other. Consequently, an image is formed on the imaging plane 5 in a range of ±90 degrees from the direction of the reference optical axis (Y-axis direction). The image obtained at this time by the imaging element 3 is depicted in FIG. 14. It is apparent that the objects a, b, and c are all included therein.

In the image-processing device 22, development processing into a developed image is then performed for the wide-angle image such as the one depicted in FIG. 14 and output from the wide-angle imaging device 8. Computation of a development table for use in development processing is first performed in the development table generating unit 23, as an initial step prior to the start of development processing. This development table is a table of coordinate values on the wide-angle image that correspond to each pixel of the developed image. The flow of processing performed in the development table generating unit 23 is shown in FIG. 15.

Figure 15:
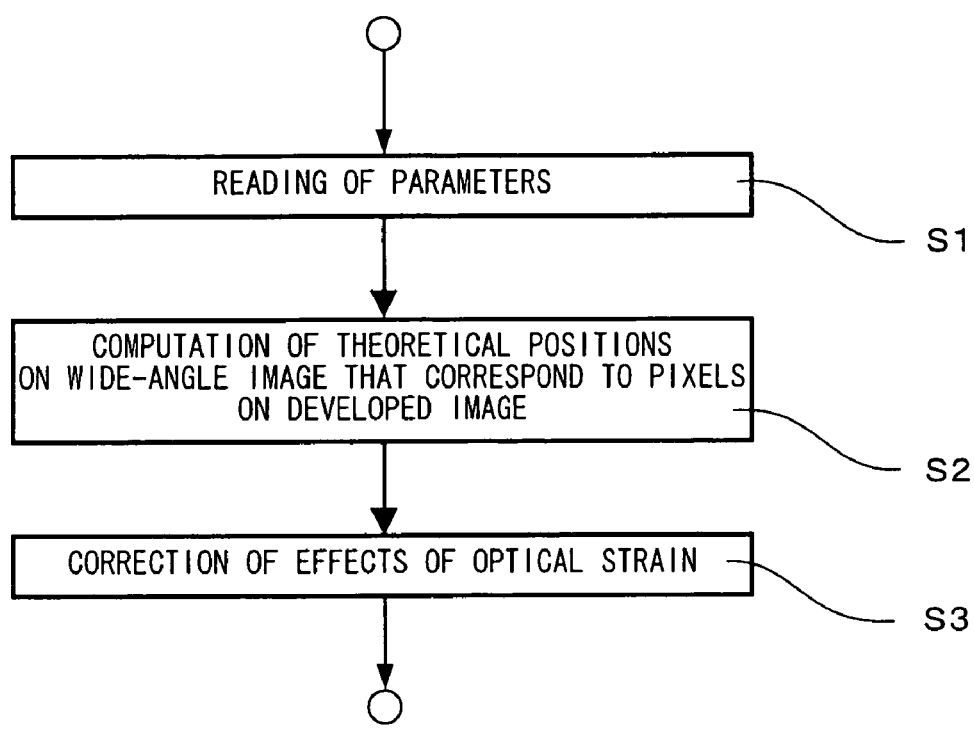
FIG. 15 is a flow diagram of development table creation in the same embodiment.

Step S1 in FIG. 15 entails reading the shape parameters of the reflecting plane of the hyperbolic reflecting mirror 1, the focal distance of the imaging device, and other information necessary for computing the development table. A configuration may be adopted whereby this information is written and read in ROM within the development table generating unit 23. Of course, a configuration may also be adopted that involves inputting from the outside by any method.

In step S2, computation of each pixel in the development table is performed. The development table is generated by systematically determining the corresponding point in the wide-angle image for each pixel of the developed image, itself accomplished by defining the projection plane of the developed image and taking into account the mapping from the wide-angle image to the projection plane. The details of this corresponding point determining method will be described hereinafter.

In step S3, the effects of optical strain in the imaging device that comprises the image-forming lens 2 and imaging element 3 are corrected for the development table computed in step S2. The details of this correction method will also be described hereinafter.

The development table computed according to the flow as described above is stored in RAM within the development table generating unit 23.

Here, the method for determining correspondence points between the wide-angle image and the projection plane in step S2 will be described in detail using FIGS. 16 through 19.

Figure 16:
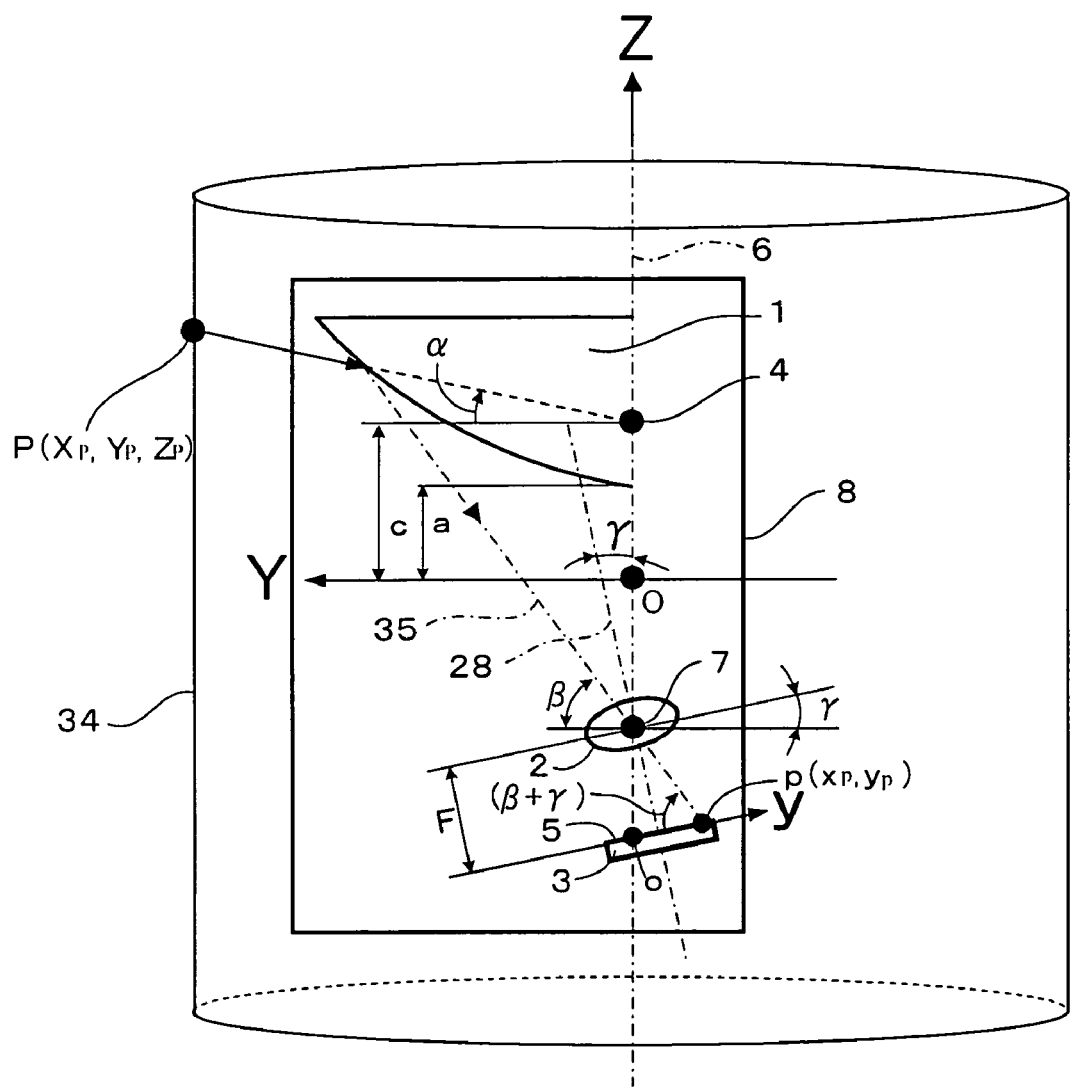
FIG. 16 is a structural diagram of the wide-angle imaging device of the same embodiment.

FIG. 16 is a schematic diagram depicting a cross-section of the wide-angle imaging device 8 in a plane (YZ plane) that includes the central rotational axis 6 and the direction of the reference optical axis thereof. The hyperbolic reflecting mirror 1, image-forming lens 2, imaging element 3, internal focal point 4, imaging plane 5, central rotational axis 6, and principal point 7 are identical to those described in FIG. 11.

34 is a hypothetical projection plane used for mapping from a wide-angle image. Here, the hypothetical projection plane 34 defines a cylindrical plane whose central rotational axis conforms to the central rotational axis 6 of the hyperbolic reflecting mirror 1. Also, the hypothetical projection plane 34 is not limited to a cylindrical plane, and may consist of a spherical plane, for example. 35 is a light beam emitted from an arbitrary point $P(X_P, Y_P, Z_P)$ on the hypothetical projection plane 34 and directed towards the internal focal point 4.

The spatial coordinate system is defined as follows: the Z-axis conforms to the central rotational axis 6, and the origin o is at the point that divides a straight line connecting the internal focal point 4 with the principal point 7 into two equal parts. Also, the direction away from the paper surface toward the viewer is the X-axis, and the left-right direction of the paper surface is the Y-axis. The coordinate system on the wide-angle image (on the imaging plane 5) is defined as follows: the point at which the central rotational axis 6 intersects with the imaging plane 5 is the origin o, the direction away from the paper surface toward the viewer is the x-axis, and the left-right direction of the paper surface as depicted in FIG. 16 is the y-axis.

A point (specifically, a point on the wide-angle-image) $p(x_p, y_p)$ corresponding to the arbitrary point $P(X_P, Y_P, Z_P)$ in space is defined on the hypothetical projection plane 34. The hyperbolic shape of the hyperbolic reflecting mirror 1 is defined by the following formula (Eq. 7), in the same manner as in the case of the omnidirectional camera 100 described in the "background art" section.

$$(X^2+Y^2)/a^2 - Z^2/b^2 = -1 \tag{Eq. 7}$$

In the equation, a and b are constants for determining the shape of the hyperboloid. Also, $$c = (a^2+b^2)^{0.5} \tag{Eq. 8}$$

Eqs. 9 and 10 are also established as in the case of the omnidirectional camera 100:

$$Z=(X^2+Y^2)^{0.5} \cdot \tan \alpha + c \quad \text{(Eq. 9)}$$

$$\tan \alpha = \{(b^2+c^2) \cdot \sin \beta - 2bc\}/\{(b^2-c^2) \cdot \cos \beta\} \quad \text{(Eq. 10)}$$

Here, angle $\alpha$ is the angle formed between the XY plane and the straight line that connects the internal focal point 4 with the arbitrary point P. Angle $\beta$ is the angle formed between the XY plane and the straight line that connects the principal point 7 (which substantially conforms to the external focal point of the hyperbolic reflecting mirror 1) with the point p on the imaging plane 5.

If $X_P$, $Y_P$, and $Z_P$ are defined by Eq. 9, then $\alpha$ is also defined. Also, if $\alpha$, b, and c are defined by Eq. 10, then $\beta$ is also defined.

In the omnidirectional camera 100, subsequently defining the value of F by using Eq. 11 gives $(x^2+y^2)^{0.5}$, specifically, provides the distance from the origin o to point p on the wide-angle image. However, in Embodiment 5, the value of $(x^2+y^2)^{0.5}$ cannot be found correctly by means of Eq. 11, because the imaging plane 5 is tilted to the degree of $\gamma$. Consequently, development processing cannot be performed correctly in this arrangement.

Eq. 13 is therefore used in Embodiment 5.

$$(x^2+y^2)^{0.5}=F \cdot \cos \beta / \cos \gamma / \sin (\beta + \gamma) \quad \text{(Eq. 13)}$$

The method by which Eq. 13 is derived will be described using FIG. 17.

Figure 17:
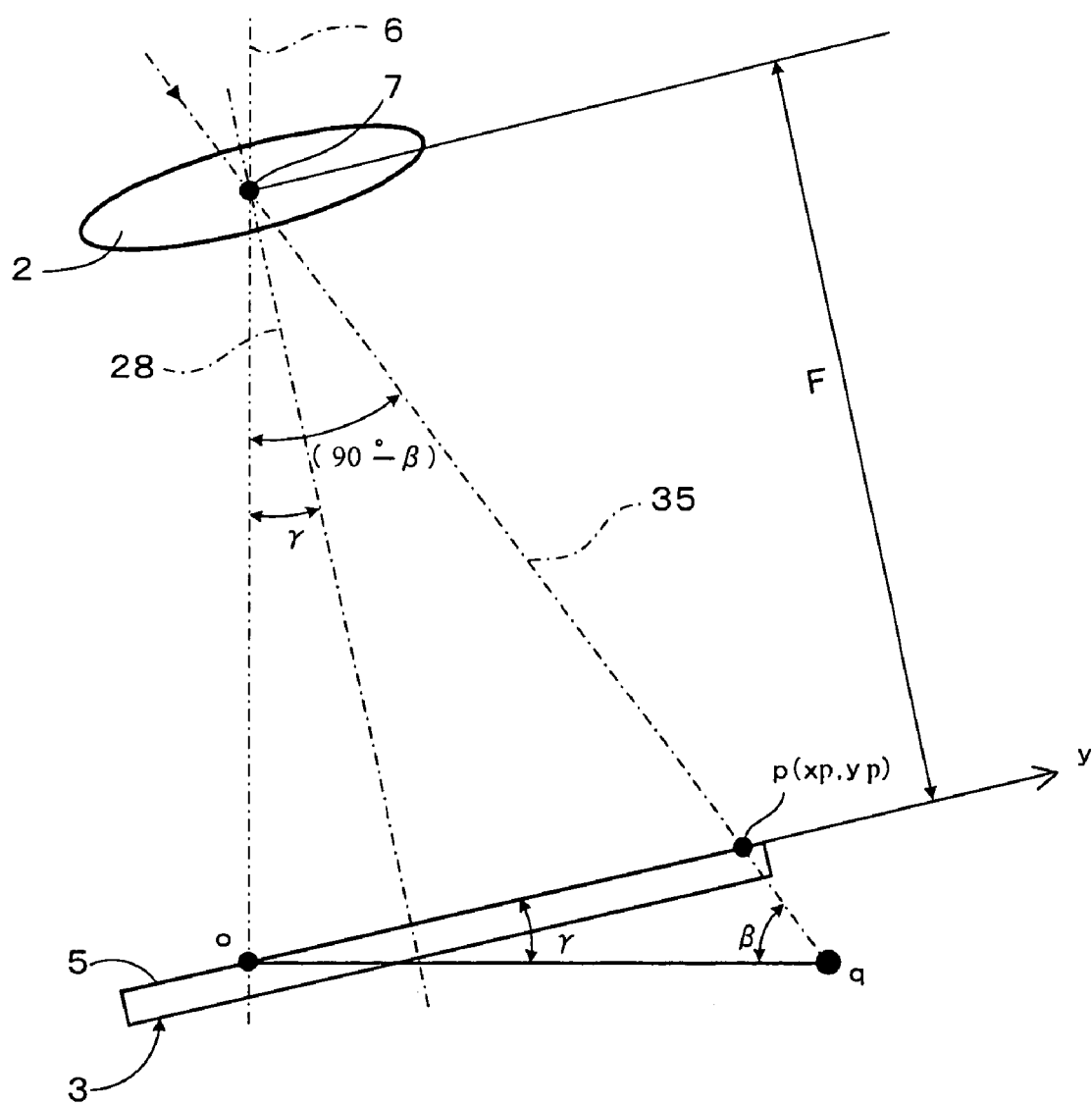
FIG. 17 is a magnified view in the vicinity of the imaging plane in the same embodiment.

FIG. 17 is an enlarged view near the imaging plane 5 of the wide-angle imaging device 8 in FIG. 16. In FIG. 17, q is the point at which a straight line passing through the origin o on the imaging plane 5 within the YZ plane and parallel to the Y-axis intersects with a light beam from an arbitrary point P. At this time, $\angle pqo=\beta$, and $\angle poq=\gamma$. The length $|oq|$ of line segment oq is also indicated by Eq. 14.

$$|oq|=F \cdot \tan (90°-\beta)/\cos \gamma = F/\tan \beta / \cos \gamma \quad \text{(Eq. 14)}$$

Consequently, $|op|$ according to the sine theorem in $\Delta opq$, specifically, $(x^2+y^2)^{0.5}$, is found by means of Eq. 13.

$$(x^2+y^2)^{0.5}=\sin \beta \cdot F/\tan \beta / \cos \gamma / \sin (180°-\beta-\gamma) = F \cdot \cos \beta / \cos \gamma / \sin (\beta+\gamma) \quad \text{(Eq. 13)}$$

Here, F is the focal distance of the imaging device that comprises the image-forming lens 2 and the imaging element 3.

If $X_P$, $Y_P$, and $Z_P$, and b, c, and F are defined by Eqs. 9, 10, and 13, then $(x_p^2+y_p^2)^{0.5}$; specifically, the distance on the imaging plane 5 from the origin o to point p is defined. The arguments above are established for planes that include the Z-axis and that are other than the YZ plane, but it should be noted that the tilt $\gamma$ of the imaging plane 5 changes according to which plane is assumed to be a plane that includes the Z-axis and is other than the YZ plane. This aspect will be described using FIG. 18.

Figure 18:
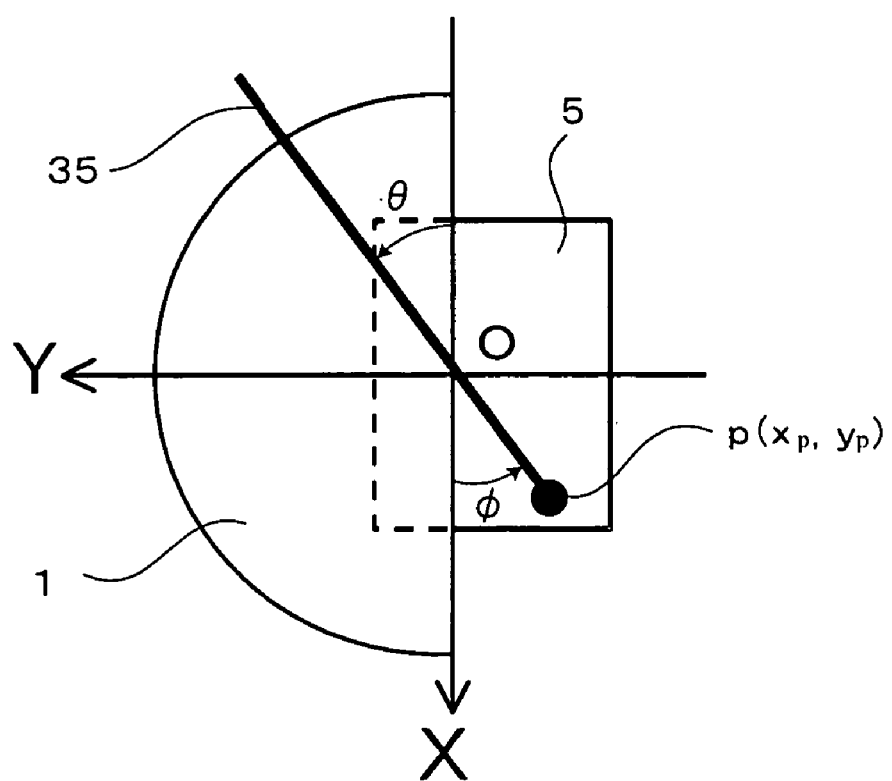
FIG. 18 is a diagram depicting the layout of the hyperbolic reflecting mirror and the imaging plane as viewed from the Z-axis direction in the same embodiment.

FIG. 18 depicts the hyperbolic reflecting mirror 1 and the imaging plane 5 as viewed from the Z-axis direction.

35 represents a light beam emitted from an arbitrary point P (not shown in FIG. 18) on the hypothetical projection plane 34, which is reflected by the hyperbolic reflecting mirror 1 and cast on the point p on the imaging plane 5. As depicted in FIG. 18, angle $\theta$ assumes the –direction of the X-axis as the 0-degree thereof, and rotation to the left as positive. For example, if the light beam 35 is within the YZ plane, then $\theta=90$ degrees. The corresponding relation between $\theta$ and the tilt $\gamma(\theta)$ of the imaging plane 5 is indicated by Eq. 15.

$$\tan \gamma(\theta)=\tan \gamma(90°) \cdot \sin \theta \quad \text{(Eq. 15)}$$

Here, $\gamma(90°)$ is defined as $\gamma$ when $\theta=90°$. Also, Eq. 13 takes the form of Eq. 13a.

$$(x^2+y^2)^{0.5}=F \cdot \cos \beta / \cos \gamma(\theta)/\sin(\beta+\gamma(\theta)) \quad \text{(Eq. 13a)}$$

The distance from the origin o to point p in each plane that includes the Z-axis was obtained by the arguments above. The relationship between the direction $\theta$ from the origin O to point P in the XY plane, and the direction $\phi$ from the origin o to point p in the xy plane, specifically, on the imaging plane 5, will next be considered. Here, $\phi$ is an angle parameter for prescribing the direction of a point on the imaging plane 5 for which the + direction of the X-axis is taken to be 0 degrees, as depicted in FIG. 18.

In the case of the omnidirectional camera 100, $\theta=\phi$, and the directions of point P and point p in the XY plane and xy plane, respectively, conform to each other. However, because the imaging plane 5 is tilted by $\gamma(90°)$ with respect to the XY plane in the case of the wide-angle imaging device 8, the relationship between $\theta$ and $\phi$ assumes the form indicated in Eq. 16.

$$\cos \phi = \cos \theta/(1+\tan^2 \gamma(90°) \cdot \sin^2 \theta)^{0.5} \quad \text{(Eq. 16)}$$

The method by which Eq. 16 is derived will be described using FIG. 19.

Figure 19:
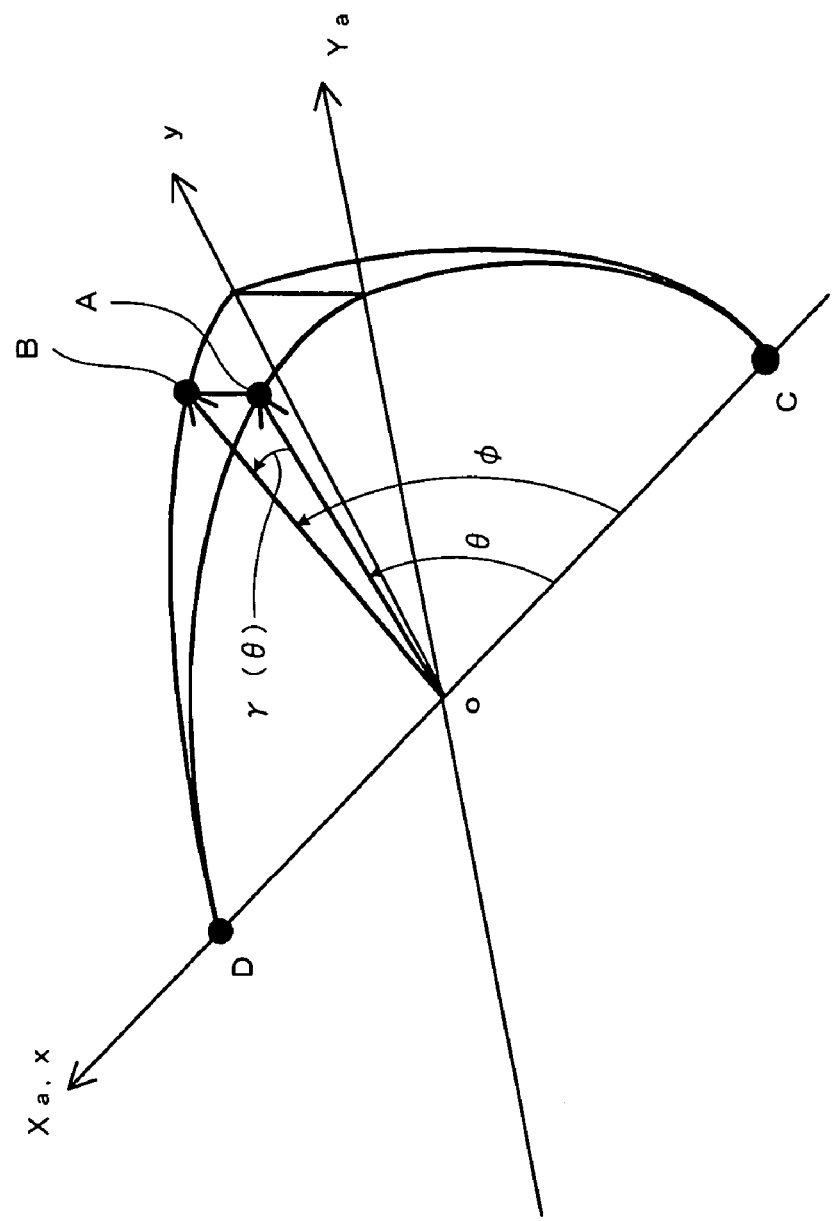
FIG. 19 is a diagram describing the relationship between angle θ on the Xa, Ya plane and angle φ on the xy plane.

The Xa, Ya plane in FIG. 19 is shifted in parallel such that the XY plane is rotated 180 degrees about the Z-axis, and the Xa-axis conforms to the x-axis. Here, $\theta$ is a parameter that is equivalent to $\theta$ in the XY plane, assuming that the –direction of the Xa-axis is 0 degrees, and the clockwise rotation on the Xa, Ya plane is the + direction. Because of this, the parameter name remains unchanged and $\theta$ is used as-is. Also, $\phi$ corresponds to a case in which the –direction of the x-axis is 0 degrees, and the clockwise rotation on the xy plane is the + direction. These settings are established, and the relationship between $\theta$ and $\phi$ is derived. Arc CAD is half of a unit circle. Also, CBD is the line of intersection between a half-column, in which the line of intersection with the Xa, Ya plane is the semicircle CAD perpendicular to the Xa, Ya plane, and the xy plane. At this time, vectors oA and oB become as indicated by Eqs. 17 and 18.

$$oA=(-\cos \theta, \sin \theta, 0) \quad \text{(Eq. 17)}$$

$$oB=(-\cos \theta, \sin \theta, \tan \gamma(90°) \cdot \sin \theta) \quad \text{(Eq. 18)}$$

Consequently, Eq. 16 is found using the inner product with the unit vector $-X$ in the $-x$ direction.

$$\cos \phi = oB \cdot X/|oB| = \cos \theta/(1+\tan^2 \gamma(90°) \cdot \sin^2 \theta)^{0.5} \quad \text{(Eq. 16)}$$

Thus, if $\beta$, $\gamma$ ($=\gamma(90°)$), and F are known, a unique point (specifically, a point on the wide-angle image) $p(x_p, y_p)$ corresponding to $P(X_P, Y_P, Z_P)$ can be defined on the imaging plane 5 by using Eqs. 13a, 15, and 16. The values of $X_P$, $Y_P$, and $Z_P$ are expressed as shown below when M is defined as the radius of the hypothetical projection plane 34, ISX is defined as the number of pixels in the lateral direction (width direction) of the developed image, and ISY is defined as the number of pixels in the longitudinal direction (length direction) thereof.

$$X_P=M \cdot \cos \theta$$

$$Y_P=M \cdot \sin \theta$$

$$Z_P=2\pi \cdot M \cdot (j-j_0)/ISX \quad \text{(Eq. 19)}$$

In the expression θ=180°·i/ISX, i is the set of integer values for the X coordinate on the developed image for which 0≦i<ISX; j is the set of integer values for the Y coordinate on the developed image for which 0≦j<ISY; and $j_0$ is the set of values for the Y coordinate on the developed image when $Z_P$=c (when the line-of-sight direction is the horizontal direction). A point on the developed image can be made to correspond with point $P(X_P, Y_P, Z_P)$ on the hypothetical projection plane 34 by using Eq. 19.

Consequently, an ideal corresponding point on the wide-angle image corresponding to each pixel on the developed image can be determined by defining the projection plane (hypothetical projection plane 34) of the developed image, and taking into account the mapping from the projection plane to the wide-angle image.

A method for correcting the effects of optical strain in the imaging device that comprises the image-forming lens 2 and imaging element 3 in step S3 of FIG. 15 will next be described in detail using FIG. 20.

FIG. 20 schematically depicts the effects of optical strain. If an ideal image were obtained that is free of optical strain, a semicircular image such as the one shown in FIG. 20(a) would be obtained when the angle of view thereof is 180 degrees. In actuality, however, optical strain is included in the optical system, producing a distorted semicircular image, such as the one shown in FIG. 20(b), for example. Because of this, a correct developed image is not obtained if development processing is performed without taking this optical strain into account.

Therefore, in Embodiment 5, the amount of strain in the optical system to be used is assessed in advance, and the development table created in step S2 is corrected so as to cancel the effects of the strain.

The method of assessing the amount of strain will first be briefly described.

High-order polynomials are widely used as a general method for numerically describing optical strain. A case is considered here in which a polynomial such as the one indicated in Eq. 20 is used.

$$\Delta x = kx(x^2+y^2)$$

$$\Delta y = ky(x^2+y^2) \quad \text{(Eq. 20)}$$

Here, Δx and Δy are amounts of strain in the x and y directions, respectively, and k is a parameter for adjusting the amount of strain. Eq. 20 is an extremely simple equation for showing the amount of strain, and the only parameter that is set is k. In the case of application to an actual optical system, Eq. 20 is sometimes inadequate for describing the amount of optical strain. In those cases, an expression may be used as needed that takes higher-order factors into account.

An image of a test pattern 36 (specifically, one containing a pattern with a known distance to measure the amount of strain) is formed to act as a reference in the imaging device that comprises the image-forming lens 2 and imaging element 3. A pattern picturing a two-dimensional lattice such as the one shown in FIG. 21(a), for example, may be used as the test pattern 36. Here, the exact value of the lattice pitch, for example, may be already known. As a result, the test pattern image 37 thus obtained forms a pattern that differs from the original test pattern 36, due to the effect of optical strain, as depicted in FIG. 21(b). A sample of the amount of strain is taken by comparing coordinate values of ideal lattice points that can be computed from the lattice pitch and image forming conditions, and the coordinate values of multiple corresponding lattice points (n points) obtained from the test pattern image 37. A k-value that would minimize the two error functions of Eq. 21 is found by means of the least-squares method, where x(i) and y(i) are the ideal coordinate values of the $i^{th}$ piece of data from among the n samples; Δx(i) is the corresponding actual measured amount of strain in the x direction; and Δy(i) is the actual measured amount of strain in the y direction.

$$Ex = \Sigma(\Delta x(i) - kx(i)(x(i)^2 + y(i)^2))$$

$$Ey = \Sigma(\Delta y(i) - ky(i)(x(i)^2 + y(i)^2)) \quad \text{(Eq. 21)}$$

Eq. 20, which shows the amount of strain in the imaging device, is determined by means of the processing described above. This is then used to correct the ideal development table found in step S2. The pixel values of the wide-angle image that correspond to pixels for which optical strain is not taken into account are included in the pixels (elements) in the x direction and y direction of the development table. These are defined as $(x_0(X, Y), y_0(X, Y))$. Here, (X, Y) are the coordinate values of pixels (elements) of the intended development table. These values are substituted into Eq. 20, and post-correction values $(x_1(X, Y), y_1(X, Y))$ are computed. More specifically, Eq. 22 is applied for each pixel (element).

$$x_1(X, Y) = x_0(X, Y) + k \cdot x_0(X, Y) \cdot (x_0(X, Y)^2 + y_0(X, Y)^2)$$

$$y_1(X, Y) = y_0(X, Y) + k \cdot y_0(X, Y) \cdot (x_0(X, Y)^2 + y_0(X, Y)^2) \quad \text{(Eq. 22)}$$

By performing this processing for every pixel (element) of the development table, a development table can be obtained in which the effects of optical strain in the imaging device are corrected. Therefore, if development processing is performed using such a development table, a developed image can be obtained in which the effects of optical strain in the imaging device are eliminated.

Also, this type of optical strain correction processing can be performed for the developed image once the developed image has been created, but in such a case, complex computational processing such as is indicated in Eq. 22 must be performed each time a developed image is created. However, Embodiment 5 has a great deal of merit from a computation cost standpoint, in that by incorporating correction processing for optical strain into the development table, the sort of complex computational processing indicated in Eq. 22 need only be performed when the initial development table is created in the development table generating unit 23, and that only the usual development processing need be performed when the developed image is created.

The developed image generating unit 24 will next be described.

In the developed image generating unit 24, the wide-angle image obtained from the wide-angle imaging device 8 is converted to a developed image, while referring to the development table created by the development table generating unit 23. At this time, the pixel positions of the wide-angle image in correspondence with the pixels of the developed image, in which the coordinate values are integers, are generally such that the coordinate values are not integers. However, the wide-angle image contains only integer coordinate position data. To compensate for this, when processing speed is emphasized over image quality, the coordinate value data in the development table may be substituted by luminance values for pixels in the vicinity of inherently necessary pixels by forming integers from the data by means of rounding or another means. When image quality is emphasized over processing speed, luminance data for the inherently necessary pixels may be produced by means of interpolative computation from the luminance data of four pixels in the vicinity of inherently necessary pixels.

The image quality correction processing unit 25 will next be described.

In the image quality correction processing unit 25, the image quality is corrected for the developed image created by the developed image generating unit 24. The processing involved in correcting the image quality will be described hereinafter.

Figure 22:
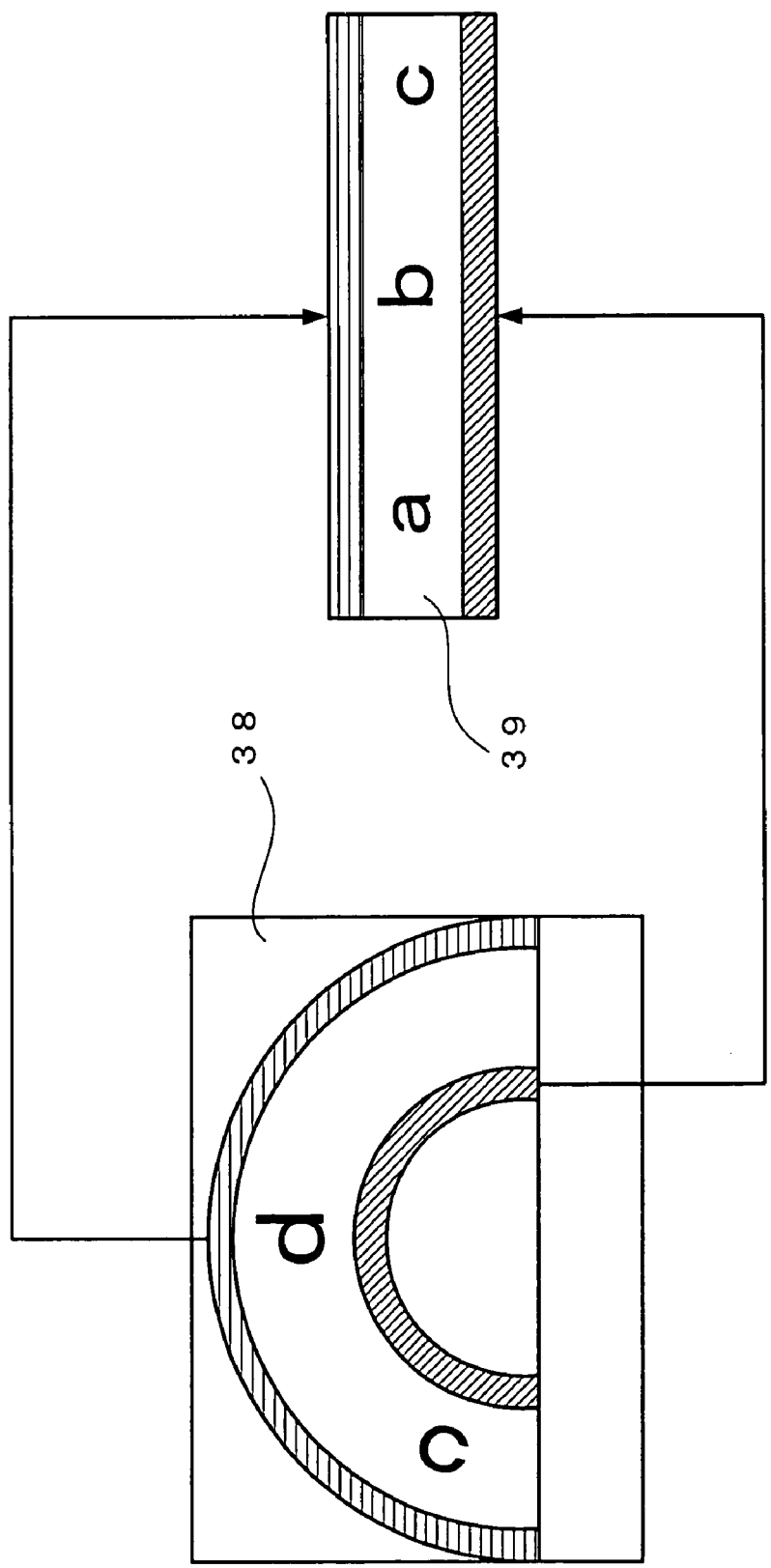
FIG. 22 is a diagram depicting a right-to-left resolution difference in the developed image.

The developed image created by the developed image generating unit 24 has the drawback that different resolutions are ultimately established for the upper and lower portions in the image. Specifically, as depicted in FIG. 22, differences in resolution arise from differences in the amount of information with regard to the correspondence relation between the wide-angle image 38 and the developed image 39 obtained by performing development processing thereon, due to the fact that the relationship between the upper and lower edges of the developed image 39 becomes the relationship between the outside and inside perimeters of the wide-angle image 38. Because of this, portions corresponding to the inner perimeter in the developed image 39 look more out of focus than portions that correspond to the outer perimeter. Also, as another contributing factor, the imaging device that comprises the image-forming lens 2 and imaging element 3 has a depth of field, and while slight, focus unevenness (for example, unevenness in which the focus is good in the inner perimeter portion of the wide-angle image 38, but the focus is somewhat soft in the outer periphery portion) can sometimes occur in the radial direction of the semicircular wide-angle image 38. The image ultimately obtained as the developed image 39 includes blurring that results from the combined action of the two types of contributing factors described above.

In the image quality correction processing unit 25, a corresponding sharpening coefficient is defined for such a developed image 39 in each location along the up-down direction of the developed image 39 (specifically, in correspondence with the radial direction of the wide-angle image 38, which is the original image), and sharpening processing by enhancing high-frequency components using these coefficients.

A technique known as unsharp masking, for example, is used for the sharpening processing. This technique is expressed in Eq. 23.

$$B'(i, j) = B(i, j) + C(B(i, j) - B^-(i, j)) \quad \text{(Eq. 23)}$$

Here, B(i, j) is defined as the luminance value of a pixel with coordinates (i, j). Also, $B^-(i, j)$ is defined as the local mean luminance value in the vicinity of the pixel with coordinates (i, j) (for example, the mean luminance value within a range of 3×3 in the vicinity), and is a luminance value comprising low-frequency components. Consequently, $(B(i, j) - B^-(i, j))$ becomes an operation for retrieving high-frequency components by subtracting low-frequency components from the original image. C is defined as the sharpening coefficient. By combining high-frequency components multiplied by C with the original image, a sharpened image is obtained in which high-frequency components are enhanced.

The sharpening coefficient C is changed according to the position in the up-down direction of the developed image 39, and sharpening processing is performed. A case will first be described wherein the image on the hyperbolic reflecting mirror 1 can be formed in an ideal manner and without any blurring by the imaging device.

Figure 23:
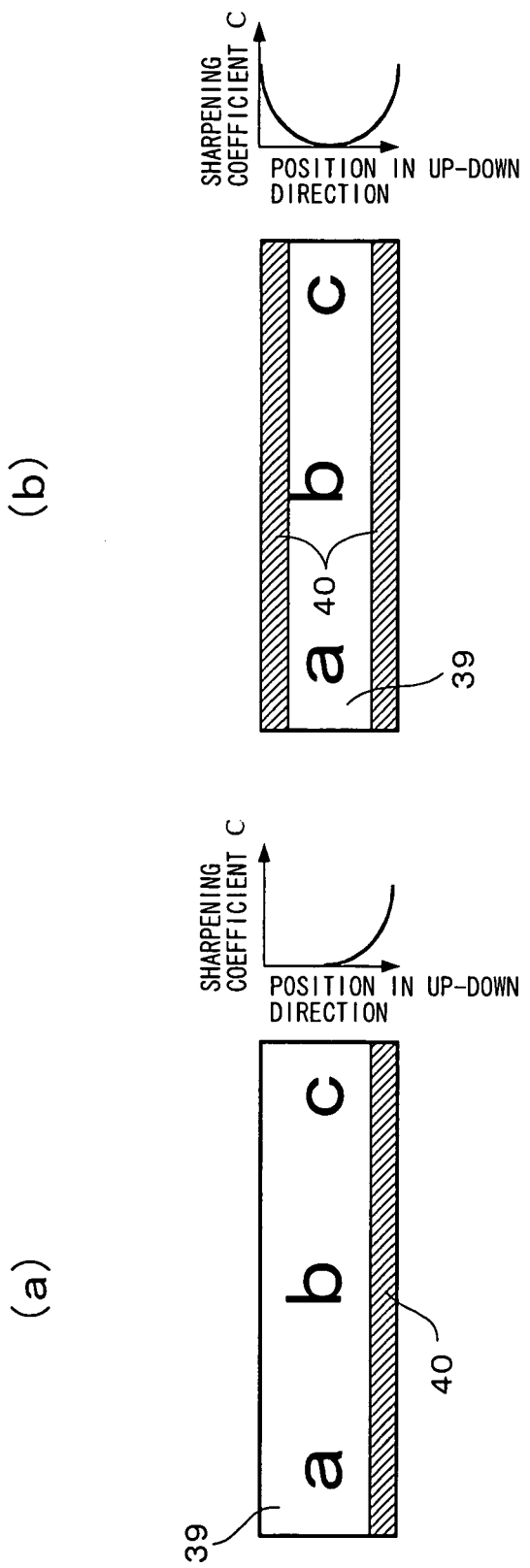
FIG. 23 is a diagram depicting the relationship between position on the developed image and sharpening factor.

The lower edge portion of the developed image 39 obtained in this case, as depicted in FIG. 23(*a*), becomes a blurred region 40 caused by differences in the amount of information between the inner and outer perimeter portions of the original wide-angle image. This blurred region 40 is not necessarily uniformly blurred, and becomes progressively more blurred from near the center of the developed image 39 to the lower edge thereof. At this time, as shown by the graph in FIG. 23(*a*), correction processing (sharpening processing) is performed according to the level of blurring, by changing the sharpening coefficient C from 0 according to the level of blurring.

Also, a graph is shown herein for a case in which the value of the sharpening coefficient C increases from around near the center of the up-down direction of the developed image 39, but this configuration is not limiting. The main intent of the present invention lies in increasing the value of the sharpening coefficient C according to the progressively worsening level of blurring in the direction of the lower edge; for example, the location where the sharpening coefficient C is increased above 0 may be the upper edge of the developed image 39. The method of increasing the sharpening coefficient C can also be adjusted according to the level of blurring, the type of object being photographed, or the like; for example, the sharpening coefficient C may be increased in proportion to the cube of the distance from the location in which the sharpening coefficient C is increased above zero.

A case in which differences in the level of focus balance arise at different locations on the image when an image is formed on the hyperbolic reflecting mirror 1 by the imaging device will next be described using FIG. 23(*b*).

In this case, by adjusting the focus of the imaging device, blurred regions are adjusted in the developed image 39 thus obtained. Because sharpening processing is a type of processing that enhances the high-frequency components of the image, significant effects cannot be demonstrated if the image to be processed is blurred beyond a certain extent. Therefore, the focus is adjusted to improve the most blurred portions (severe blurring) as much as possible. More specifically, as the focus is adjusted to reveal the blurred portions of the optical focus in the inner perimeter portion of the wide-angle image 38, conditions that worsen the blurring of the inner perimeter portion combine together, and the blurring can no longer be corrected. In order to avoid this, the focus is adjusted to arrive at a peak focus at the portion of the wide-angle image 38 that is somewhat towards the inner perimeter away from the center of the radial direction thereof, and is adjusted so that the blurred regions 40 on the upper and lower edges of the developed image 39 are ultimately somewhat balanced, as depicted in FIG. 23(*b*). The blurred regions 40 are not necessarily uniformly blurred at this time either, and become progressively more blurred as the upper and lower edges are approached from near the center of the developed image 39. At this time, as shown by the graph in FIG. 23(*b*), correction processing (sharpening processing) is performed according to the level of blurring, by changing the sharpening coefficient C from 0 according to the level of blurring as the upper and lower edges are approached from near the center of the developed image 39.

The image-masking unit 26 will next be described.

The following configuration is adopted for the image-masking unit 26 for performing image masking on a developed image with corrected image quality generated by the image quality correction processing unit 25.

FIG. 30(*a*) depicts a developed image for which masking is not performed, and FIG. 30(*b*) depicts a developed image for which masking has been performed. In either developed image, 41 is an automated teller machine (ATM) terminal, 42 is an operator, and 47 is the operating panel of the ATM terminal 41. In FIG. 30(a), which depicts the situation existing prior to masking, there is a danger of personal identification numbers and other private information being disclosed to the outside because the entire field of view is visible, and the operation, input results, and other information about the operator 42 are included in the image. In view of this, the operation, input results, and other information about the operator 42 are rendered invisible by allowing the image-masking unit 26 to perform the type of processing that blots out the masked area 48 stored in the ROM with a luminance of 0, for example, as depicted in FIG. 30(b).

Also, a fill luminance of 0 was used in this configuration, but this configuration is not limiting. It is sufficient if the image within the masked area 48 can be covered by something that differs from the original image, and such covering may be accomplished using a luminance value other than 0, or by picturing an image of a random pattern.

The developed image generated by implementing processing such as described above is converted into a video signal such as NTSC in an image format converting unit (not pictured), and is output from the image processing device 22. A monitor 27 receives this signal and displays the developed image.

Thus, in accordance with Embodiment 5, an ideal corresponding point can be established on the wide-angle image for each pixel of the developed image, and development table correction is performed that takes into account the effect of optical strain in the imaging device, making it possible to perform correct development processing even when the optical system of the wide-angle imaging device 8 is configured such that the optical axis 28 of the imaging device that comprises the image-forming lens 2 and imaging element 3 is tilted with respect to the central rotational axis 6. Differences in resolution from place to place on the developed image can also be reduced by correcting the image quality.

Also, the image-masking unit 26 obscures the details of the operation/input by the operator and makes it possible to prevent accidental disclosure of private information by masking part of the developed image, and outputting the image after this part has been rendered invisible.

Also, in Embodiment 5, the reflecting mirror comprised a reflecting mirror having a convex reflecting plane with a range of about ±90 degrees or ±90 degrees or more, wherein a reference optical axis was defined in an arbitrary direction perpendicular to the central rotational axis of a rotary-symmetrical body, and the direction of the reference optical axis was taken to be 0, and that had a hyperbolic shape with an internal focal point on the central rotational axis thereof, and in which the position of the external focal point of the hyperbolic shape and the position of the principal point of the imaging device substantially conformed to each other, but the shape of this reflecting mirror need not be hyperbolic.

Figure 34:
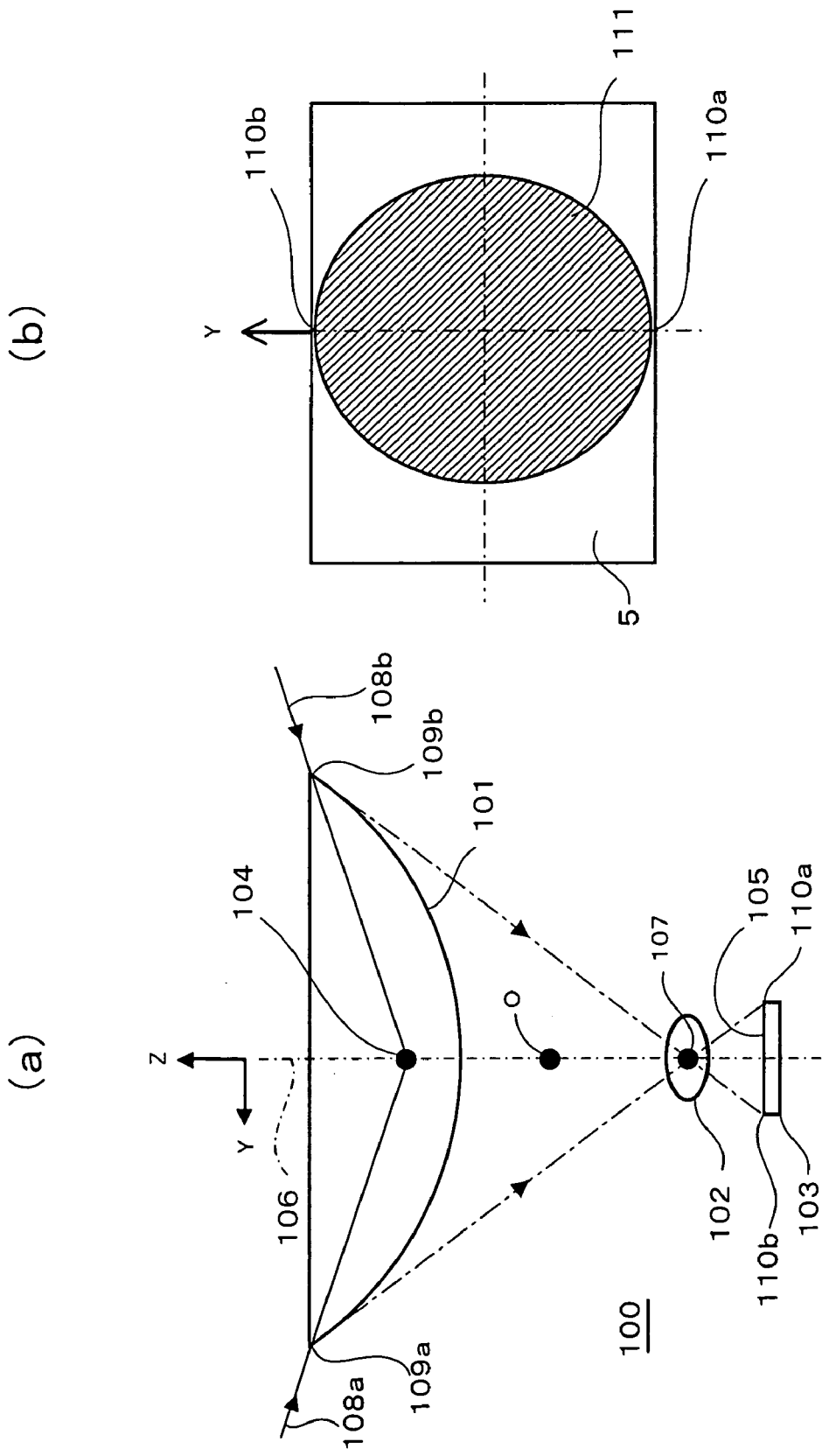
FIG. 34 is a diagram depicting an omnidirectional camera.
Figure 35:
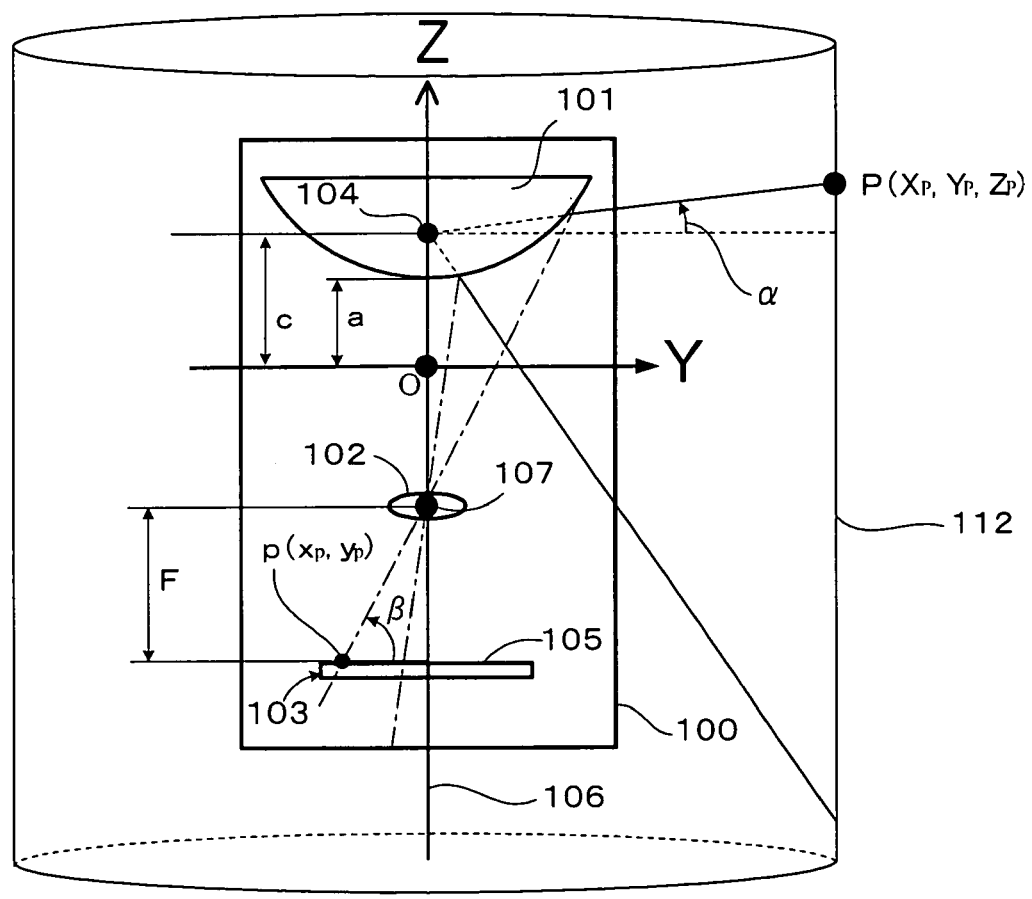
FIG. 35 is a diagram depicting development processing in the omnidirectional camera.

Also, in Embodiment 5, a case was described such that the wide-angle imaging device 8 formed an image in a range of about ±90 degrees about the central rotational axis, but correction of the effects of optical strain, correction processing of the image quality, and image masking as heretofore described have the same effects as in Embodiment 5 even when the omnidirectional camera 100 for forming an image in a range of about 360 degrees about the central rotational axis, such as the one depicted in FIG. 34(a), is used as the wide-angle imaging device 8, and image processing that is consistent with the omnidirectional camera 100 is performed by the image processing device 22.

Embodiment 6

FIGS. 24 through 31 depict Embodiment 6 of the present invention.

Figure 24:
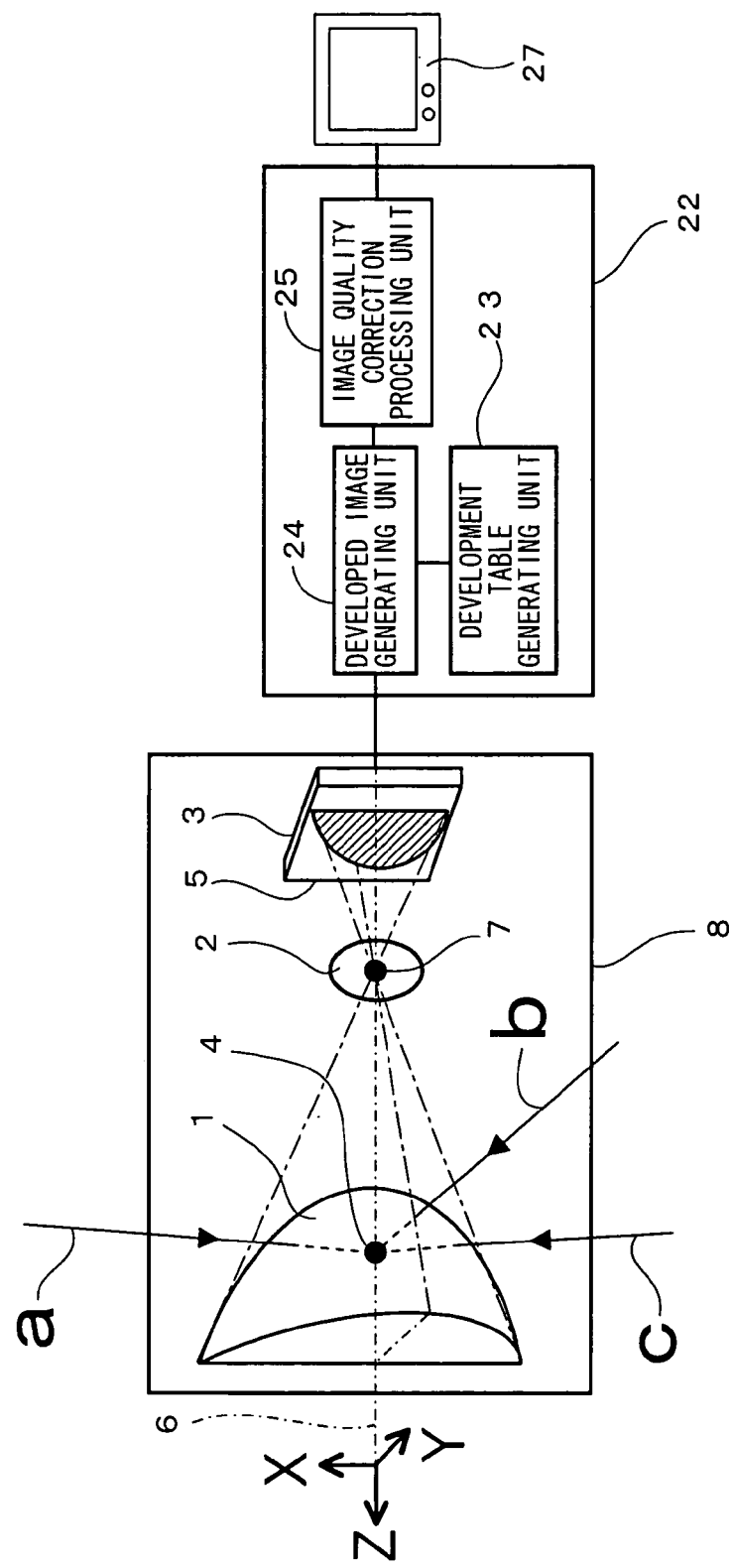
FIG. 24 is a structural diagram of the wide-angle image-generating device (Embodiment 6) of the present invention.
Figure 25:
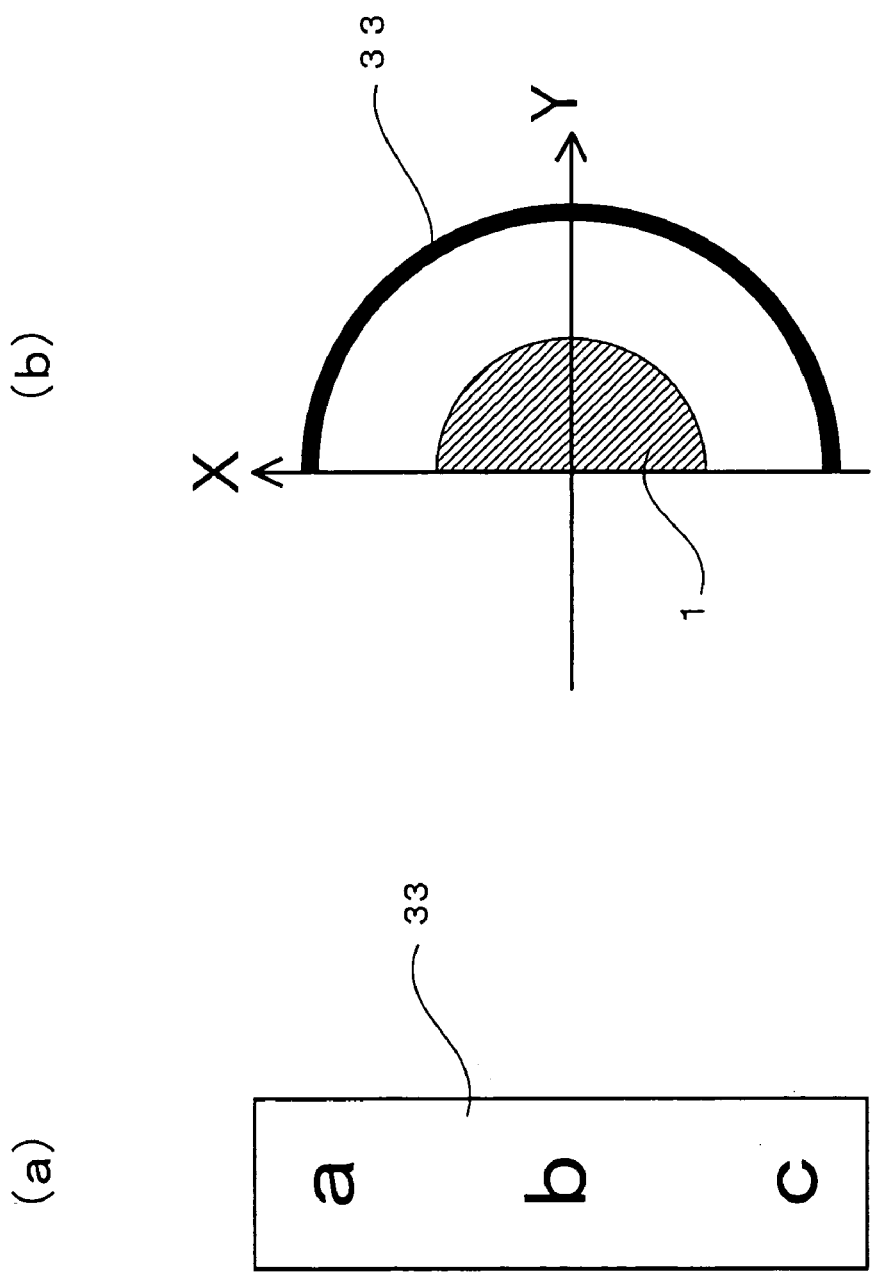
FIG. 25 is a diagram depicting objects a, b, and c for the same embodiment.

FIG. 24 depicts the wide-angle image-generating device in Embodiment 6 of the present invention.

The coordinate axes are defined as follows: the up-down direction of the paper surface is the X-axis, the direction away from the paper surface toward the viewer is the Y-axis, and the left-right direction of the paper surface is the Z-axis. The Z-axis is also the horizontal direction. The configurations in Embodiments 5 and 6 differ in that the wide-angle imaging device 8 is disposed such that the Z-axis conforms to the horizontal direction. The processing aspects differ in that the shape of the hypothetical projection plane 34 used to generate the development table in the development table generating unit 23 of the image processing device 22 is given certain characteristics, that the specific processing involved in the image masking has a different nature, and that a developed image is generated by the developed image generating unit 24 tilted 90 degrees with respect to the image in Embodiment 5, and the top and bottom parts within the image are straightened. These differing aspects will be described hereinafter.

The mechanism of image formation will first be described.

Figure 26:
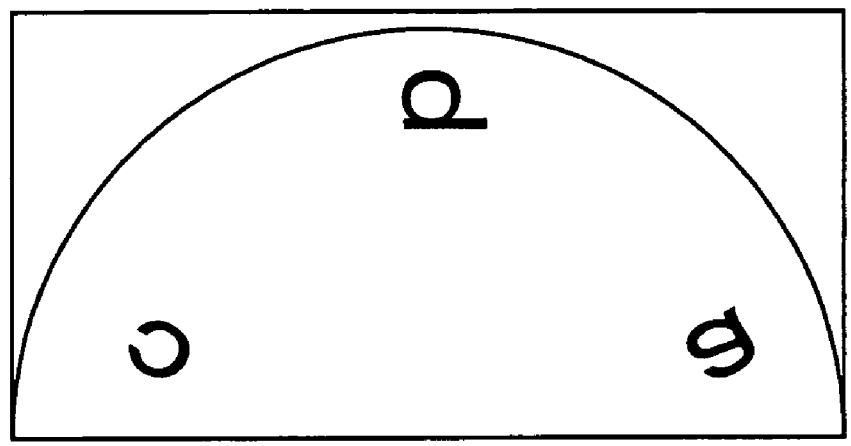
FIG. 26 is a schematic diagram of images linked together on the imaging plane in the same embodiment.

Light beams a, b, and c in FIG. 24 represent arbitrary light beams from objects. The objects of the light beams are therefore designated as objects a, b, and c. The objects a, b, and c are indicated by the letters "a," "b," and "c" pictured on a screen 33 such as the one depicted in FIG. 25(a), and a case is conceived in which the screen 33 is disposed around the Z-axis such that the distance from the Z-axis to the screen surface is fixed, and the plane in which the objects a, b, and c are pictured is visible from the hyperbolic reflecting mirror 1, as shown in FIG. 25(b). The wide-angle image obtained at this time by the imaging element 3 is depicted in FIG. 26. It is apparent that the objects a, b, and c are all included therein.

The monitoring area of an ATM terminal, vending machine, or the like is included as an example of an application in which the wide-angle imaging device 8 is disposed such that the central rotational axis 6 conforms to the horizontal direction in this manner. Application thereof can be made to an ATM terminal, vending machine, or other monitoring application, because a field of view with 180 degrees in the vertical direction that is difficult to achieve with an ordinary wide-angle optical system is obtained, and thus the face, hands, and feet of a person standing near the present device can be included in a single image.

Aspects of processing by the image processing device 22 that differ mainly from Embodiment 5 will next be described.

As in the case of Embodiment 5, computation of a development table for use in development processing is first performed in the development table generating unit 23, as an initial step prior to the start of development processing. The flow of processing performed in the development table generating unit 23 is described using FIG. 27. One of two aspects of the processing performed in the flow depicted in FIG. 27 that differs from the case of Embodiment 5 is that the shape of the given hypothetical projection plane 34 is changed in step S2 for determining ideal corresponding points between the wide-angle image and the projection plane. This aspect will be described in detail using FIG. 28.

Figure 28:
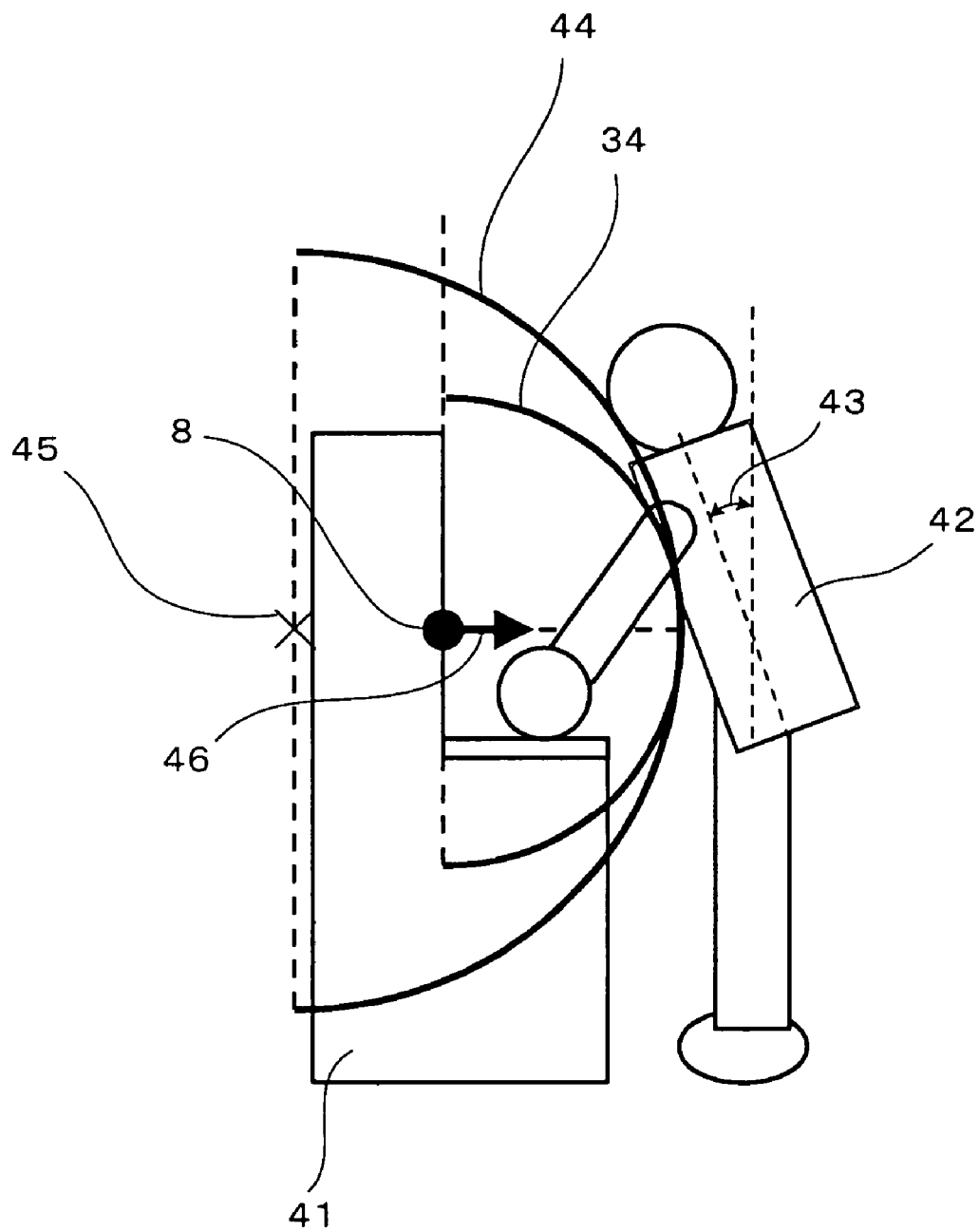
FIG. 28 is a diagram depicting the relationship between the hypothetical projection plane and the operator.

FIG. 28 shows the relationship between the operator 42 operating the ATM terminal 41, the wide-angle imaging device 8, and the hypothetical projection plane 34. 34 is a cylindrical hypothetical projection plane that is perpendicular to the paper surface, with the central rotational axis thereof passing through the internal focal point 4 of the hyperbolic reflecting mirror 1 of the wide-angle image generating unit 8, and that is conventionally used to reproduce an image projected onto a projection plane. The operator 42 of the ATM terminal 41 assumes a forward tilt angle 43 of usually about 15 to 30 degrees when using the ATM terminal 41. Because the operator's face is at a greater distance than the area near his chest from the internal focal point 4, which is the vantage point of the wide-angle imaging device 8, the area near the operator's chest is enlarged, with the operator appearing smaller near the face in the developed image thus obtained, which gives a sense of discomfort to the viewer.

Therefore, a new hypothetical projection plane 44 is set in Embodiment 6, as depicted in FIG. 28, whose central axis 45 is set opposite to the direction of the reference optical axis 46, which is the central direction of the resulting field of view. Defining a projection onto this new hypothetical projection plane 44 corresponds to hypothetically shifting the internal focal point 4, which is the vantage point of the wide-angle imaging device 8, to the position of the central axis 45 in the direction opposite that of the reference optical axis 46. This makes it possible to reduce the difference between the distance from the vantage point of the wide-angle imaging device 8 to the position of the face and the position of the chest when the operator 42 uses the ATM terminal 41.

The specific method for changing the shape of the hypothetical projection plane will be described using FIG. 29.

Figure 29:
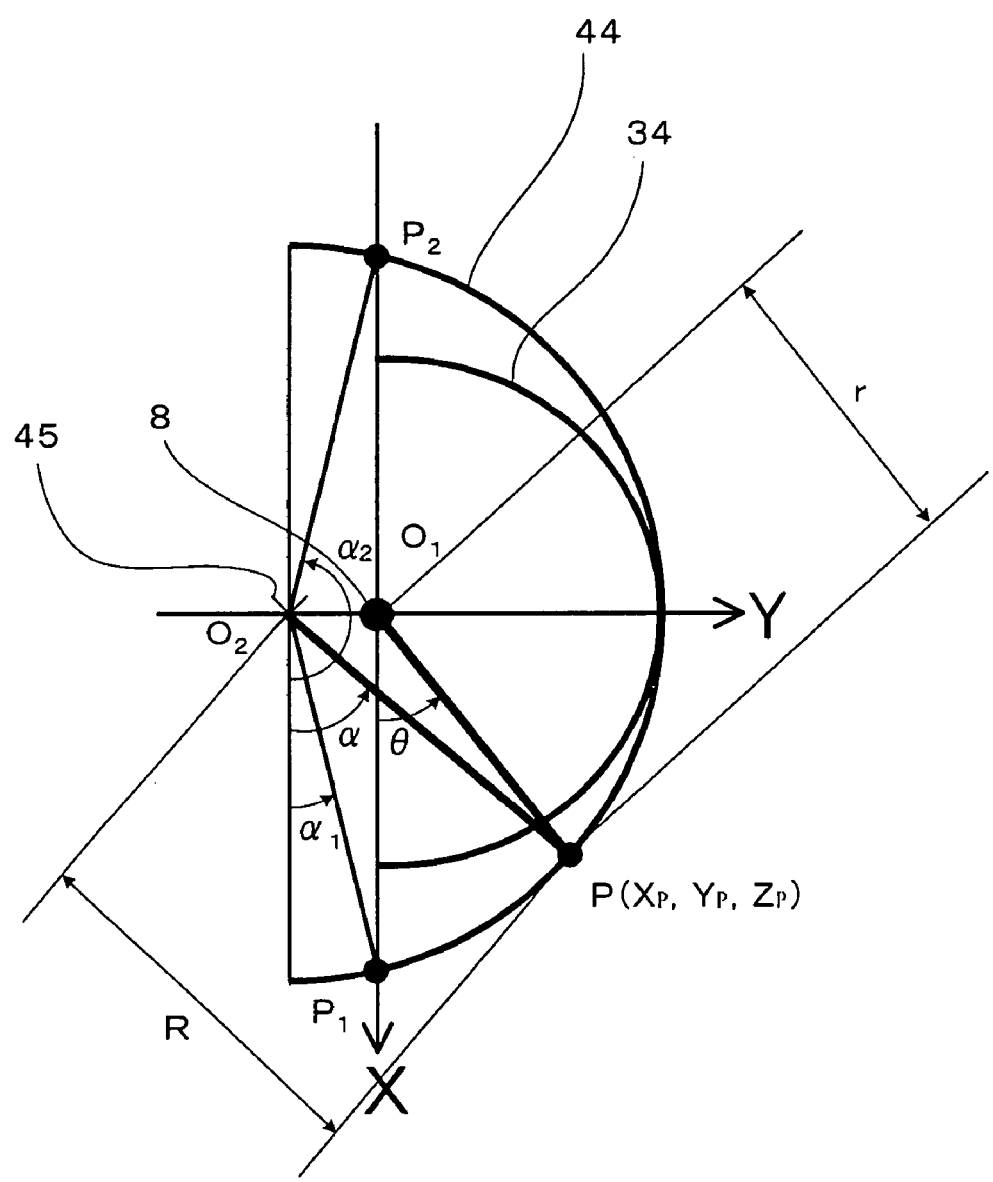
FIG. 29 is a diagram concerning the method of changing the shape of the hypothetical projection plane.

FIG. 29 depicts a hypothetical projection plane 44 whose shape is different from that of a conventional hypothetical projection plane 34, as viewed from the Z-axis direction in the same manner as in FIG. 28. θ is the azimuth in the XY plane of a beam of light from point P on the hypothetical projection plane 44 to the internal focal point 4 (not pictured) of the wide-angle imaging device 8, with the X-axis direction assigned an azimuth of 0 degrees. α is the azimuth in the XY plane of a beam of light from point P on the hypothetical projection plane 44 to a hypothetical internal focal point (not pictured) (specifically, the point at which the reference optical axis passing through the internal focal point 4 intersects with the central axis 45) on the central axis 45 of the hypothetical projection plane 44, with the X-axis direction assigned an azimuth of 0 degrees. Also, the position of the internal focal point 4 in FIG. 29 is defined as $O_1$, and the position of the central axis 45 is defined as $O_2$.

As in Embodiment 5, point $p(x_p, y_p)$ on the wide-angle image that corresponds to point $P(X_P, Y_P, Z_P)$ on the hypothetical projection plane is determined using Eqs. 9, 10, 13a, 15, and 16, but the aspect that differs at this time from Embodiment 5 is the method of assigning θ in Eq. 16.

In Embodiment 5, particularly when the number of pixels in the longitudinal direction (length direction) of the developed image is defined as ISX, and the field-of-view angle in the longitudinal direction is defined as 180 degrees, θ may be taken at equal intervals, as in θ=180°·i/ISX (wherein i is an integer such that 0≦i<ISX). In Embodiment 6, θ is determined so as to be equivalent to a when taken at equal intervals. Eq. 24 is derived according to the sine theorem in $\Delta PO_1 O_2$.

$$R/\sin (90°+\theta)=r/\sin (90°-\alpha) \qquad (Eq.\ 24)$$

Simplifying Eq. 24 yields Eq. 25.

$$\theta=\cos^{-1} (R\cdot\cos \alpha/r) \qquad (Eq.\ 25)$$

Here, $\alpha_1 \leq \alpha < \alpha_2$

Thus, if $\alpha=(\alpha_2-\alpha_1)\cdot i/ISX$ (where n is an integer, and 0≦i<ISX) is substituted for a in Eq. 25 to finds, and a development table is created using this θ, the shape of the hypothetical projection plane can be changed.

Also, the hypothetical projection plane 34 is defined herein as a cylinder, but may be a sphere or other shape.

Figure 27:
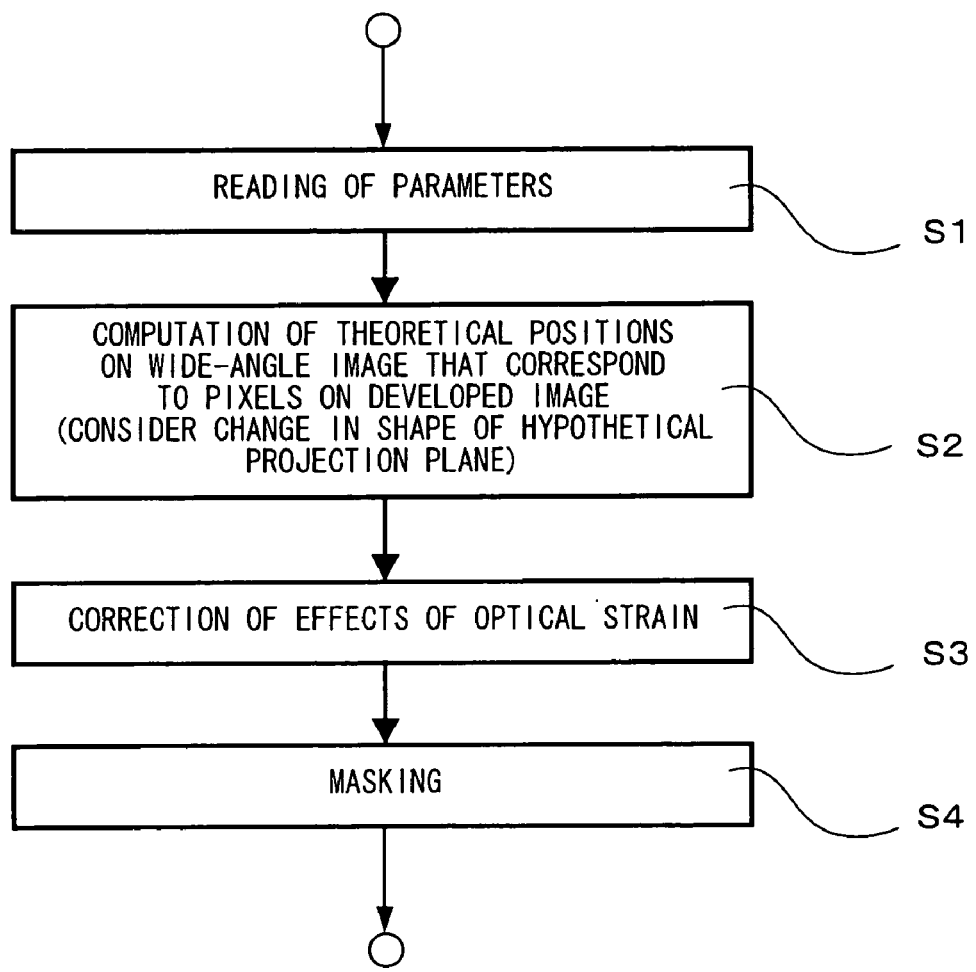
FIG. 27 is a flow diagram of development table creation in the same embodiment.

The other of the two aspects that differ from the case of Embodiment 5 in terms of the processing performed in the flow depicted in FIG. 27 will next be described using FIG. 30 with reference to the masking (step S4) that is subsequent to step S3 and that entails correcting the effects of optical strain.

FIG. 30(a) depicts a developed image for which masking is not performed, and FIG. 30(b) depicts a developed image for which masking has been performed. In either developed image, 41 is an automated teller machine (ATM) terminal, 42 is an operator, and 47 is the operating panel of the ATM terminal 41. In FIG. 30(a), which depicts the situation existing prior to masking, there is a danger of personal identification numbers and other private information being disclosed to the outside because the entire field of view is visible, and the operation, input results, and other operations of the operator 42 are included in the image. Here, masking is implemented by a method in which the coordinate value data of the development table for portions that correspond to the masked area 48 is modified from the original format thereof; for example, all the development table elements for portions that correspond to the masked area 48 are replaced so as to specify only the part of the wide-angle image in which no image is formed from the hyperbolic reflecting mirror 1, such as the upper left corner.

By embedding masking information into the development table as described above, masking can be performed simultaneously with development processing in the developed image generating unit 24 of FIG. 24 without increasing the computation load.

A developed image is then generated in the developed image generating unit 24 using the development table generated by the development table generating unit 23, by performing processing as described above. The difference from Embodiment 5 is that development processing is performed to provide the longitudinal direction with an angle of view of 180 degrees, so that the top and bottom of the developed image are straightened, as previously depicted in FIG. 30.

The same processing as in Embodiment 5 is then performed by the image quality correction processing unit 25, and the developed image is converted into a video signal such as NTSC by the image format converting unit (not pictured), and is displayed on the monitor 27.

Thus, in accordance with Embodiment 6, the vantage point of the wide-angle imaging device 8 can be hypothetically changed by changing the shape of the hypothetical projection plane 44, making it possible to reduce the sense of discomfort imparted by the developed image and caused by differences in the distance from the internal focal point 4 of the wide-angle imaging device 8. Also, by masking part of the developed image, and outputting the image after this part has been rendered invisible, the details of the operation/input by the operator are no longer pictured, and accidental disclosure of private information can be prevented.

Also, a method in which masking information is embedded into the development table is shown herein, but image masking may be performed after the developed image has been generated.

Figure 31:
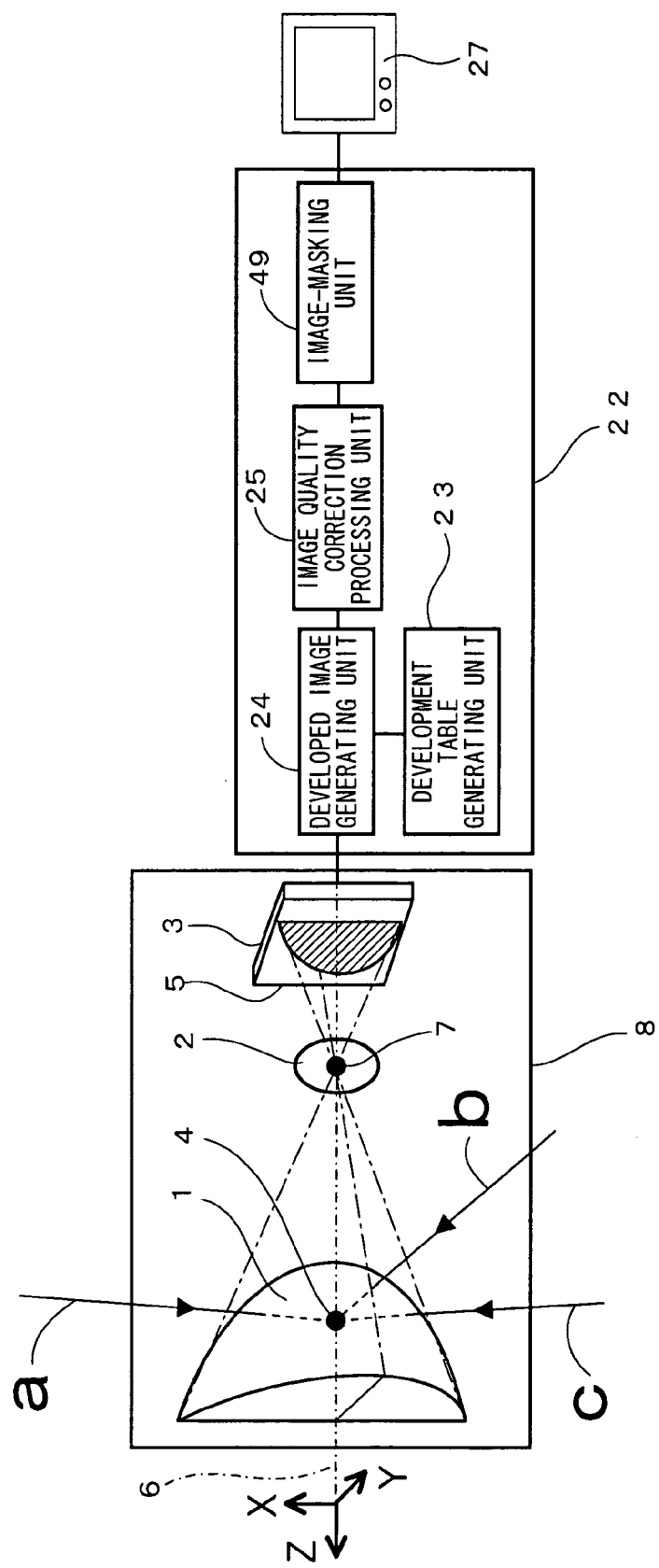
FIG. 31 is a structural diagram of the wide-angle image-generating device of the same embodiment.

As depicted in FIG. 31, for example, the an image-masking unit 49 may be provided directly after the image quality correction processing unit 25, and processing performed therein for blotting out the inside of the masked area 48 with a luminance of 0.

Also, in Embodiment 6, a configuration is adopted whereby the hyperbolic reflecting mirror 1 has a ±90-degree reflecting plane, but this configuration is not limiting. The range thereof may be ±180 degrees or less.

Also, in Embodiment 6, a case was described such that the wide-angle imaging device 8 formed an image in a range of about ±90 degrees about the central rotational axis, but correction of the effects of optical strain, correction processing of the image quality, and image masking as heretofore described have the same effects as in Embodiment 6 even in a case wherein the omnidirectional camera 100 for forming an image in a range of about 360 degrees about the central rotational axis, such as the one depicted in FIG. 34(a), is used as the wide-angle imaging device 8, and image processing that is consistent with the omnidirectional camera 100 is performed by the image processing device 22. Also, the shift in the vantage point can be expressed using a single wide-angle image in a case in which the shape of the hypothetical projection plane is changed in the omnidirectional camera, and walkthrough software could therefore be developed whereby a the vantage point can be smoothly shifted using multiple wide-angle images whose respective imaging locations are shifted by a small amount at a time.

Embodiment 7

Figure 32:
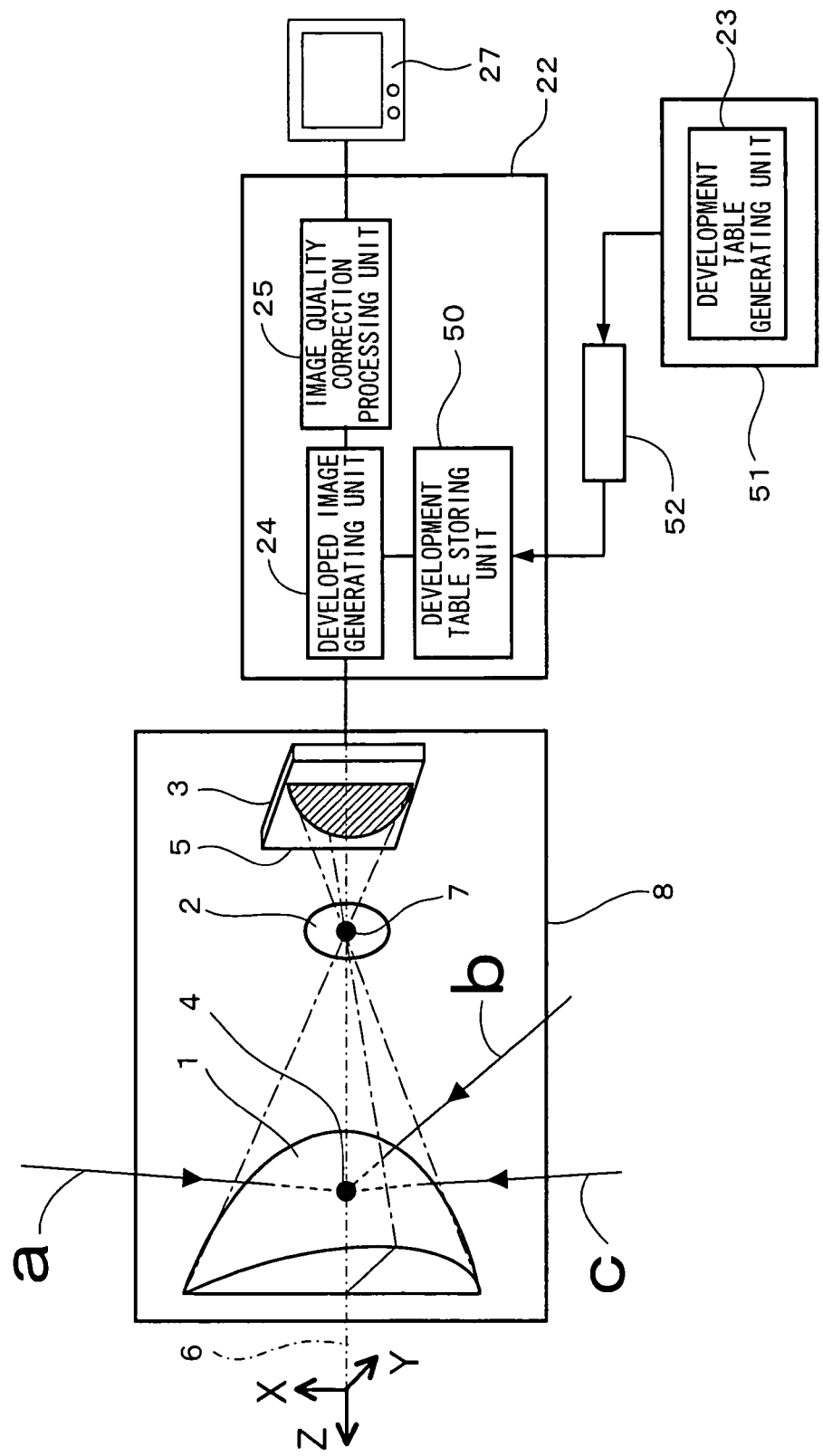
FIG. 32 is a structural diagram of the wide-angle image-generating device (Embodiment 7) of the present invention.
Figure 33:
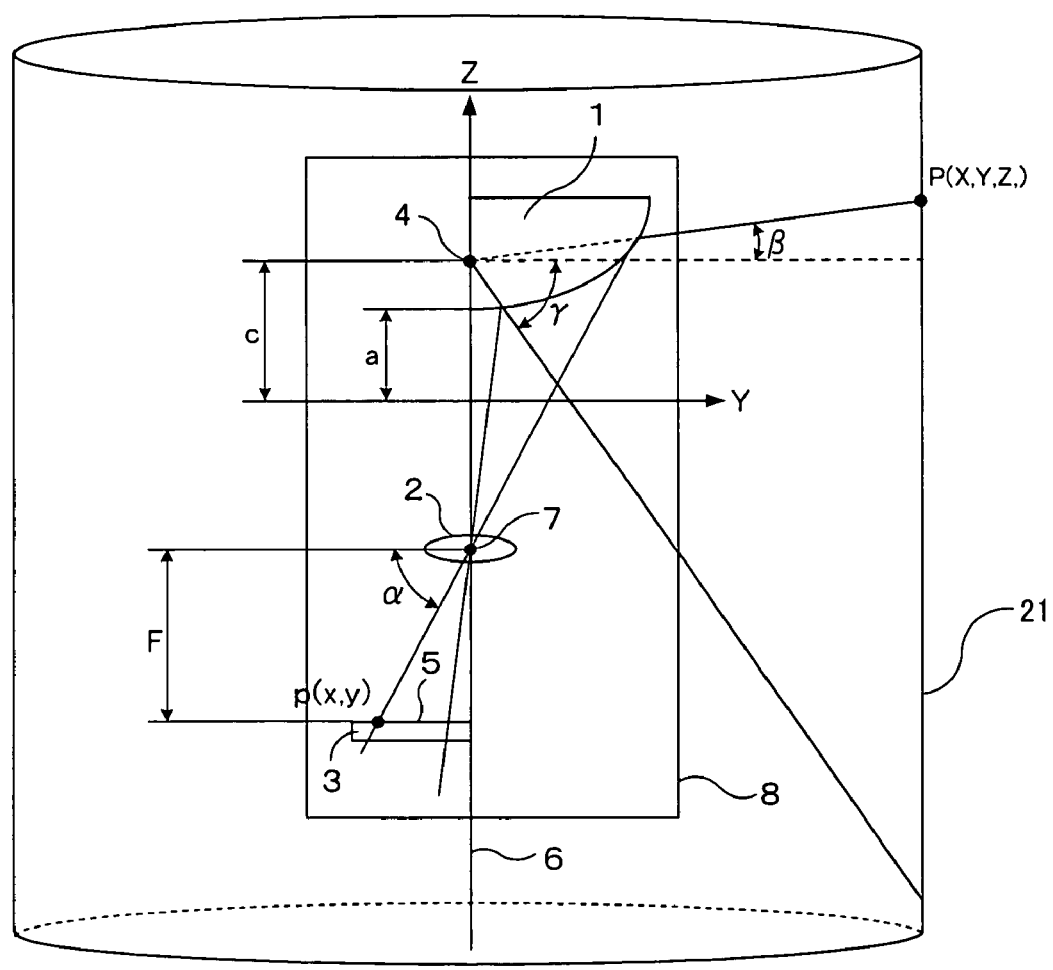
FIG. 33 is a diagram depicting development processing.

FIG. 32 depicts Embodiment 7 of the present invention.

This embodiment differs from Embodiment 6 in that the development table generating unit 23, which was one of the processing units within the image processing device 22, is separated and made independent; a computational processing device 51 for generating a development table is newly provided; and a development table storing unit 50 is provided in place of the development table generating unit 23 within the image processing device 22.

The operation in FIG. 32 will be described based on the parts that differ from Embodiment 6.

The wide-angle imaging device 8 is the same as is used in Embodiment 6.

The computational processing device 51 used for generating a development table more specifically comprises a microcomputer, personal computer (PC), or other computing device, and performs the task of generating a development table that was previously performed by the development table generating unit 23 of Embodiment 6. The development table thus generated is sent to the image processing device 22 and stored in the development table storing unit 50.

The development table is transferred using an SD card (Secure Digital Card (registered trademark)) or other memory card 52. An SD card slot (not pictured) is provided to both the image processing device 22 and the computational processing device 51 used for generating a development table. The generated development table is recorded on the SD card in the computational processing device 51 used for generating a development table. The SD card is inserted into the SD card slot of the image processing device 22, and the development table stored within the SD card is read and recorded in the development table storing unit 50.

The developed image generating unit 24 then reads the development table stored in the development table storing unit 50 and performs development processing. Subsequent processing is the same as in Embodiment 6.

Thus, in accordance with Embodiment 7, the time required for starting the generation of a development table during device startup can be eliminated because there is no longer any need for the development table to be generated in the image processing device 22.

Also, Embodiment 7 is described with reference to a case in which the development table generating unit 23, which was one of the processing units within the image processing device 22 of Embodiment 6, is separated and made independent, a computational processing device 51 used for generating a development table is newly provided, and a development table storing unit 50 is provided in place of the development table generating unit 23 within the image processing device 22. The same effects can be obtained as in the case of Embodiment 7, even when the same changes are made as in the case of Embodiment 5. Also, either case produces the same effects as in the case of Embodiment 7, even if a change is made such that the omnidirectional camera 100 for forming an image in a range of about 360 degrees about the central rotational axis, such as the one depicted in FIG. 34(a), is used as the wide-angle imaging device 8, and processing that is consistent with the omnidirectional camera 100 is performed by the image processing device 22 and computational processing device 51 used for generating a development table.

By means of the present invention as heretofore described, an ideal corresponding point on the wide-angle image can be established for each pixel of the developed image, and the development table is corrected by taking into account the effects of optical strain in the imaging device, making it possible to perform correct development processing even when the optical system of the wide-angle imaging device is configured such that the optical axis of the imaging device that comprises the image-forming lens and imaging element is tilted with respect to the central rotational axis. Differences in resolution from place to place on the developed image can also be reduced by correcting the image quality.

Also, the vantage point of the wide-angle imaging device can be hypothetically changed by changing the shape of the hypothetical projection plane, making it possible to reduce the sense of discomfort imparted by the developed image and caused by differences in the distance from the internal focal point 4 of the wide-angle imaging device. Also, by masking part of the developed image, and outputting the image after this part has been rendered invisible, the details of the operation/input by the operator are no longer pictured, and accidental disclosure of private information can be prevented.

Furthermore, adopting a configuration in which a computational processing device used for generating a development table is provided separately from the image processing device makes it possible to eliminate the time required for starting the generation of the development table generating unit during device startup, because there is no longer any need for the development table to be generated by the image processing device.

What is claimed is:

1. A wide-angle image-generating device, said wide-angle image-generating device comprising a wide-angle imaging device and a computational processing device, wherein the wide-angle imaging device comprises a reflecting mirror having a convex reflecting plane whose angle θ has the minimum range of (θ1≦θ≦θ2, −90°≦θ1≦90°, −90°≦θ2≦90°, θ1<θ2), wherein a reference optical axis is defined in an arbitrary direction perpendicular to the central rotational axis of a rotary-symmetrical body, and the direction of the reference optical axis is taken to be 0 degrees; also comprises an imaging device that has a principal point on the central rotational axis of the reflecting mirror, forms a reflected image of the reflecting mirror, and picks up objects in a range of at least angle θ around the central rotational axis of the reflecting mirror; and is mounted in a plane perpendicular to the reference optical axis, with the central rotational axis of the reflecting mirror tilted in any in-plane tilt direction of the central rotational axis; and the computational processing device comprises a developed-image generating unit for performing computational processing on the image obtained from the wide-angle imaging device and generating a developed image, and an output-image generating unit for tilting the developed image according to the in-plane tilt direction of the central rotational axis, converting the data format of the developed image into a usable output format and generating an output image.

2. A wide-angle image-generating device, said wide-angle image-generating device comprising a wide-angle imaging device and a computational processing device, wherein the wide-angle imaging device comprises a reflecting mirror having a convex reflecting plane whose angle θ has the minimum range of (θ1≦θ≦θ2, −90°≦θ1≦90°, −90°≦θ2≦90°, θ1<θ2), wherein a reference optical axis is defined in an arbitrary direction perpendicular to the central rotational axis of a rotary-symmetrical body, and the direction of the reference optical axis is taken to be 0 degrees; also comprises an imaging device that has a principal point on the central rotational axis of the reflecting mirror, forms a reflected image of the reflecting mirror, and picks up objects in a range of at least angle θ around the central rotational axis of the reflecting mirror; and is mounted in a plane perpendicular to the reference optical axis, with the central rotational axis of the reflecting mirror tilted in any in-plane tilt direction of the central rotational axis; and the computational processing device comprises a developed-image generating unit for performing computational processing on the image obtained from the wide-angle imaging device and generating a developed image that is tilted according to the in-plane tilt direction of the central rotational axis, and an output-image generating unit for converting the data format of the developed image into a usable output format and generating an output image.

3. The wide-angle image-generating device according to claim 1, wherein the reflecting mirror is in a hyperbolic shape that has an internal focal point on the central rotational axis thereof, and the position of the external focal point of the hyperbolic shape and the position of the principal point of the imaging device are disposed so as to conform or substantially conform to each other.

4. The wide-angle image-generating device according to claim 1, wherein the in-plane tilt direction of the central rotational axis conforms or substantially conforms to the horizontal direction.

5. The wide-angle image-generating device according to claim 1, wherein the wide-angle imaging device or the computational processing device has a unit for detecting the in-plane tilt direction of the central rotational axis whereby the in-plane tilt direction of the central rotational axis is detected, and the developed image is tilted and an output image is generated in the computational processing device according to the output results from the unit for detecting the in-plane tilt direction of the central rotational axis.

6. The wide-angle image-generating device according to claim 5, wherein the unit for detecting the in-plane tilt direction of the central rotational axis provided in the computational processing device is constituted so as to perform image processing and detect the in-plane tilt direction of the central rotational axis.

7. The wide-angle image-generating device according to claim 1, wherein the wide-angle imaging device or the computational processing device has a unit for inputting the in-plane tilt direction of the central rotational axis whereby the in-plane tilt direction of the central rotational axis is inputted, and the developed image is tilted and an output image is generated in the computational processing device according to the input results from the unit for inputting the in-plane tilt direction of the central rotational axis.

8. A wide-angle image-generating device, said wide-angle image-generating device comprising a wide-angle imaging device and a computational processing device, wherein the wide-angle imaging device comprises a hyperbolic reflecting mirror having a hyperbolic reflecting plane whose angle θ has the minimum range of (θ1≦θ≦θ2, −90°≦θ1≦90°, −90°≦θ2≦90°, θ1<θ2), wherein a reference optical axis is defined in an arbitrary direction perpendicular to the central rotational axis of a hyperbolic plane, and the direction of the reference optical axis is taken to be 0 degrees; also comprises an imaging device in which the position of the external focal point of the hyperbolic reflecting mirror and the position of the principal point thereof substantially conform to each other, which forms a reflected image from the hyperbolic reflecting mirror, and picks up objects in a range of at least angle θ around the central rotational axis of the hyperbolic reflecting mirror; and is mounted in a plane that includes the reference optical axis and the central rotational axis of the hyperbolic reflecting mirror, with the central rotational axis of the hyperbolic reflecting mirror tilted in any forward tilt direction of the central rotational axis; and the computational processing device comprises a developed-image generating unit for performing computational processing on the image obtained from the wide-angle imaging device, with the projection plane being in the form of a hypothetical cylinder in which any axis passing through the internal focal point of the hyperbolic reflecting mirror serves as the central rotational axis of the hypothetical cylinder, and generating a developed image, and also comprises an output-image generating unit for converting the data format of the developed image into a usable output format and generating an output image.

9. The wide-angle image-generating device according to claim 8, wherein a reference axis set within the plane that includes the reference optical axis and the central rotational axis of the hyperbolic reflecting mirror is parallel with or conforms to the central rotational axis of the hypothetical cylinder, regardless of the forward tilt direction of the central rotational axis.

10. The wide-angle image-generating device according to claim 9, wherein the forward tilt direction of the central axis is directed such that the angle-of-view center of the wide-angle imaging device in the plane that includes the reference optical axis and the central rotational axis of the hyperbolic reflecting mirror is perpendicular to the reference axis.

11. The wide-angle image-generating device according to claim 9, wherein the wide-angle imaging device or the computational processing device has a unit for detecting the forward tilt direction of the central rotational axis whereby the forward tilt direction of the central rotational axis is detected, and an output image is generated in the computational processing device according to the output results from the unit for detecting the forward tilt direction of the central rotational axis.

12. The wide-angle image-generating device according to claim 9, wherein the wide-angle imaging device or the computational processing device has a unit for inputting the forward tilt direction of the central rotational axis whereby the forward tilt direction of the central rotational axis is inputted, and an output image is generated in the computational processing device according to the input results from the unit for inputting the forward tilt direction of the central rotational axis.

13. A wide-angle image-generating device, comprising:
a reflecting mirror having a convex reflecting plane whose angle $\theta$ has the minimum range of ($\theta 1 \leq \theta \leq \theta 2$, $-180° \leq \theta 1 \leq 180°$, $-180° \leq \theta 2 \leq 180°$, $\theta 1 < \theta 2$), wherein a reference optical axis is defined in an arbitrary direction perpendicular to the central rotational axis of a rotary-symmetrical body, and the direction of the reference optical axis is taken to be 0 degrees;
an imaging device whose principal point is on the central rotational axis of the reflecting mirror, whose optical axis is tilted in the direction of the reference optical axis by an angle less than or equal to $\alpha$ in relation to the central rotational axis when the angle of view is 2 $\alpha$, which forms a reflected image of the reflecting mirror, and picks up objects in a range of at least angle $\theta$ around the central rotational axis of the reflecting mirror;
a developed image generating unit for generating a developed image as viewed from the central rotational axis on the basis of the wide-angle image obtained from the imaging device; and
a development table generating unit for generating a development table that contains information on the correspondence relation between the pixels in the wide-angle image and the developed image when the developed image generating unit develops the wide-angle image,
wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and
wherein the development table generating unit for generating a development table is constituted so as to generate a development table that contains information about a pixel correspondence relation obtained by synthesizing the correspondence relation between a wide-angle image that contains strain due to the optical aberration in the imagining device and a wide-angle image whose strains has been corrected, and the correspondence relation between the wide-angle image whose strain has been corrected and the developed image.

14. A wide-angle image-generating device, comprising:
a reflecting mirror having a convex reflecting plane whose angle $\theta$ has the minimum range of ($\theta 1 \leq \theta \leq \theta 2$, $-180° \leq \theta 1 \leq 180°$, $-180° \leq \theta 2 \leq 180°$, $\theta 1 < \theta 2$), wherein a reference optical axis is defined in an arbitrary direction perpendicular to the central rotational axis of a rotary-symmetrical body, and the direction of the reference optical axis is taken to be 0 degrees;
an imaging device whose principal point is on the central rotational axis of the reflecting mirror, whose optical axis is tilted in the direction of the reference optical axis by an angle less than or equal to $\alpha$ in relation to the central rotational axis when the angle of view is 2 $\alpha$, which forms a reflected image of the reflecting mirror, and picks up objects in a range of at least angle $\theta$ around the central rotational axis of the reflecting mirror;
a developed image generating unit for generating a developed image as viewed from the central rotational axis on the basis of the wide-angle image obtained from the imaging device;
a computational processing device for generating a development table that contains information on the correspondence relation between the pixels in the wide-angle image and the developed image when the developed image generating unit develops the wide-angle image; and
a development table storage unit that stores the development table generated by the computational processing device for generating a development table, and is connected to the developed image generating unit,
wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and
wherein the computational processing device for generating a development table is constituted so as to generate a development table that contains information about a pixel correspondence relation obtained by synthesizing the correspondence relation between a wide-angle image that contains strain due to the optical aberration in the imagining device and a wide-angle image whose strains has been corrected, and the correspondence relation between the wide-angle image whose strain has been corrected and the developed image.

15. A wide-angle image-generating device, comprising:
a reflecting mirror having a reflecting plane with a convex shape;
an imaging device that forms an image from the image reflected off the reflecting mirror, picks up objects in a range of 360 degrees around the central rotational axis of the reflecting mirror, and has a principal point on the central rotational axis of the reflecting mirror;
a developed image generating unit for generating a developed image as viewed from the central rotational axis on the basis of the wide-angle image obtained from the imaging device; and
a development table generating unit for generating a development table that contains information on the correspondence relation between the pixels in the wide-angle image and the developed image when the developed image generating unit develops the wide-angle image, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein the development table generating unit for generating a development table is constituted so as to generate a development table that contains information about a pixel correspondence relation obtained by synthesizing the correspondence relation between a wide-angle image that contains strain due to the optical aberration in the imagining device and a wide-angle image whose strains has been corrected, and the correspondence relation between the wide-angle image whose strain has been corrected and the developed image.

16. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table and is connected to the developed image generating unit; and a development table storage unit that stores the development table generated by the computational processing device for generating a development table and is connected to the developed image generating unit, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein the computational processing device for generating a development table is constituted so as to generate a development table that contains information about a pixel correspondence relation obtained by synthesizing the correspondence relation between a wide-angle image that contains strain due to the optical aberration in the imagining device and a wide-angle image whose strains has been corrected, and the correspondence relation between the wide-angle image whose strain has been corrected and the developed image.

17. A wide-angle image-generating device, comprising:

a reflecting mirror having a convex reflecting plane whose angle $\theta$ has the minimum range of ($\theta1 \leq \theta \leq \theta2$, $-180° \leq \theta1 \leq 180°$, $-180° \leq \theta2 \leq 180°$, $\theta1 < \theta2$), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to $\alpha$ in relation to the central rotational axis when the angle of view is 2 $\alpha$, which forms a reflected image of the reflecting mirror, and picks up objects in a range of at least angle $\theta$ around the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein the development table generating unit for generating a development table is constituted so as to generate a development table in which the pixel correspondence relation between the wide-angle image and the developed image is changed by setting the center of projection of the hypothetical projection plane at a point outside the rotation axis of the reflecting mirror, the hypothetical projection plane being involved in defining the pixel correspondence relation between the wide-angle image and the developed image.

18. A wide-angle image-generating device, comprising:

a reflecting mirror having a convex reflecting plane whose angle $\theta$ has the minimum range of ($\theta1 \leq \theta \leq \theta2$, $-180° \leq \theta1 \leq 180°$, $-180° \leq \theta2 \leq 180°$, $\theta1 < \theta2$), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to $\alpha$ in relation to the central rotational axis when the angle of view is 2 $\alpha$, which forms a reflected image of the reflecting mirror, and picks up objects in a range of at least angle $\theta$ around the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table, and is connected to the developed image generating unit, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein the computational processing device for generating a development table is constituted so as to generate a development table in which the pixel correspondence relation between the wide-angle image and the developed image is changed by setting the center of projection of the hypothetical projection plane at a point outside the rotation axis of the reflecting mirror, the hypothetical projection plane being involved in defining the pixel correspondence relation between the wide-angle image and the developed image.

19. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein the development table generating unit for generating a development table is constituted so as to generate a development table in which the pixel correspondence relation between the wide-angle image and the developed image is changed by setting the center of projection of the hypothetical projection plane at a point outside the rotation axis of the reflecting mirror, the hypothetical projection plane being involved in defining the pixel correspondence relation between the wide-angle image and the developed image.

20. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table and is connected to the developed image generating unit, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein the computational processing device for generating a development table is constituted so as to generate a development table in which the pixel correspondence relation between the wide-angle image and the developed image is changed by setting the center of projection of the hypothetical projection plane at a point outside the rotation axis of the reflecting mirror, the hypothetical projection plane being involved in defining the pixel correspondence relation between the wide-angle image and the developed image.

21. A wide-angle image-generating device, comprising:

a reflecting mirror having a convex reflecting plane whose angle $\theta$ has the minimum range of ($\theta 1 \leq \theta \leq \theta 2$, $-180° \leq \theta 1 \leq 180°$, $-180° \leq \theta 2 \leq 180°$, $\theta 1 < \theta 2$), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to $\alpha$ in relation to the central rotational axis when the angle of view is 2 $\alpha$, which forms a reflected image of the reflecting mirror, and picks up objects in a range of at least angle $\theta$ around the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein the development table generating unit for generating a development table is constituted so as to generate a development table which would arbitrarily change the pixel correspondence relation between the wide-angle image and the developed image within an arbitrary masked area provided on the developed image, and mask the developed image within the masked area.

22. A wide-angle image-generating device, comprising:
a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;
an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;
a developed image generating unit for generating a developed image as viewed from the central rotational axis on the basis of the wide-angle image obtained from the imaging device;
a computational processing device for generating a development table that contains information on the correspondence relation between the pixels in the wide-angle image and the developed image when the developed image generating unit develops the wide-angle image; and
a development table storage unit that stores the development table generated by the computational processing device for generating a development table, and is connected to the developed image generating unit,
wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and
wherein the computational processing device for generating a development table is constituted so as to generate a development table which would arbitrarily change the pixel correspondence relation between the wide-angle image and the developed image within an arbitrary masked area provided on the developed image, and mask the developed image within the masked area.

23. A wide-angle image-generating device, comprising:
a reflecting mirror having a reflecting plane with a convex shape;
an imaging device that forms an image from the image reflected off the reflecting mirror, picks up objects in a range of 360 degrees around the central rotational axis of the reflecting mirror, and has a principal point on the central rotational axis of the reflecting mirror;
a developed image generating unit for generating a developed image as viewed from the central rotational axis on the basis of the wide-angle image obtained from the imaging device; and
a development table generating unit for generating a development table that contains information on the correspondence relation between the pixels in the wide-angle image and the developed image when the developed image generating unit develops the wide-angle image,
wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and
wherein the development table generating unit for generating a development table is constituted so as to generate a development table which would arbitrarily change the pixel correspondence relation between the wide-angle image and the developed image within an arbitrary masked area provided on the developed image, and mask the developed image within the masked area.

24. A wide-angle image-generating device, comprising:
a reflecting mirror having a reflecting plane with a convex shape;
an imaging device that forms an image from the image reflected off the reflecting mirror, picks up objects in a range of 360 degrees around the central rotational axis of the reflecting mirror, and has a principal point on the central rotational axis of the reflecting mirror;
a developed image generating unit for generating a developed image as viewed from the central rotational axis on the basis of the wide-angle image obtained from the imaging device;
a computational processing device for generating a development table that contains information on the correspondence relation between the pixels in the wide-angle image and the developed image when the developed image generating unit develops the wide-angle image; and
a development table storage unit that stores the development table generated by the computational processing device for generating a development table and is connected to the developed image generating unit,
wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and
wherein the computational processing device for generating a development table is constituted so as to generate a development table which would arbitrarily change the pixel correspondence relation between the wide-angle image and the developed image within an arbitrary masked area provided on the developed image, and mask the developed image within the masked area.

25. A wide-angle image-generating device, comprising:
a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;
an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;
a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein an image quality correction processing unit for enhancing high-frequency components, with the degree of enhancement varying according to the position on the developed image, is added to a subsequent stage of the developed image generating unit as post-processing of the developed image generating unit.

26. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table, and is connected to the developed image generating unit, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein an image quality correction processing unit for enhancing high-frequency components, with the degree of enhancement varying according to the position on the developed image, is added to a subsequent stage of the developed image generating unit as post-processing of the developed image generating unit.

27. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein an image quality correction processing unit for enhancing high-frequency components, with the degree of enhancement varying according to the position on the developed image, is added to a subsequent stage of the developed image generating unit as post-processing of the developed image generating unit.

28. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table and is connected to the developed image generating unit, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein an image quality correction processing unit for enhancing high-frequency components, with the degree of enhancement varying according to the position on the developed image, is added to a subsequent stage of the developed image generating unit as post-processing of the developed image generating unit.

29. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein an image-masking unit is provided for performing image masking to produce an image in which a specific area of the image developed by the developed image generating unit differs from that of the original.

30. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table, and is connected to the developed image generating unit, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein an image-masking unit is provided for performing image masking to produce an image in which a specific area of the image developed by the developed image generating unit differs from that of the original.

31. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein an image-masking unit is provided for performing image masking to produce an image in which a specific area of the image developed by the developed image generating unit differs from that of the original.

32. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table and is connected to the developed image generating unit, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein an image-masking unit is provided for performing image masking to produce an image in which a specific area of the image developed by the developed image generating unit differs from that of the original.

33. The wide-angle image-generating device according to claim 25, wherein an image-masking unit is provided for performing image masking to produce an image in which a specific area of the image developed by the developed image generating unit differs from that of the original.

34. A wide-angle image-generating device, comprising:
a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;
an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle κ around the central rotational axis of the reflecting mirror;
a developed image generating unit for generating a developed image as viewed from the central rotational axis on the basis of the wide-angle image obtained from the imaging device; and
a development table generating unit for generating a development table that contains information on the correspondence relation between the pixels in the wide-angle image and the developed image when the developed image generating unit develops the wide-angle image,
wherein the development table generating unit for generating a development table is constituted so as to generate a development table that contains information about a pixel correspondence relation obtained by synthesizing the correspondence relation between a wide-angle image that contains strain due to the optical aberration in the imagining device and a wide-angle image whose strains has been corrected, and the correspondence relation between the wide-angle image whose strain has been corrected and the developed image.

35. A wide-angle image-generating device, comprising:
a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;
an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;
a developed image generating unit for generating a developed image as viewed from the central rotational axis on the basis of the wide-angle image obtained from the imaging device;
a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table, and is connected to the developed image generating unit,
wherein the computational processing device for generating a development table is constituted so as to generate a development table that contains information about a pixel correspondence relation obtained by synthesizing the correspondence relation between a wide-angle image that contains strain due to the optical aberration in the imagining device and a wide-angle image whose strains has been corrected, and the correspondence relation between the wide-angle image whose strain has been corrected and the developed image.

36. A wide-angle image-generating device, comprising:
a reflecting mirror having a reflecting plane with a convex shape;
an imaging device that forms an image from the image reflected off the reflecting mirror, picks up objects in a range of 360 degrees around the central rotational axis of the reflecting mirror, and has a principal point on the central rotational axis of the reflecting mirror;
a developed image generating unit for generating a developed image as viewed from the central rotational axis on the basis of the wide-angle image obtained from the imaging device; and
a development table generating unit for generating a development table that contains information on the correspondence relation between the pixels in the wide-angle image and the developed image when the developed image generating unit develops the wide-angle image,
wherein the development table generating unit for generating a development table is constituted so as to generate a development table that contains information about a pixel correspondence relation obtained by synthesizing the correspondence relation between a wide-angle image that contains strain due to the optical aberration in the imagining device and a wide-angle image whose strains has been corrected, and the correspondence relation between the wide-angle image whose strain has been corrected and the developed image.

37. A wide-angle image-generating device, comprising:
a reflecting mirror having a reflecting plane with a convex shape;
an imaging device that forms an image from the image reflected off the reflecting mirror, picks up objects in a range of 360 degrees around the central rotational axis of the reflecting mirror, and has a principal point on the central rotational axis of the reflecting mirror;
a developed image generating unit for generating a developed image as viewed from the central rotational axis on the basis of the wide-angle image obtained from the imaging device;
a computational processing device for generating a development table that contains information on the correspondence relation between the pixels in the wide-angle image and the developed image when the developed image generating unit develops the wide-angle image; and
a development table storage unit that stores the development table generated by the computational processing device for generating a development table and is connected to the developed image generating unit; and a development table storage unit that stores the development table generated by the computational processing device for generating a development table and is connected to the developed image generating unit, wherein the computational processing device for generating a development table is constituted so as to generate a development table that contains information about a pixel correspondence relation obtained by synthesizing the correspondence relation between a wide-angle image that contains strain due to the optical aberration in the imagining device and a wide-angle image whose strains has been corrected, and the correspondence relation between the wide-angle image whose strain has been corrected and the developed image.

38. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the development table generating unit for generating a development table is constituted so as to generate a development table in which the pixel correspondence relation between the wide-angle image and the developed image is changed by setting the center of projection of the hypothetical projection plane at a point outside the rotation axis of the reflecting mirror, the hypothetical projection plane being involved in defining the pixel correspondence relation between the wide-angle image and the developed image.

39. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table, and is connected to the developed image generating unit, wherein the computational processing device for generating a development table is constituted so as to generate a development table in which the pixel correspondence relation between the wide-angle image and the developed image is changed by setting the center of projection of the hypothetical projection plane at a point outside the rotation axis of the reflecting mirror, the hypothetical projection plane being involved in defining the pixel correspondence relation between the wide-angle image and the developed image.

40. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the development table generating unit for generating a development table is constituted so as to generate a development table in which the pixel correspondence relation between the wide-angle image and the developed image is changed by setting the center of projection of the hypothetical projection plane at a point outside the rotation axis of the reflecting mirror, the hypothetical projection plane being involved in defining the pixel correspondence relation between the wide-angle image and the developed image.

41. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table and is connected to the developed image generating unit, wherein the computational processing device for generating a development table is constituted so as to generate a development table in which the pixel correspondence relation between the wide-angle image and the developed image is changed by setting the center of projection of the hypothetical projection plane at a point outside the rotation axis of the reflecting mirror, the hypothetical projection plane being involved in defining the pixel correspondence relation between the wide-angle image and the developed image.

42. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the development table generating unit for generating a development table is constituted so as to generate a development table which would arbitrarily change the pixel correspondence relation between the wide-angle image and the developed image within an arbitrary masked area provided on the developed image, and mask the developed image within the masked area.

43. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table, and is connected to the developed image generating unit, wherein the computational processing device for generating a development table is constituted so as to generate a development table which would arbitrarily change the pixel correspondence relation between the wide-angle image and the developed image within an arbitrary masked area provided on the developed image, and mask the developed image within the masked area.

44. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the development table generating unit for generating a development table is constituted so as to generate a development table which would arbitrarily change the pixel correspondence relation between the wide-angle image and the developed image within an arbitrary masked area provided on the developed image, and mask the developed image within the masked area.

45. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table and is connected to the developed image generating unit, wherein the computational processing device for generating a development table is constituted so as to generate a development table which would arbitrarily change the pixel correspondence relation between the wide-angle image and the developed image within an arbitrary masked area provided on the developed image, and mask the developed image within the masked area.

46. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein an image quality correction processing unit for enhancing high-frequency components, with the degree of enhancement varying according to the position on the developed image, is added to a subsequent stage of the developed image generating unit as post-processing of the developed image generating unit.

47. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table, and is connected to the developed image generating unit, wherein an image quality correction processing unit for enhancing high-frequency components, with the degree of enhancement varying according to the position on the developed image, is added to a subsequent stage of the developed image generating unit as post-processing of the developed image generating unit.

48. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein an image quality correction processing unit for enhancing high-frequency components, with the degree of enhancement varying according to the position on the developed image, is added to a subsequent stage of the developed image generating unit as post-processing of the developed image generating unit.

49. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table and is connected to the developed image generating unit, wherein an image quality correction processing unit for enhancing high-frequency components, with the degree of enhancement varying according to the position on the developed image, is added to a subsequent stage of the developed image generating unit as post-processing of the developed image generating unit.

50. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein an image-masking unit is provided for performing image masking to produce an image in which a specific area of the image developed by the developed image generating unit differs from that of the original.

51. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table, and is connected to the developed image generating unit, wherein an image-masking unit is provided for performing image masking to produce an image in which a specific area of the image developed by the developed image generating unit differs from that of the original.

52. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein an image-masking unit is provided for performing image masking to produce an image in which a specific area of the image developed by the developed image generating unit differs from that of the original.

53. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table and is connected to the developed image generating unit, wherein an image-masking unit is provided for performing image masking to produce an image in which a specific area of the image developed by the developed image generating unit differs from that of the original.

54. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein the development table generating unit for generating a development table is constituted so as to generate a development table according to the equations below:

$$\tan \alpha = \{(b^2+c^2)\cdot\sin \beta - 2bc\}/\{(b^2-c^2)\cdot\cos \beta\}$$

$$c=(a^2+b^2)^{0.5}$$

$$(x^2+y^2)^{0.5}=F\cdot\cos \beta/\cos \gamma(\theta)/\sin (\beta+\gamma(\theta))$$

$$\cos \phi = \cos \theta/(1+\tan^2 \gamma(90°)\cdot\sin^2 \theta)^{0.5}$$

$$\tan \gamma(\theta) = \tan \gamma(90°)\cdot\sin \theta$$

where, a and b are constants that determine the shape of the hyperboloid; the shape of the hyperboloid is a hyperboloid expressed by the equation $(X^2+Y^2)/a^2-Z^2/b^2=-1$ in an XYZ space for which Z>0; α is the angle formed between the XY plane and the straight line that connects the internal focal point of the reflecting mirror with an arbitrary point in space; β is the angle formed between the XY plane and the straight line that connects the principal point of the imaging device with a point at which incident light from the arbitrary point strikes the imaging plane of the imaging device; F is the focal distance of the imaging device; θ is the incidence direction of the incident light when the direction of the reference optical axis in the XY plane is 90 degrees; γ is the tilt of the imaging plane dependent on the incidence direction θ; and φ is the incidence direction of the incident light on the imaging plane.

55. A wide-angle image-generating device, comprising:

a reflecting mirror having a convex reflecting plane whose angle θ has the minimum range of (θ1≦θ≦θ2, −180°≦θ1≦180°, −180°≦θ2≦180°, θ1<θ2), wherein a reference optical axis is defined in an arbitrary direction perpendicular to the central rotational axis of a rotary-symmetrical body, and the direction of the reference optical axis is taken to be 0 degrees;

an imaging device whose principal point is on the central rotational axis of the reflecting mirror, whose optical axis is tilted in the direction of the reference optical axis by an angle less than or equal to α in relation to the central rotational axis when the angle of view is 2 α, which forms a reflected image of the reflecting mirror, and picks up objects in a range of at least angle θ around the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table, and is connected to the developed image generating unit, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein the development table generating unit for generating a development table is constituted so as to generate a development table according to the equations below:

$$\tan \alpha = \{(b^2+c^2)\cdot\sin \beta - 2bc\}/\{(b^2-c^2)\cdot\cos \beta\}$$

$$c=(a^2+b^2)^{0.5}$$

$$(x^2+y^2)^{0.5}=F\cdot\cos \beta/\cos \gamma(\theta)/\sin (\beta+\gamma(\theta))$$

$$\cos \phi = \cos \theta/(1+\tan^2 \gamma(90°)\cdot\sin^2 \theta)^{0.5}$$

$$\tan \gamma(\theta) = \tan \gamma(90°)\cdot\sin \theta$$

where, a and b are constants that determine the shape of the hyperboloid; the shape of the hyperboloid is a hyperboloid expressed by the equation $(X^2+Y^2)/a^2-Z^2/b^2=-1$ in an XYZ space for which Z>0; α is the angle formed between the XY plane and the straight line that connects the internal focal point of the reflecting mirror with an arbitrary point in space; β is the angle formed between the XY plane and the straight line that connects the principal point of the imaging device with a point at which incident light from the arbitrary point strikes the imaging plane of the imaging device; F is the focal distance of the imaging device; θ is the incidence direction of the incident light when the direction of the reference optical axis in the XY plane is 90 degrees; γ is the tilt of the imaging plane dependent on the incidence direction θ; and φ is the incidence direction of the incident light on the imaging plane.

56. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device; and a development table generating unit for generating a development table that contains information on the correspondence relation between the pixels in the wide-angle image and the developed image when the developed image generating unit develops the wide-angle image, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein the development table generating unit for generating a development table is constituted so as to generate a development table according to the equations below:

$$\tan \alpha = \{(b^2+c^2)\cdot\sin \beta - 2bc\}/\{(b^2-c^2)\cdot\cos \beta\}$$

$$c=(a^2+b^2)^{0.5}$$

$$(x^2+y^2)^{0.5}=F\cdot\cos \beta/\cos \gamma(\theta)/\sin (\beta+\gamma(\theta))$$

$$\cos \phi = \cos \theta/(1+\tan^2 \gamma(90°)\cdot\sin^2 \theta)^{0.5}$$

$$\tan \gamma(\theta) = \tan \gamma(90°)\cdot\sin \theta$$

where, a and b are constants that determine the shape of the hyperboloid; the shape of the hyperboloid is a hyperboloid expressed by the equation $(X^2+Y^2)/a^2-Z^2/b^2=-1$ in an XYZ space for which $Z>0$; $\alpha$ is the angle formed between the XY plane and the straight line that connects the internal focal point of the reflecting mirror with an arbitrary point in space; $\beta$ is the angle formed between the XY plane and the straight line that connects the principal point of the imaging device with a point at which incident light from the arbitrary point strikes the imaging plane of the imaging device; F is the focal distance of the imaging device; $\theta$ is the incidence direction of the incident light when the direction of the reference optical axis in the XY plane is 90 degrees; $\gamma$ is the tilt of the imaging plane dependent on the incidence direction $\theta$; and $\phi$ is the incidence direction of the incident light on the imaging plane.

57. A wide-angle image-generating device, comprising:

a reflecting mirror having a reflecting plane with a convex shape;

an imaging device that forms an image from the image reflected off the reflecting mirror, picks up objects in a range of 360 degrees around the central rotational axis of the reflecting mirror, and has a principal point on the central rotational axis of the reflecting mirror;

a developed image generating unit for generating a developed image as viewed from the central rotational axis on the basis of the wide-angle image obtained from the imaging device;

a computational processing device for generating a development table that contains information on the correspondence relation between the pixels in the wide-angle image and the developed image when the developed image generating unit develops the wide-angle image; and a development table storage unit that stores the development table generated by the computational processing device for generating a development table and is connected to the developed image generating unit; and a development table storage unit that stores the development table generated by the computational processing device for generating a development table and is connected to the developed image generating unit, wherein the reflecting mirror is in a hyperbolic shape that has an internal focal point on the central rotational axis thereof, and the position of the external focal point of the hyperbolic shape and the position of the principal point of the imaging device are disposed so as to substantially conform to each other, and wherein the development table generating unit for generating a development table is constituted so as to generate a development table according to the equations below:

$$\tan \alpha = \{(b^2+c^2)\cdot\sin \beta - 2bc\}/\{(b^2-c^2)\cdot\cos \beta\}$$

$$c=(a^2+b^2)^{0.5}$$

$$(x^2+y^2)^{0.5}=F\cdot\cos \beta/\cos \gamma(\theta)/\sin (\beta+\gamma(\theta))$$

$$\cos \phi = \cos \theta/(1+\tan^2 \gamma(90°)\cdot\sin^2 \theta)^{0.5}$$

$$\tan \gamma(\theta) = \tan \gamma(90°)\cdot\sin \theta$$

where, a and b are constants that determine the shape of the hyperboloid; the shape of the hyperboloid is a hyperboloid expressed by the equation $(X^2+Y^2)/a^2-Z^2/b^2=-1$ in an XYZ space for which $Z>0$; $\alpha$ is the angle formed between the XY plane and the straight line that connects the internal focal point of the reflecting mirror with an arbitrary point in space; $\beta$ is the angle formed between the XY plane and the straight line that connects the principal point of the imaging device with a point at which incident light from the arbitrary point strikes the imaging plane of the imaging device; F is the focal distance of the imaging device; $\theta$ is the incidence direction of the incident light when the direction of the reference optical axis in the XY plane is 90 degrees; $\gamma$ is the tilt of the imaging plane dependent on the incidence direction $\theta$; and $\phi$ is the incidence direction of the incident light on the imaging plane.

* * * * *